United States Patent [19]
Abe et al.

[11] Patent Number: 5,974,458
[45] Date of Patent: *Oct. 26, 1999

[54] DATA TRANSFER ACCOUNTING DEVICE AND METHOD FOR PERFORMING AN ACCOUNTING PROCESS INCLUDING AN ACCOUNTING INFORMATION COLLECTING PROCESS

[75] Inventors: Jin Abe; Tetsuya Nishi, both of Kanagawa, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,090

[22] Filed: Apr. 24, 1996

[30] Foreign Application Priority Data

Apr. 24, 1995 [JP] Japan ........................... 7-98785
Jun. 30, 1995 [JP] Japan ........................... 7-166677
Aug. 28, 1995 [JP] Japan ........................... 7-218392

[51] Int. Cl.$^6$ ........................... G06F 15/163
[52] U.S. Cl. ........................... 709/224; 709/232
[58] Field of Search ........................... 370/395, 399, 370/397, 230, 352, 465, 358, 426, 438, 474, 233, 234, 235, 253, 376, 396; 348/12, 13, 6, 7, 10; 455/5.1; 379/207, 269; 364/DIG. 1, 242.94; 395/200.67, 200.62, 200.54, 185.06

[56] References Cited

U.S. PATENT DOCUMENTS 5,276,441  1/1994  Katsurada et al. ............... 340/825.03
5,317,215  5/1994  Kranzler ........................... 327/47
5,396,493  3/1995  Sugiyama ........................... 370/403
5,561,662  10/1996 Kakuma et al. ..................... 370/252
5,646,956  7/1997  Pinna ........................... 375/224

OTHER PUBLICATIONS

Hunt, "TCP/IP Network Administration," O'Reilly & Associates, Inc, 1992.
http://ftp.wustl.edu/packages/security/TAMU/tamu_summary.txt, Safford et al., "Texas A&M Network Security", Sep. 8, 1993.
Thinking about Firewalls, Ranum, 1993.

Primary Examiner—Frank J. Asta
Assistant Examiner—Daniel Patru
Attorney, Agent, or Firm—Helgott & Karas, P C.

[57] ABSTRACT

Source data is stored in a source data storage unit and a comparing device compares source data with destination data stored in a destination data storage unit. A destination address compressing unit compresses destination address information, and other accounting parameters are output with some delay. An accumulating device accumulates information from the destination address compressing unit as an address. A source address compressing unit compresses or delays information from an accumulating unit, and then outputs information. A source address carrier compressing unit compresses or delays information from the source address compressing unit, and then outputs information. A destination address source address carrier re-compressing unit compresses or delays compressed information from the source address carrier compressing unit, and then outputs information. A period abnormality detecting circuit in an accounting unit validates transfer data and prevents a wrong accounting process from being performed.

18 Claims, 42 Drawing Sheets

| RDA | | 2110 |
|---|---|---|
| SNI ID 0 | 0 | ←— DA 64BIT (1A-1) —→ |
| | 1 | ←— DA 64BIT (1A-2) —→ |
| | 7 | ←— DA 64BIT (1A-8) —→ |
| | 8 | ←— DA 64BIT (GA-1) —→ |
| | 9 | ←— DA 64BIT (GA-2) —→ |
| | F | ←— DA 64BIT (GA-8) —→ |
| SNI ID F | F0 | ←— DA 64BIT (1A-1) —→ |
| | F1 | ←— DA 64BIT (1A-2) —→ |
| | F7 | ←— DA 64BIT (1A-8) —→ |
| | F8 | ←— DA 64BIT (GA-1) —→ |
| | F9 | ←— DA 64BIT (GA-2) —→ |
| | FF | ←— DA 64BIT (GA-8) —→ |
| SNI ID 10 | 100 | ←— DA 64BIT (1A-1) —→ |
| | 101 | ←— DA 64BIT (1A-2) —→ |
| | 107 | ←— DA 64BIT (1A-8) —→ |
| | 108 | ←— DA 64BIT (GA-1) —→ |
| | 109 | ←— DA 64BIT (GA-2) —→ |
| | 10F | ←— DA 64BIT (GA-8) —→ |
| SNI ID 1F | 1F0 | ←— DA 64BIT (1A-1) —→ |
| | 1F1 | ←— DA 64BIT (1A-2) —→ |
| | 1F7 | ←— DA 64BIT (1A-8) —→ |
| | 1F8 | ←— DA 64BIT (GA-1) —→ |
| | 1F9 | ←— DA 64BIT (GA-2) —→ |
| | 1FF | ←— DA 64BIT (GA-8) —→ |

512 TYPES

FIG. 24

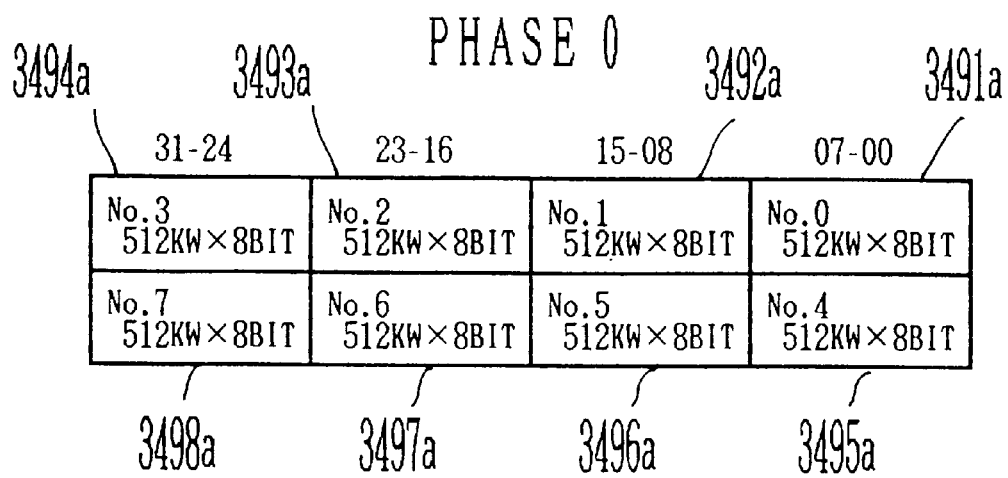
F I G · 3 4 A
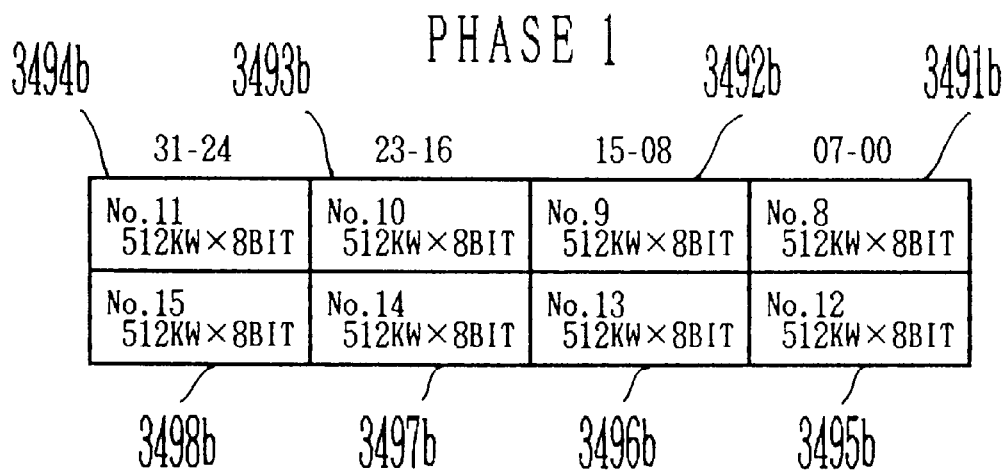
F I G · 3 4 B

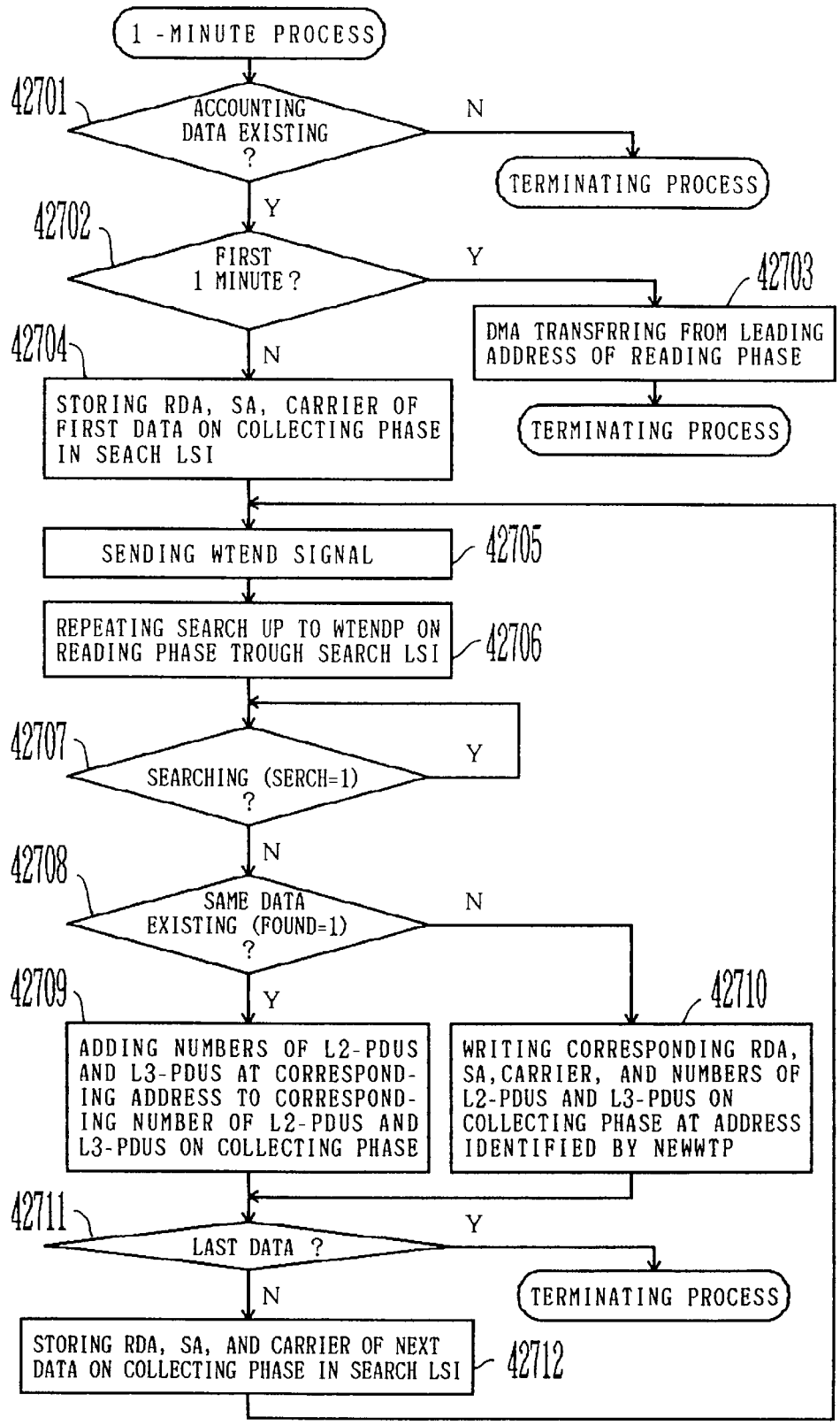
F I G. 4 2

DATA TRANSFER ACCOUNTING DEVICE AND METHOD FOR PERFORMING AN ACCOUNTING PROCESS INCLUDING AN ACCOUNTING INFORMATION COLLECTING PROCESS

BACKGROUND OF THE INVENTION

1. Field of the Invention

The present invention relates to a device for transferring data from a source to a destination while comparing the data at the source with those at the destination, and more specifically to a data transfer accounting device and method for use in a switched multi-megabit data service (SMDS).

2. Description of the Related Art

With higher performance information processing devices for workstations, personal computers, etc., the users demand to perform quick operations in transmitting data between the information processing devices and between LANs accommodating the information processing devices. For example, the SMDS functions as a high-speed and broadband connection-less data service for realizing the inter-LAN connection. The SMDS is a connectionless data switch service based on the transfer speed of 1.5 Mbps or 45 Mbps.

When the SMDS is provided through an ATM network, a predetermined ATM switch is provide with an SMDS processing device (SMDS message handler), and a permanent virtual circuit or a permanent virtual channel (PVC) connects SMDS subscribers to each other. The connectionless data output from the SMDS subscriber is transferred to the SMDS processing device and performs a routing process, etc. through the processing device.

However, since the above described PVC is a path set in the ATM network, the connectionless data is converted (disassembled) into an ATM cell format before being input to the ATM switch. The cell is a 53-byte unit comprising a 48-byte payload and a 5-byte header.

FIG. 1 is a conventional data format showing the conversion between variable-length data and fixed-length data in the SMDS.

A Protocol data unit (L3-PDU) corresponds to the above described connectionless data, and comprises a header storing a data destination address DA and a source address SA, etc., and a payload. The layer-2 protocol data unit (L2-PDU) corresponds to the above described cell and comprises a beginning of a cell (BOM), an intermediate cell (COM), and an end of a cell (EOM). The BOM stores the source address SA of the connectionless data and the destination address DA. The number of the COMs to be generated depends on the data length of the connectionless data. To simplify the explanation, a fixed-length cell corresponds to the L2-PDU while the variable-length data frame corresponds to the L3-PDU in the following descriptions.

When the data output from the SMDS subscriber and converted into a cell format is input to the SMDS processing device through the PVC set in the ATM network, it is assembled in the format of the L2-PDU or data in a higher-order layer as necessary to make various checks by analyzing the routing information, etc. Then, it is disassembled into cells and routed according to the analysis information.

The accounting process of the SMDS is described in the Technical Reference TR-TSV-000775 issued by Bell Communication Research in the U.S. When data is transferred from the SMDS subscriber A to the SMDS subscriber B in the accounting process, the accounting process is performed on the data receiving side, that is, by the SMDS processing device accommodating the SMDS subscriber B. Then, the following data is collected in the accounting process:

destination address DA (address of SMDS subscriber B);
source address SA (address of SMDS subscriber A) carrier (information identifying the communications service provider of the path from the SMDS processing device accommodating the SMDS subscriber A to the SMDS processing device accommodating the SMDS subscriber B;
SNI address (subscriber network interface address of the SMDS subscriber B);
segment count (number of L2-PDUs); and
packet count (number of L3-PDUs).

The SMDS processing device comprises a line unit for transmitting data in a cell format and a common unit for monitoring and controlling the entire process of the SMDS processing device. An accounting unit is provided in the common unit. When the line unit receives cell data, it generates a cell frame signal having a pulse synchronous with the cell data and a cell enable signal indicating whether or not the cell data is valid. These signals are transferred to the common unit in parallel with the cell data at a predetermined timing in synchronism with the cell data.

The accounting unit recognizes the segmentation of the cell data, and uses the cell frame signal as a refreshing signal for the accounting data accumulating DRAM. If a cell enable signal indicates a valid cell in the accounting process, the information stored in the valid cell (collected information, etc.) is retrieved.

In the ATM network used for the SMDS, data can be transferred at a desired speed in a way that either valid cells or invalid cells are transferred at predetermined intervals. Therefore, the line unit in the SMDS processing device outputs a cell frame signal having pulses at predetermined intervals when receiving cells (valid and invalid cells). If the period of the pulses of the cell frame is disturbed or the pulses cannot be generated due to a fault, etc. in the line unit, then the accounting unit may not be able to perform the accounting process.

Therefore, the SMDS processing device monitors the pulse period and disconnection state of the cell frame signal. If it detects a fault, an appropriate action should be taken against the fault. However, the conventional SMDS processing device may be provided with the function of monitoring the disconnection of the cell frame signal, but is not provided with the function of monitoring the pulse period of the cell frame signal.

As described above, when the cell enable signal indicates a valid state, the information stored in the cell is collected as accounting data. Accordingly, if the cell enable signal indicates a valid state even though an invalid cell or a cell containing a transmission error has been input, then the communications fee may be charged to the account of a wrong subscriber.

Therefore, it is required to take action against the case where an abnormal condition occurs in the cell enable signal to improve the reliability of the accounting process. However, the conventional SMDS processing devices have no such function.

The problem related to the reliability of the accounting process should be carefully studied by the users as well as the communication services providers. The conventional SMDS accounting processes are performed on the basis of normal cell frame signals and cell enable signals, and are not provided with sufficient check and fail-safe capabilities for use in abnormal conditions.

The above listed problems are not only caused in the SMDS but are common to all systems for performing accounting processes using transfer data timing information or the transfer data valid/invalid information.

Recently, in specific areas and companies, a local area network (LAN) designed by inter-connecting a plurality of terminal units such as work stations, etc. is commonly used to transmit information.

With the development of information technology, LANs are used more and more frequently. Furthermore, by inter-connecting the LANs located at various positions, it is possible to design a system for wide transmission of information.

The SMDS divides a variable-length packet (layer 3 protocol data unit, or L3-PDU) into a plurality of fixed-length cells (layer 2 protocol data unit) according to the SMDS interface protocol (SIP), and information is transferred in a fixed-length cell.

That is, in the SMDS, data is transmitted cell by cell in the L2-PDU format in the switching system in which cells are switched.

The fixed-length cell has the data format shown in FIG. 2.

That is, as shown in FIG. 2, an L2-PDU comprises 16 bits×27 of data (54 octets). An area $2100a$ having the data length of 5 bits stores message ID (MID) information. An area $2100b$ having the data length of 8 bits stores SNI-ID information. An area $2100c$ having the data length of 8 octets stores DA information. An area $2100d$ having the data length of 8 octets stores SA information. An area $2100e$ is a trailer unit.

A message ID (MID), which is the information stored in the area $2100a$, indicates the type of message transmitted between subscribers. A destination address DA indicates an address on the receiving side, while a source address SA indicates an address on the sending side. A subscriber network interface identifier (SNI-ID) indicates the type of subscriber network interface (address).

In the L2-PDU, the header unit stores the segment type (ST) information (not shown in the drawings) indicating the portion in the undivided L3-PDU. The information can be a beginning of a message (BOM) indicating a cell containing the leading portion of the original L3-PDU, an end of a message (EOM) indicating a cell containing the last portion, and a continuation of a message (COM) indicating a cell containing an intermediate portion other than the BOM or EOM, and a single segment message (SSM), complete in a single cell.

In the above described SMDS switch system, an accounting process is performed as shown by TR-TSV-00775 of the technical reference of Bell Communications Research in the U.S. to determine the network fee to be charged to each subscriber's account in the SMDS network.

That is, the accounting process in the SMDS switch system is performed by the accounting system as shown in FIG. 3.

The accounting system shown in FIG. 3 is represented in the block diagram relating to the accounting system operated by the LP5813 shown in FIG. 5.

The accounting system shown in FIG. 3 comprises on the SMDS switch network side a data generation unit 3101; a data aggregating unit 3102; a data formatting unit 3103; a data transmitting unit 3104; and a RAO(Revenue Accounting Office) processing unit 3105 on the revenue accounting office side.

The data generating unit 3101 determines whether or not the SMDS accounting data is required as usage information of a packet (L3-PDU) in the SMDS, and generates the accounting data as necessary, by configuring the SMDS accounting data generating device.

The data aggregating unit 3102 receives data from the data generating unit 3101 and aggregates the number of packets and segments transferred between a source subscriber and a destination subscriber at predetermined intervals.

The data formatting unit 3103 formats the accounting information as the usage information of the SMDS switch network, the audit information, and time change information in a predetermined format before processing the accounting information by an accounting information managing unit 3105.

The data transfer unit 3104 transfers the formatted usage information, audit information, and time change information from the data formatting unit 3103 to the accounting information managing unit 3105.

The accounting information managing unit 3105 receives data from the data transfer unit 3104 and manages the accounting information.

With the above described configuration, the accounting data generated by the data generating unit 3101, data aggregating unit 3102, and data formatting unit 3103, is transferred by the data transfer unit 3104 to the accounting information managing unit 3105. The accounting information managing unit 3105 receives the data from the data transfer unit 3104 to manage the accounting information and perform a requested accounting process for each subscriber.

The data generating unit 3101 generates the accounting data for each object L3-PDU. The accounting data comprises 6 parameters, that is, a DA, an SA, an SNI address, a condition code, a segment count, and a packet count. It further comprises transmission line carrier information, etc.

The condition code indicates the transfer state of information. Practically, it indicates whether or not an error exists, and also indicates an error type. An SNI address indicates the address of a subscriber network interface. A segment count indicates the number of divided L2-PDUs. A packet count indicates the number of L3-PDUs.

Since a large volume of data should be handled to process the accounting data by the data generating unit 3101, these parameters are normally compressed in the generating process of the accounting data if the object parameter type can be limited.

For example, the DA can be limited relatively easily. That is, the above described technical reference TR-TSV-000772 describes "up to 16 types of individual addresses and up to 48 types of group addresses can be defined for one SNI". Accordingly, there are up to 64 types of individual addresses and group addresses. Thus, each SNI can be limited to up to 64 types of address information.

Similarly, since the SNI address can be determined by a DA, it can also be limited in type. The above described technical reference defines only some types of condition codes. Therefore, it can also be limited. Likewise, the carrier information can be limited. However, the SA cannot be easily limited.

That is, as indicated by the above described technical reference TR-TSV-000772, the SA screening process is performed on the receiving side. In the SA screening process, an SA screening table is provided on the receiving side, and the SA of a received L3-PDU is compared with the SA entered in the table to determine whether or not the received L3-PDU can be accepted.

There are two types of algorithms to determine whether to receive the received L3-PDU or not: the algorithm for receiving when the SA of the received L3-PDU is included in the SA registered in the above described table; and the algorithm for not receiving when the SA of the received L3-PDU is included in the SA registered in the above described table.

The above described technical reference TR-TSV-000772 also defines the maximum number of the SA screening processes. Either algorithm for the SA screening can be selected as the network when subscribing the network. When the former algorithm is selected, up to 128 SA can be accepted and the SA parameter can be limited, thereby possibly compressing the SA. When the latter algorithm is selected, the number of SAs to be accepted cannot be specified. Therefore, the SA cannot be limited, thereby hardly compressing the SA.

Using a common telephone unit, the user talks with specific persons in most cases, and rarely receives calls from non-specific persons. Therefore, in the SMDS switch, the accounting data can be collected when the SAs of the specific persons are prepared even if all the possible SA bit patterns are not prepared.

An SMDS accounting data generating device shown in FIG. 4 can be used as having the functions of the data generating unit 3101 and data aggregating unit 3102 shown in FIG. 3.

In FIG. 4, a DA compressing unit 4111 receives a fixed-length cell as an L2-PDU, divided from the L3-PDU as shown in FIG. 2. From the header information of the L2-PDU, the DA compressing unit 4111 reads the DA information, SA information, carrier information, SNI address information, MID information, and data length information, compresses the DA information, and outputs the result as the DA compressed information RDA. The input data is delayed and output as being unchanged.

An ST identifying unit 4112 identifies a segment type based on the header information of the L2-PDU from the DA compressing unit 4111.

The ST (segment type) indicates the type of the L2-PDU forming the message when a message is transmitted between subscriber terminal units.

An accumulating RAM 4113 accumulates the DA compressed information RDA from the DA compressing unit 4111, SA information, and carrier information according to the SNI address information.

An SA compressing unit 4114 receives the SA information and carrier information from the accumulating RAM 4113 and compresses the SA information, and outputs the SA compressed information RSA and carrier information.

An (RSA+carrier) compressing unit 4115 receives the information RSA from the SA compressing unit 4114 and the carrier information, and compresses the combination of various types of the information into a single piece of information.

An L2-PDU adding unit 4116 counts the number of the L2-PDUs corresponding to the DA information, SA information, carrier information, MID information, and SNI-ID information.

An L3-PDU adding unit 4117 counts the number of the L3-PDUs comprising the L2-PDUs corresponding to the DA information, SA information, carrier information, MID information, and SNI-ID information.

Accounting RAM 4118a and 4118b store the SA information, carrier information, the count value information from the L2-PDU adding unit 4116, and the count value information from the L3-PDU adding unit 4117.

The addresses of the accounting RAM 4118a and 4118b form a 2-dimensional matrix using the two address information bits of the DA compressed address and (RSA+carrier) compressed address.

With this configuration, the SMDS accounting data generating device shown in FIG. 4 generates DA compressed information RDA. The accumulating RAM 4113 stores the DA compressed information RDA, SA information, and carrier information according to the SNI address information and MID address information.

The SA compressing unit 4114 compresses the SA information, and the (RSA+carrier) compressing unit 4115 compresses the SA compressed information RSA generated by compressing the SA information and the carrier information, and generates the information RSAC.

Then, the accounting RAM 4118a and 4118b generates the SMDS accounting data by writing the SA information, carrier information, segment count information from the L2-PDU adding unit 4116, and the packet count information from the L3-PDU adding unit 4117 to the 2-dimensional matrix, according to the DA compressed information RDA and the information RSAC generated by compressing the RSA and carrier information.

However, in the accounting data generating system of the SMDS accounting data generating device shown in FIG. 4, when the numbers of SNIs, individual addresses, group addresses, and receivable messages are increased, it is also required to increase the number of RAM correspondingly.

That is, when the number of receivable SAs is to be increased for the accounting RAM 4118a and 4118b having the address configuration of the above described 2-dimensional matrix, a sufficient RAM area is required corresponding to the number of the DAs with the increasing number of (RSA+carrier) patterns. In the present hardware technology, it is impossible to provide an accounting RAM area large enough to support the number of received messages, for practical use.

In consideration of the present hardware technology, the compressed DA can be limited, but the (RSA+carrier) can be limited only to $2^8=256$ types when the LSI forming the compressing unit and the capacity of the RAM are taken into account. If it is exceeded, there is no area to write data in the 2-dimensional matrix, thereby all excess accounting data is discarded.

For example, when the number of SNIs is 32, the number of individual addresses is 8, the number of group addresses is 8, and the number of receivable messages is 256, then the RAM area required for the messages is calculated by the following equation (1).

$$32\times(8+8)\times256=131072 \text{ (messages)} \tag{1}$$

When the number of SNIs is 32, the number of individual addresses is 8, the number of group addresses is 8, and the number of receivable messages is 1024, then the RAM area required for the messages is calculated by the following equation (2).

$$32\times(8+8)\times1024=524288 \text{ (messages)} \tag{2}$$

When the number of SNIs is 64, the number of individual addresses is 16, the number of group addresses is 48, and the number of receivable messages is 2048, then the RAM area required for the messages is calculated by the following equation (3).

$$64\times(16+48)\times2048=8388608 \text{ (messages)} \tag{3}$$

The broadband connectionless data service requires efficient processing of subscriber information when processing connectionless data for a large number of subscribers.

FIG. 5 shows a common configuration of an SMDS system.

The SMDS is a high-speed connectionless data service for transferring data after dividing a variable-length message in a level-3 protocol data unit (L3-PDU) into a fixed-length data in a packet, which is similar to a cell in an asynchronous transfer mode (ATM) in which data are transferred in a level-2 protocol data unit (L2-PDU). In addition to user information, which is actually transferred to the L3-PDU, a source address SA and a destination address DA are added to the L3-PDU. The same message identifier, that is, identification information, is added to the L2-PDUs forming the same L3-PDU.

The information from a subscriber is processed through a subscriber network interface (SNI). The subscriber is provided with a DS1 subscriber line 5801 having the transmission speed of, for example, 1.5 Mbps, and a DS3 subscriber line 5803 having the transmission speed of 45 Mbps, as physical transmission lines. A subscriber terminal unit divides the L3-PDU in the SMDS into one or more L2-PDU, converts the L2-PDU into the data format for the DS1 subscriber line 5801 or DS3 subscriber line 5803, and then outputs the resultant data to each subscriber line.

The DS1 subscriber line 5801 is terminated by a DS1 terminating unit 5802, while the DS3 subscriber line 5803 is terminated by a DS3 terminating unit 5804. The L2-PDUs are received from these terminating units.

The L2-PDU from the subscriber is assigned a semi-fixed VCI (virtual channel identifier) and VPI (virtual path identifier) corresponding to the SMDS. Each of the DS1 terminating unit 5802 and DS3 terminating unit 5804 extracts the L2-PDU provided with the semi-fixed VCI and VPI, replaces the VCI+VPI of the L2-PDU with the semi-fixed VCI+VPI corresponding to each terminating unit, and then outputs the L2-PDU to a switch unit 5808. The switch unit 5808 is probably an ATM switch. In this case, the L2-PDU is first converted into an ATM cell and output to the switch unit 5808. Since the L2-PDU and ATM cell are fixed-length packets containing data of equal length, the ATM switch and SMDS have an affinity for each other.

The L2-PDU (ATM cell) output from the DS1 terminating unit 5802 or DS3 terminating unit 5804 is input to the switch unit 5808 through the multiplexer/demultiplexer 5805, 5806, or 5807. The switch unit 5808 transfers the L2-PDU assigned a semi-fixed VCI+VPI corresponding to each of the DS1 terminating unit 5802 or DS3 terminating unit 5804 to an SMDS line part (LP) 5813.

The LP 5813 is connected to the switch unit 5808 through the highway 5815 having the transmission speed of 622 Mbps. The LP 5813 can process up to 64 subscriber interfaces (SNI) accommodated by a station containing the LP 5813. The number of the LPs 5813 corresponding to the scale of the station are connected to the switch unit 5808 through the highway 5815.

The LP 5813 can recognize from which DS1 terminating unit 5802 or DS3 terminating unit 5804 the received L2-PDU has been input by determining the semi-fixed VCI+CPI assigned to the L2-PDU. The LP 5813 extracts the source address SA from the message (L3-PDU) transferred using a plurality of L2-PDUs, and calculates the reduced destination address DA corresponding to the extracted address SA. The LP 5813 extracts the destination address DA from the message. If the destination address DA is addressed to a destination within the station, then the LP 5813 replaces the VPI+VCI of each L2-PDU of the message stored after being divided with the semi-fixed VPI+VCI of the DS1 terminating unit 5802 or DS3 terminating unit 5804 in the station corresponding to the destination address DA. On the other hand, if the destination address DA is addressed to a destination outside the station, then the LP 5813 calculates the LP of the destination station and replaces the VPI+VCI of each L2-PDU of the message stored after being divided with the reduced source address and the VPI+VCI corresponding to the LP 5813 of the destination station. Then, the LP 5813 outputs each of the L2-PDUs to the switch unit 5808 through the interface 5814 and highway 5815.

Each switch module (not shown in the drawings) in the switch unit 5808 quickly switches an input L2-PDU. In this case, if the L2-PDU input from the LP 5813 is addressed to a destination within the station, it is transferred to a subscriber in the station through the switch unit 5808, multiplexer/demultiplexer 5805, 5806, or 5807, and through the DS1 terminating unit 5802 or DS3 terminating unit 5804, and the DS1 subscriber line 5801 or DS3 subscriber line 5803. If the L2-PDU is addressed to a destination outside the station, then it is transferred to the LP 5813 of the destination station through a multiplexer/demultiplexer 5810, terminating circuit (FINF) 5811, and an inter-station relay line 5812.

The LP 5813 at the destination station realizes that the message is addressed to a destination in the station by determining the destination address DA of the message transferred using a plurality of received L2-PDUs. Then, the LP 5813 replaces the VPI+VCI of each L2-PDU storing the message with the semi-fixed VPI+VCI of the DS1 terminating unit 5802 and DS3 terminating unit 5804 in the station corresponding to the destination address DA, and outputs each L2-PDU to a switch unit. Each of these L2-PDUs is transferred to the subscriber in the station through the switch unit 5808, DS1 terminating unit 5802, or DS3 terminating unit 5804, and through the DS1 subscriber line 5801 or DS3 subscriber line 5803.

As described above, the DS1 terminating unit 5802 for terminating the DS1 terminating unit 5802 or the DS3 terminating unit 5804 for terminating the DS3 subscriber line 5803 as shown in FIG. 5 does not individually process subscriber information, but the LP 5813 processes all subscriber information. Thus, the hardware costs can be kept down for the entire switching unit, and the maintenance can easily be made. A control device 5809 should access the LP 5813 through a control line when processing a call, but does not have to individually access each of the DS1 terminating units 5802 and DS3 terminating units 5804. Therefore, the subscriber information can be efficiently processed.

In the broadband connectionless data service such as the SMDS, an accounting process should be performed for each subscriber In the accounting process, subscriber information generated as a result of the communications set by each subscriber should be collected for each subscriber.

In this case, the accounting process should be performed on the communications data for which network services are provided. Therefore, the accounting process is performed at the destination station. Practically, the process is performed by the LP 5813 shown in FIG. 5.

As a method often cited as an accounting process, the LP 5813 collects and accumulates subscriber information (accounting data) required for the accounting process for each of the source addresses SA stored in the L3-PDUs addressed to the receiving station. The source address SA stored by the L3-PDU has the information of, for example, 64 bits, and the number of the source addresses SA is $2^{64}$. Therefore, it is practically impossible for the LP 5813 to accumulate the accounting data relating to such a large number of source addresses SA.

Thus, the Applicant has proposed a method of collecting and accumulating accounting data about each reduced source address after degenerating a source address SA extracted from received L3-PDUs into some thousands of reduced source addresses each of which is represented by data of ten or more bits.

Thus, the accounting process can be realized by the LP 5813 using common memory elements.

The following sequence is used as a practical process sequence of the accounting process performed by the LP 5813. That is, accounting data is collected for each of the reduced source addresses SA, for example, every minute. The accounting data collected for 15 minutes are provided for the control device 5809 (refer to FIG. 5).

FIG. 6 shows the conventional accounting process for realizing the above described accounting process sequence. The configuration shown in FIG. 6 is provided in the LP 5813 shown in FIG. 5.

An accounting data collecting unit 6901 collects accounting data DATA about each reduced source address RDSCA after degenerating a source address SA extracted from received L3-PDUs into some thousands of reduced source addresses RDSCA, each of which is represented by data of ten or more bits. The accounting data collecting unit 6901 writes alternately every minute on collecting phases 6902 (phases 0 and 1), that is, memory elements, the collected accounting data DATA with the reduced source address RDSCA.

Concurrently, an MPU 6905 transfers the accounting data DATA collected for one minute in the collecting phase 6902 on which the accounting data collecting unit 6901 is not writing data, to a reading phase 6903 (bold line A in FIG. 6), which is a memory element for storing the accounting data DATA for 15 minutes, through a bus 6908 using a RAM 6907 connected through the bus 6908 as a work memory, according to a control program stored in a ROM 6906 connected through the bus 6908. When the accounting data DATA for 15 minutes is stored on a reading phase 6903, the MPU 6905 collectively transfers all contents written on the reading phase 6903 to a notifying phase 6904, that is, a memory element equal in storage capacity to the reading phase 6903 (bold line B in FIG. 6).

Finally, the control device 5809 retrieves the contents written on the notifying phase 6904 (shown in FIG. 6) in the LP 5813.

When the MPU 6905 transfers the accounting data DATA collected for 1 minute in a collecting phase 6902 to the reading phase 6903, for storing the accounting data DATA for 15 minutes in the sequence of the conventional accounting process shown in FIG. 6, the MPU 6905 needs to retrieve from the reading phase 6903 the accounting data DATA written in the collecting phase 6902 to calculate the total data calculated for 15 minutes. If the accounting data DATA on the collecting phase 6902 is detected on the reading phase 6903, then the MPU 6905 merges the accounting data DATA in the collecting phase 6902 into the accounting data DATA detected on the reading phase 6903. If the accounting data DATA in the collecting phase 6902 is not detected on the reading phase 6903, then the MPU 6905 adds the accounting data DATA in the collecting phase 6902 into the new accounting data area on the reading phase 6903.

Thus, the data transfer of the accounting data DATA from the collecting phase 6902 to the reading phase 6903 is not a simple transfer process but a process requiring retrieval of the accounting data DATA in the reading phase 6903. In this case, the maximum number of messages to generate the accounting data DATA collected in the collecting phase 6902 matches the maximum number of the above described reduced source addresses RDSCA. Therefore, the accounting data DATA containing some thousands of messages should be retrieved in the reading phase 6903 within the one minute in which the processing phases are switched in the collecting phase 6902.

However, in a software process performed by the MPU 6905, it may be impossible to perform the entire process. In the worst case, all accounting data DATA cannot be transferred from the collecting phase 6902 to the reading phase 6903, by possibly generating communications in which no accounting process can be performed.

Practically, the maximum number of the accounting data DATA collected in the collecting phase 6902 is n. Then, a data area for 4 addresses is retrieved for 1 set of accounting data DATA with 32 bits set for 1 address. The amount of data for one set of the accounting data DATA can include 4 or more addresses. An average of 20 clock pulses that is, $40 \times 10^{-9} \times 20$ seconds, is required by the MPU 6905 to retrieve data at one address in the reading phase 6903 with the process clock pulse width of the MPU 6905 set to $40 \times 10^{-9}$ seconds.

At this time, if up to (n×14) sets of different accounting data DATA are stored on the reading phase 6903 for the past 14 minutes, and if the maximum n sets of the accounting data DATA are collected in the last minute of the 15 minutes, then the time calculated by the following equation (4) is required to retrieve in 4-address units the accounting data DATA for the past 14 minutes on the reading phase 6903 for one set of the accounting data DATA on the collecting phase 6902.

$$(40 \times 10^{-9} \times 20) \text{ seconds} \times 4 \text{ addresses} \times (n \times 14) \text{ sets} \qquad (4)$$

Therefore, the time calculated by the following equation (5) is required to retrieve in 4-address units the accounting data DATA for the past 14 minutes on the reading phase 6903 for each of the n sets of the accounting data DATA in the collecting phase 6902.

$$\{(40 \times 10^{-9} \times 20) \text{ seconds} \times 4 \text{ addresses} \times (n \times 14) \text{ sets}\} \times n \text{ sets} \qquad (5)$$

Since the upper time limit is the minute in which the processing phases are switched on the collecting phase 6902, the maximum number of sets n of the accounting data DATA collected in the collecting phase 6902 is expressed by the following expression (6).

$$N \approx 1157 \text{ sets} \qquad (6)$$

That is, n≈1157 or more sets of the accounting data DATA cannot be collected even with the MPU 6905 having the process bit width of 32 bits.

This type of problem is not limited to the accounting data processing device, but is commonly relating to the device for transferring data from a source to a destination while comparing the data at the source with the data at the destination.

SUMMARY OF THE INVENTION

The first object of the present invention is to improve the reliability of the accounting process even if a fault occurs in the line unit of the SMDS device.

The second object of the present invention is to provide a method and device for generating SMDS accounting data by supporting the number of received messages for practical use in the current hardware technology with the hardware scale suitably reduced.

The third object of the present invention is to improve the throughput of the device for transferring data from the source to the destination while comparing the data at the source with those at the destination.

A period detecting unit detects a period of a timing signal, notifying unit compares the period detected by the period detecting unit with the period of the timing signal in a normal state, and outputs a comparison result notification, accounting processing unit controls the accounting process according to the notification from the notifying unit.

An extracting unit extracts predetermined information from the data units, the notifying unit compares predetermined information extracted by the extracting unit with estimated values for predetermined information and issues a comparison result notification, the accounting unit controls the accounting process according to a notification from the notifying unit.

A data transfer accounting processing method in which an accounting process is performed using timing signals generated for data units transferred at predetermined intervals is executed by detecting by the period detecting unit a period of the timing signal, comparing the period detected by the period detecting unit with the period of the timing signal in a normal state, issuing a comparison result notification from the notifying unit, and controlling the accounting process by the accounting unit according to a notification from the notifying unit.

A data transfer accounting processing method operated in a data transfer accounting system in which an accounting process is performed for transferred data units containing valid data is executed by extracting predetermined information from the data units, comparing the predetermined information extracted by the extracting unit with estimated values for predetermined information, and issuing a comparison result notification from the notifying unit, and controlling the accounting process by the accounting unit according to the notification from the notifying unit.

A destination address compressing unit outputs other accounting parameters among a plurality of accounting parameters while compressing destination address compressed information as one accounting parameter among a plurality of accounting parameters, a compressing processing unit compresses source address information, carrier information, and destination address information, an accounting storage unit writes destination address compressed information, source address information, carrier information, segment count information, and packet count information as an address of the destination address source address carrier re-compressed information from a destination address source address carrier re-compressing unit, and informing the written information to an accounting processing unit.

A source address compressing unit outputs with some delay source address information not compressed, carrier information, and destination address compressed information while compressing source address information by receiving carrier information, source address information, and destination address compressed information read from stored end-of-message-information by receiving end-of-message-information, a source address carrier compressing unit outputs with some delay carrier information not compressed, source address information not compressed, and destination address compressed information while compressing carrier information and source address compressed information by receiving carrier information, source address information, destination address compressed information, and source address compressed information from the source address compressing unit, a destination address source address carrier re-compressing unit outputs with some delay carrier information not compressed, source address information not compressed, and destination address compressed information while further compressing source address carrier information and destination address compressed information by receiving carrier information, source address information, destination address compressed information, and source address carrier compressed information from the source address carrier compressing unit.

A data transfer accounting processing method operated in a network in which SMDS accounting data can be generated using a plurality of accounting parameters is executed by generating destination address compressed information by compressing destination address information as one of a plurality of accounting parameters, storing subscriber network interface address information as an address for destination address compressed information, and source address information and carrier information as other accounting parameters, performing compressing and re-compressing processes in at least three steps on the destination address compressed information, source address information, and carrier information read from an accumulating storage unit by receiving end-of-message information, and writing the destination address compressed information, source address information and carrier information, segment count information and packet count information to said accounting storage unit as an address identified by the most compressed accounting parameter of at least once re-compressed accounting parameters.

A destination address compressing unit compresses destination address compressed information as one of a plurality of accounting parameters, and outputs with some delay other accounting parameters of the plurality of accounting parameters, a source address compressing unit outputs with some delay source address information not compressed, carrier information, and destination address compressed information while compressing the source address information by accepting carrier information, source address information, and destination address compressed information read from stored end-of-message information by receiving end-of-message information, a source address carrier compressing unit outputs with some delay carrier information not compressed, source address information not compressed, and destination address compressed information while compressing carrier information and source address compressed information by receiving carrier information, source address information, destination address compressed information, and source address compressed information from the source address compressing unit, a destination address source address carrier re-compressing unit outputs with a delay carrier information not compressed, source address information not compressed, and destination address compressed information while further compressing source address carrier information and destination address compressed information by receiving carrier information, source address information, destination address compressed information, and source address carrier compressed information from the source address carrier compressing unit.

A source data storage unit stores source data received from the source device, a destination data access unit accesses the destination device, a destination data storage unit stores destination data received from the destination device by accessing the destination data access unit, a comparing unit compares source data stored in the source data storage unit with destination data stored in the destination data storage unit, and a control unit controls transferring of the source data from the source device to the destination device depending on a comparison result from the comparing unit.

A data transfer comparing unit transfers source data of the source device to the destination device while comparing source data stored in the source device with destination data stored in the destination device, a data generating unit generates accounting data by using a plurality of accounting parameters, and an accounting unit performs an accounting process by using timing signals generated for data units transferred at predetermined intervals.

BRIEF DESCRIPTION OF THE DRAWINGS

The present invention will be apparent from the following detailed descriptions with reference to the attached drawings:

FIG. 24 is data structure showing the operation of the DA compressing unit according to the embodiment of the data transfer accounting data generating device;

FIG. 34A shows the hardware configuration of the accounting RAM (phase 0) according to the embodiment of the data transfer accounting data generating device;

FIG. 34B shows the hardware configuration of the accounting RAM (phase 1) according to the embodiment of the data transfer accounting data generating device;

FIG. 42 shows the process flow of the MPU.

DESCRIPTION OF THE PREFERRED EMBODIMENT

Figure 5:
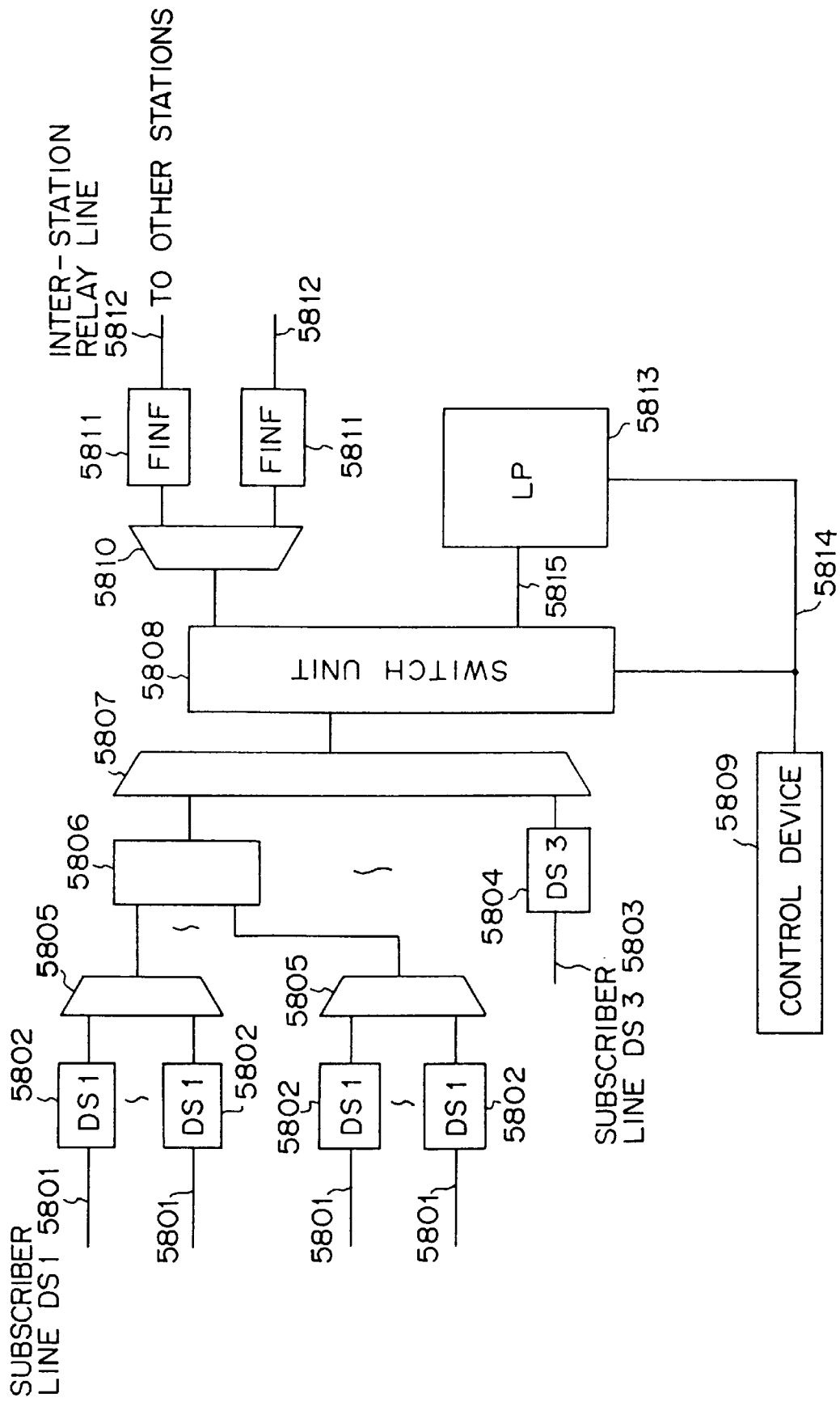
FIG. 5 is a block diagram of a common configuration of the conventional SMDS system.
Figure 7:
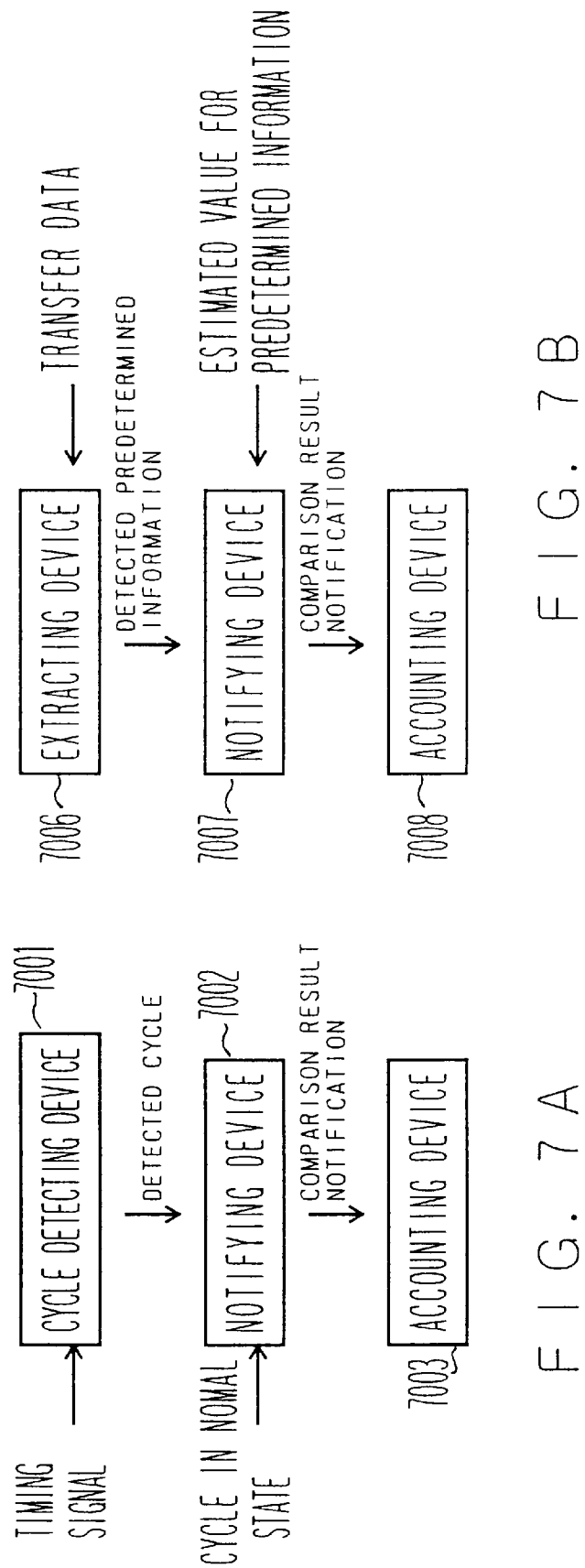
FIG. 7A is a block diagram of the principle of the first aspect of the present invention for the data transfer accounting device.
FIG. 7B is a block diagram of the principle of the second aspect of the present invention for the data transfer accounting device.
Figure 21:
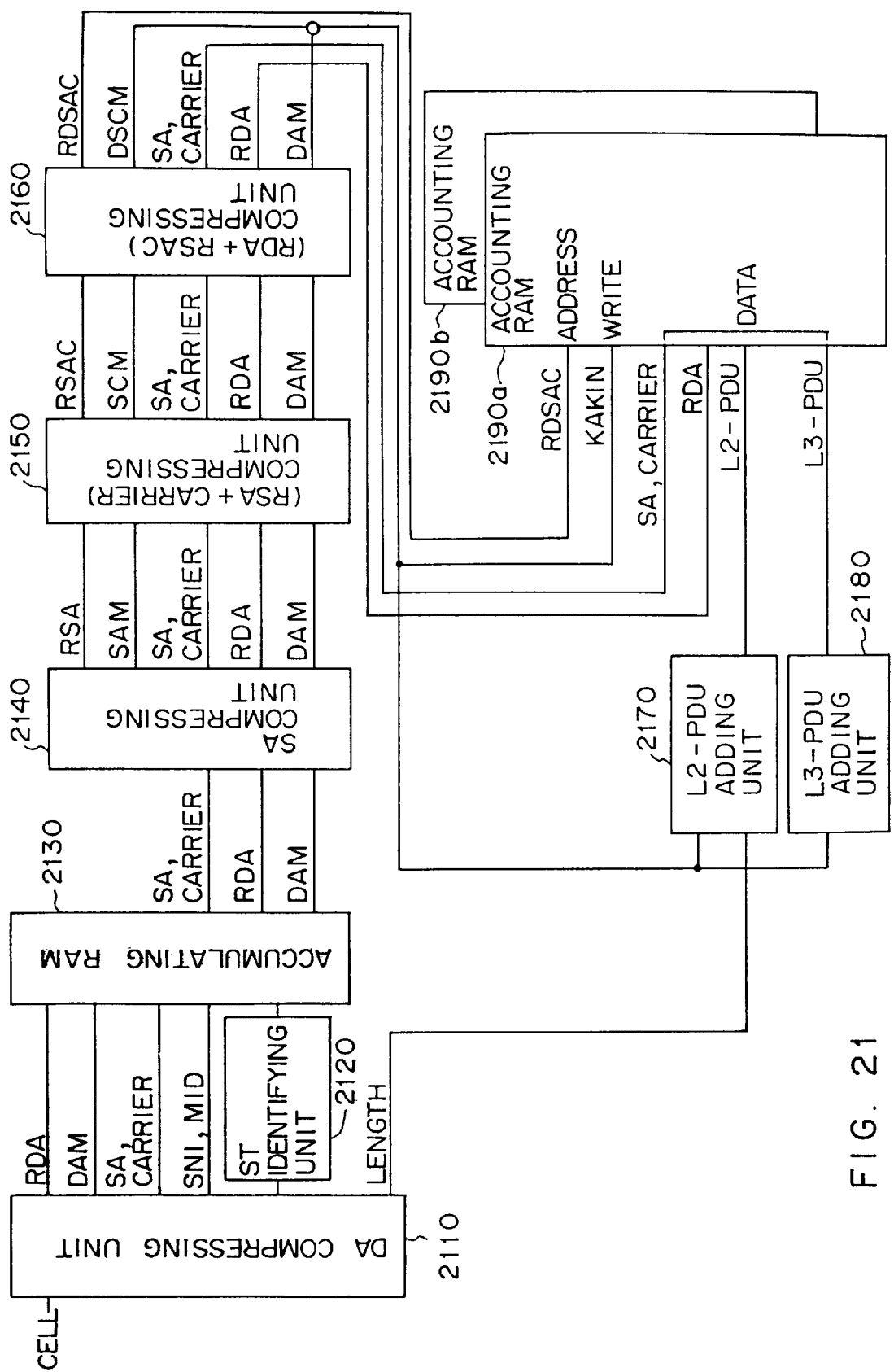
FIG. 21 is a block diagram showing the SMDS accounting data generating device according to the fifth aspect of the present invention for the data transfer accounting data generating device.

FIGS. 7A and 7B relate to the accounting process performed in the LP 5813 shown in FIG. 5, and are block diagrams of the principles of the aspects of the present invention for the data transfer accounting device of performing an accounting process using the accounting data generated by the accounting data generating device shown in FIG. 21.

FIG. 7A is a block diagram showing the first aspect of the data transfer accounting device. The first aspect of the data transfer accounting device performs an accounting process using a timing signal generated for each data unit by transferring data units at predetermined intervals. The data transfer accounting device comprises the following devices.

A cycle detecting device 7001 is a circuit for detecting the period of a timing signal, and comprises, for example, a counter for counting signals at a predetermined frequency and resetting the count value each time it receives the timing signal. The count value indicated at the reset refers to the period of the timing signal. If the data transmission system is the SMDS through the ATM network, then the timing signal indicates the pulse of the cell frame signal.

A notifying device 7002 compares the period detected by the period detecting device 7001 with the period of the timing signal in a normal state, and notifies the processor for controlling the accounting process of the comparison result. The period of the timing signal in the normal state is preliminarily set. When the comparison indicates a non-matching result, then the notification refers to the occurrence of an abnormal condition.

A data transfer accounting device 7003 controls the accounting process according to the notification from the notifying device 7002. That is, if the comparison indicates a matching result, then it refers to a normal state and an accounting data collecting process is performed. If the comparison indicates a non-matching result, then it refers to an occurrence of an abnormal condition and activates the program describing a process, etc. to be performed by the processor that received the notification if a fault has occurred. Then, the data transfer accounting device 7003 performs the process according to the instruction from the processor.

FIG. 7B is a block diagram showing the second aspect (corresponding to the second embodiment) of the data transfer accounting device. The second aspect of the data transfer accounting device relates to a data transmission accounting system for performing an accounting process on data units when the data units to be transferred contain valid data. This data transfer accounting device comprises the following devices. If the data transmitting system relates to the SMDS through the ATM network, the cell enable signal indicates whether or not the data units to be transferred contain valid data.

An extracting device 7006 extracts predetermined information, for example, a predetermined bit in the source address of data units, from the transferred data units.

A notifying device 7007 compares the predetermined information extracted by the extracting device 7006 with estimated value of the predetermined information, and notifies the processor that controls the accounting process of the comparison result. The estimated value of the predetermined information is preliminarily set. When the comparison indicates a non-matching result, the notification refers to an abnormal state notification.

A data transfer accounting device 7008 performs an accounting process according to a notification from the notifying device 7007. That is, if the data units to be transferred contain valid data and the comparison indicates a matching result, it refers to a normal condition and a normal accounting process is performed. If the data units to be transferred contain valid data and the comparison indicates a non-matching result, then it refers to an abnormal condition, and the processor that has received the abnormal state notification activates, in the accounting process, a program describing the processes, etc. to be performed when a fault occurs. Then, the data transfer accounting device 7008 performs the processes at the instruction from the processor.

According to the present embodiments, the SMDS through an ATM network is described as an example of a connectionless data communications service.

Figure 8:
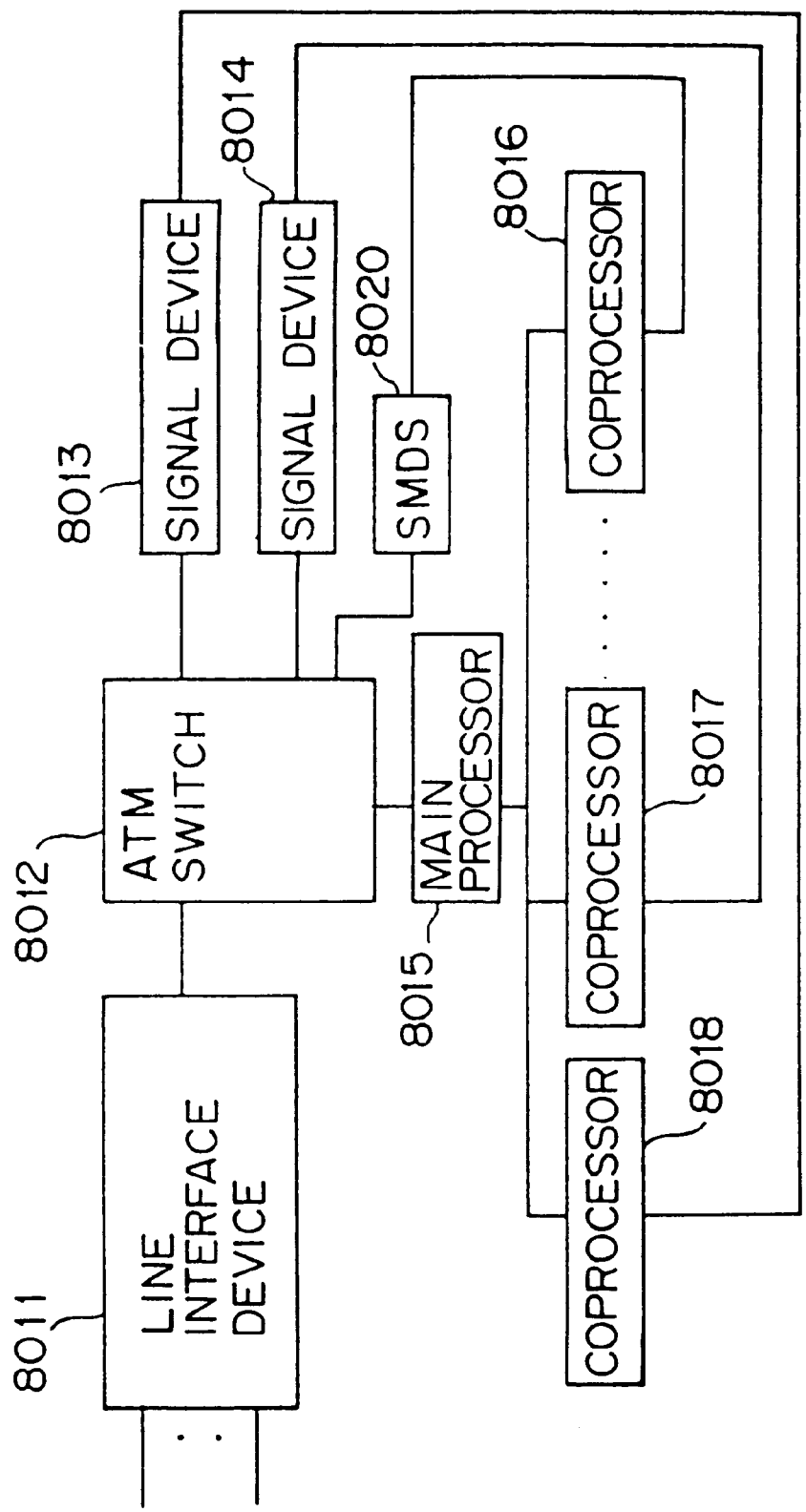
FIG. 8 is a block diagram of the configuration of the entire SMDS system.

Described below is the configuration common to the first and second embodiments of the data transfer accounting device. FIG. 8 shows the configuration of the entire SMDS system.

Figure 1:
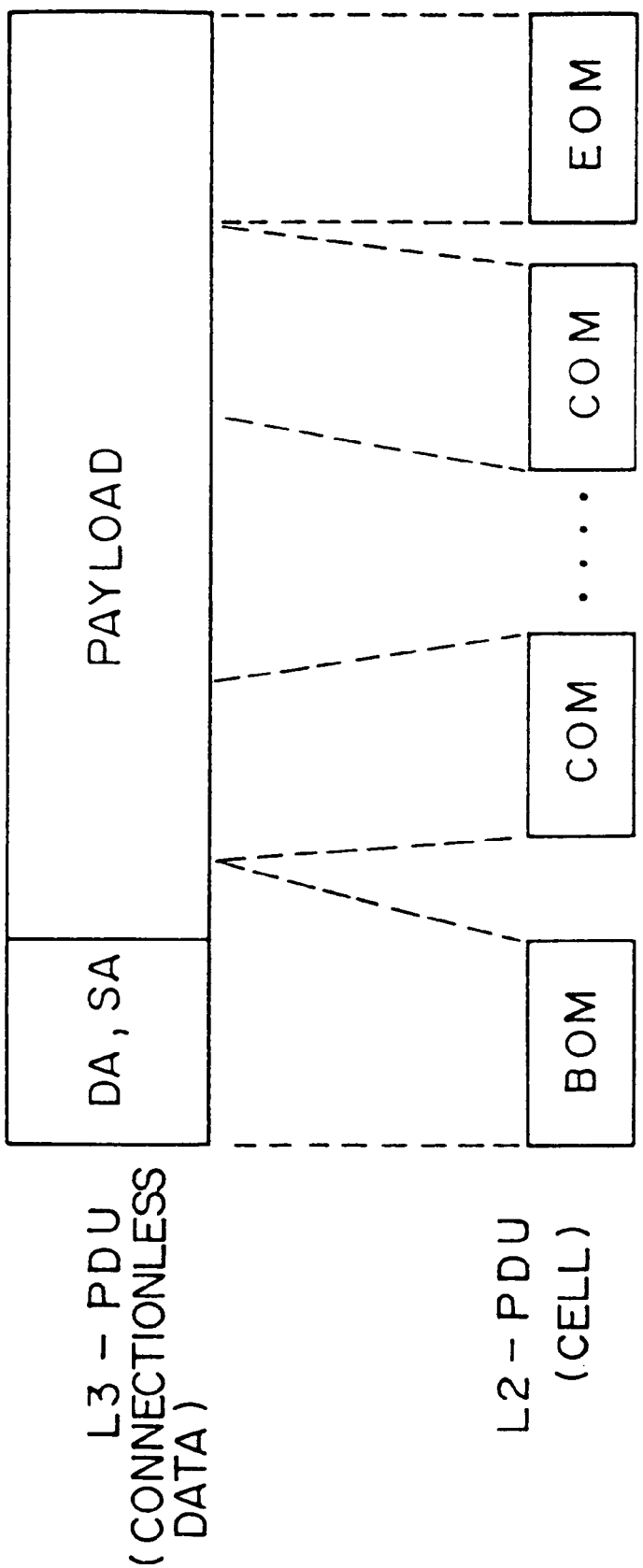
FIG. 1 is a conventional data format showing the conversion between variable-length data and fixed-length data in the SMDS.
Figure 2:
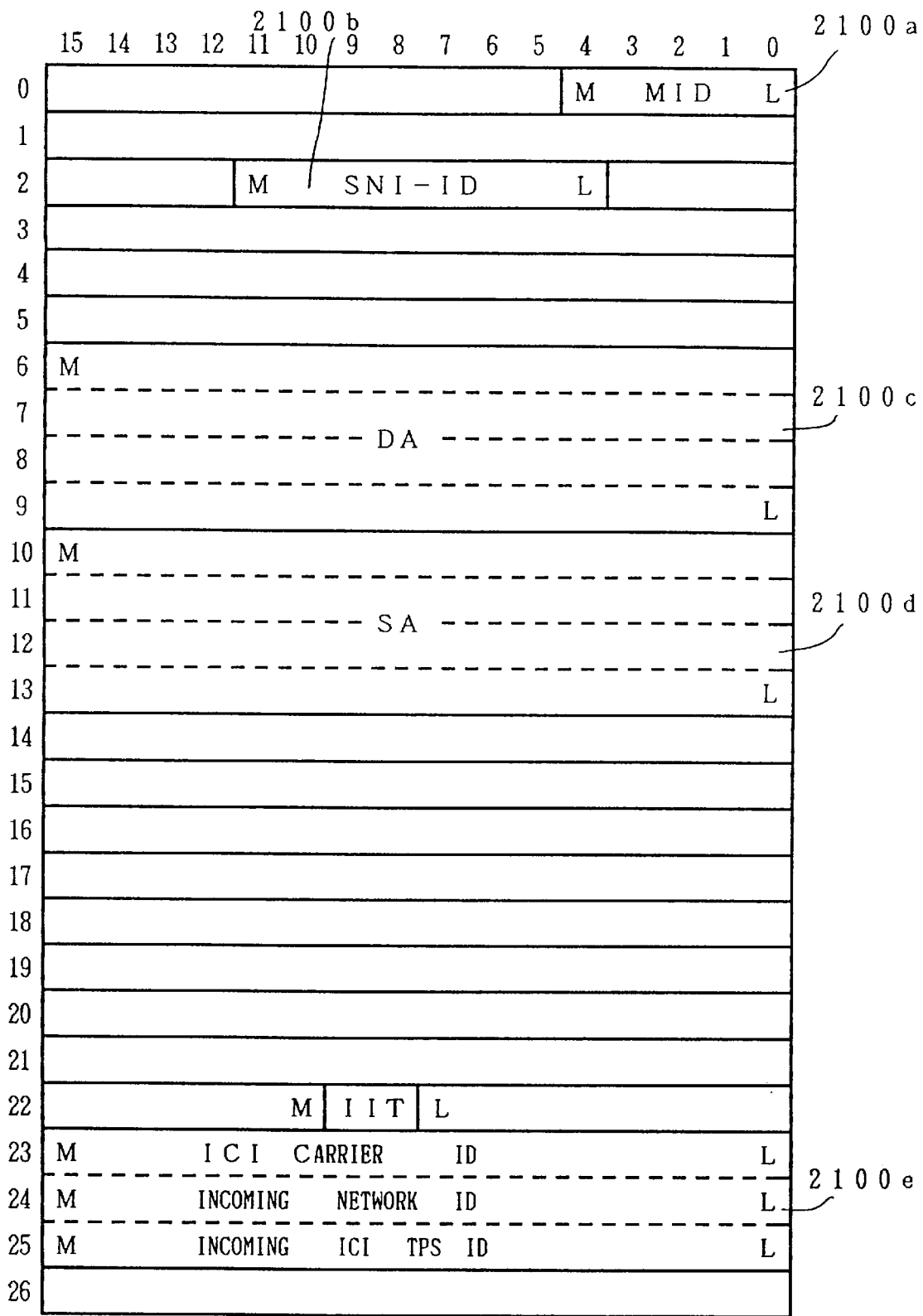
FIG. 2 is a conventional data format of a fixed-length cell.

A line interface device 8011 inputs the data received from a subscriber to an ATM switch 8012, and transfers the data output from the ATM switch 8012 to a predetermined subscriber. If the line interface device 8011 processes the data in a format other than the format of the ATM cell, then it converts the format between the data and the ATM cell. For example, when it receives connectionless data, the data is converted (disassembled/assembled) as shown in FIG. 1. According to the routing information added to each cell, the ATM switch 8012 outputs a cell to a predetermined destination. Signal devices 8013 and 8014 control the transmission of information between the ATM switch 8012 and coprocessors 8017 and 8018.

A main processor 8015 is provided for the ATM switch 8012 and generally manages the ATM switch 8012, coprocessors 8016 through 8018, signal devices 8013 and 8014, and SMDS processing device 8020 to manage the band, monitor a fault, and gives instructions to set each device. The coprocessor 8016 transmits initialization information and station data to the SMDS processing device 8020 while transmitting information to and from the main processor 8015. It also notifies the main processor 8015 of any fault of the SMDS processing device 8020. The SMDS processing device 8020 processes the communications between SMDS subscribers. The configuration and function of the SMDS processing device 8020 are described later.

Figure 9:
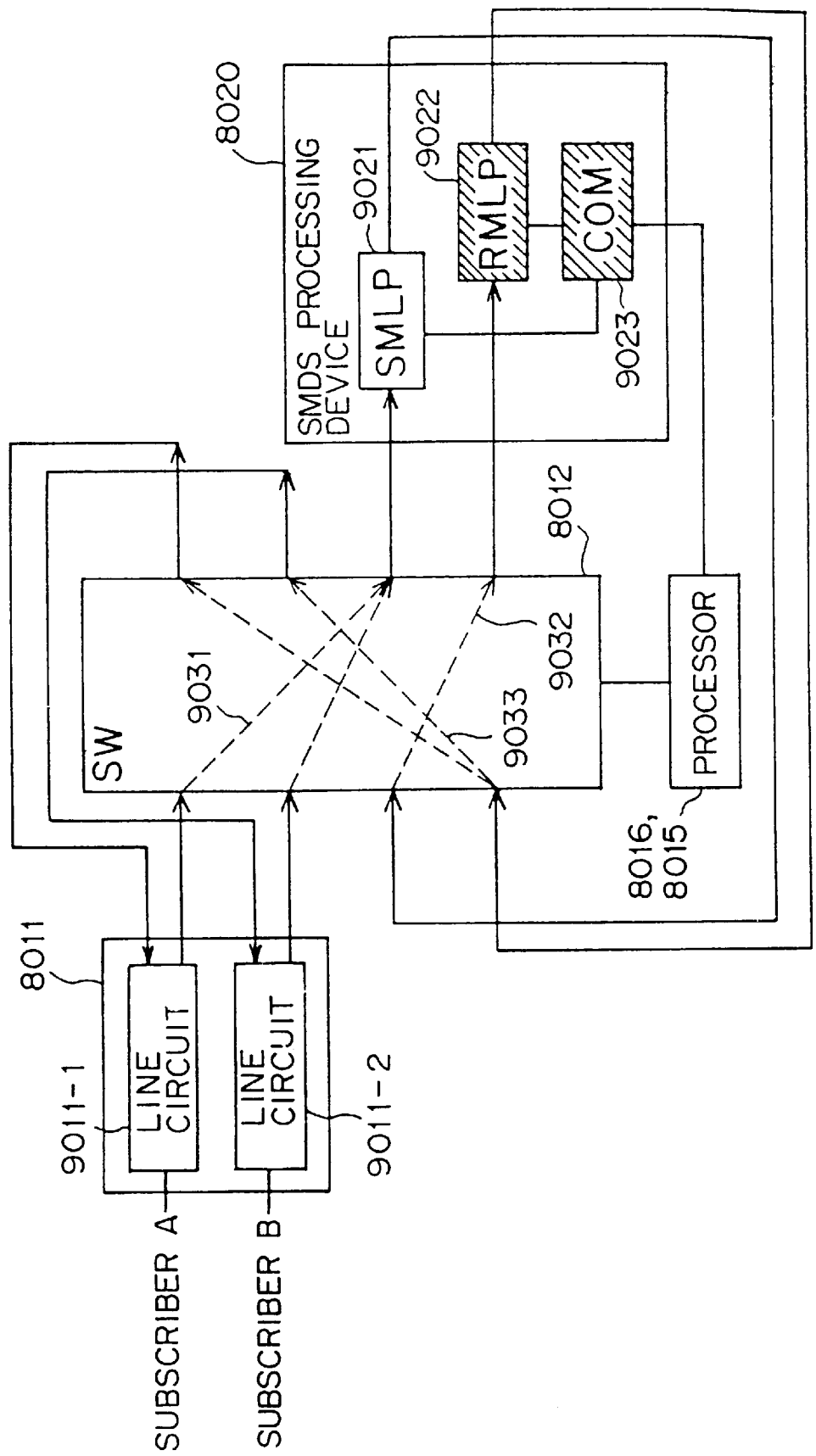
FIG. 9 is a block diagram of the configuration of the data transfer system between the SMDS subscribers.

FIG. 9 shows the configuration of the data transmission system between SMDS subscribers. In this system, connectionless data is transferred from the SMDS subscriber A accommodated by a line circuit 9011-1 to an SMDS subscriber B accommodated by a line circuit 9011-2.

When data is transferred from subscriber A to subscriber B, the address of subscriber B is set in the terminal unit of subscriber A as the destination address DA of the data, and the address of subscriber A is set as the source address SA. Then, the data is transferred to a line interface device 8011. As shown in FIG. 8, the line interface device 8011 disassembles the connectionless data into cell-formatted data, and outputs the cells to the ATM switch 8012 after assigning, to the cell, the identification information (VPI/VCI) specifying a PVC (fixed path or semi-fixed path) 9031 set between the line circuit 9011-1 and the SMDS processing device 8020. At this time, the destination address DA and source address SA are stored in the BOM (leading cell), and the data length information indicating the size of the connectionless data is stored in the EOM (trailing cell).

A transmitting line unit (SMLP) 9021 receives a cell transferred from the line interface device 8011 through the PVC 9031. According to the destination address DA stored in the BOM, it retrieves a route to the SMDS processing device accommodating subscriber B (the SMDS processing device 8020 in FIG. 9, and Subscribers A and B are accommodated in the SMDS processing device 8020). Then, it outputs each cell again to the ATM switch 8012 after assigning, to each cell, the identification information specifying a PVC 9032 set to the SMDS processing device accommodating subscriber B.

A receiving line unit (RMLP) 9022 receives cells transferred from the transmitting line unit 9021 through the PVC 9032, and fetches the cells according to the destination address DA when accommodating the destination subscriber (subscriber B). Then, it assigns to the cells the identification information specifying a PVC 9033 set between the SMDS processing device 8020 and the line circuit 9011-2 accommodating subscriber B, and outputs the cells to the ATM switch 8012. When the line interface device 8011 receives a cell from the receiving line unit 9022 through the PVC 9033, it assembles connectionless data and transfers it to subscriber B.

The process of the above described SMDS processing device 8020 is controlled by both the common unit (COM) 9023 provided in the SMDS processing device 8020 and the coprocessors 8016 and 8015 (coprocessor 8016 and main processor 8015).

The accounting process in transferring data is performed on the receiving side. That is, the process is performed by the receiving line unit 9022 and common unit 9023 (indicated by diagonal lines) of the SMDS processing device 8020 accommodating the destination subscriber B.

Figure 10:
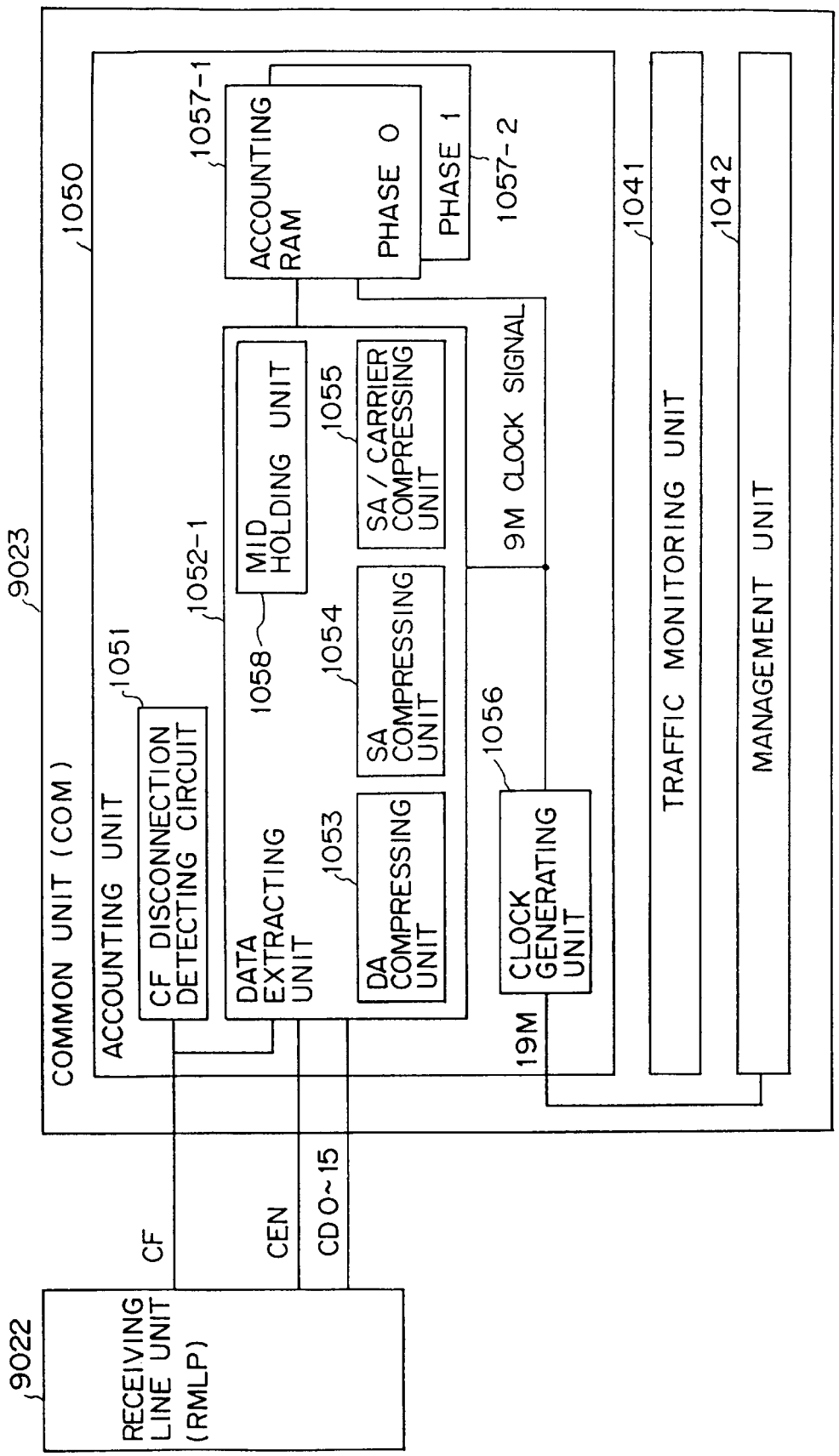
FIG. 10 is a block diagram of the configuration of the common unit for showing the accounting unit in detail.

FIG. 10 shows a block diagram of the configuration of the common unit 9023 for showing the accounting unit in detail, that is, an important part of the data transfer accounting device.

When the receiving line unit 9022 receives a cell from the ATM switch 8012, it generates a cell frame signal CF having pulses at the timing synchronous with the cell data and transfers the signal to the common unit 9023. At this time, since cells can be transferred at predetermined intervals with valid and invalid cells processed together, the receiving line unit 9022 outputs, upon receipt of a cell, a cell frame signal CF having pulses at predetermined intervals through the ATM network for the SMDS.

The receiving line unit 9022 generates a cell enable signal CEN indicating whether the cell received from the ATM switch 8012 is a valid cell or an invalid cell. Practically, if a subscriber accommodates the destination address DA in the cells storing actual transfer data (except vacant cells or erroneous cells), then the cells are recognized as valid cells. The receiving line unit 9022 transfers in parallel the cell frame signal CF and cell enable signal CEN to the common unit 9023 in synchronization with the cell data.

The common unit 9023 comprises a traffic monitoring unit 1041, a management unit 1042, and an accounting unit 1050. The traffic monitoring unit 1041 collects and monitors the traffic information of the cells detected by the transmitting line unit 9021 or the receiving line unit 9022. The accounting unit 1050 collects accounting information and aggregates the information at predetermined intervals. The management unit 1042 notifies a call control processor of the collected information. The management unit 1042 generates a clock signal for use in the common unit 9023.

The accounting unit 1050 comprises a CF disconnection detecting circuit 1051, a data extracting unit 1052, a clock generating unit 1056, and accounting RAM 1057-1 and 1057-2. The CF disconnection detecting circuit 1051 is described later.

The data extracting unit 1052 recognizes the delimiter in the cell data CD0-15 according to the cell frame signal CF received from the receiving line unit 9022, and recognizes the status (BOM, COM, and EOM) of each cell. According to the BOM (leading cell), the destination address DA, source address SA, and carrier information are extracted. The extracted information is compressed using a DA compressing unit 1053, an SA compressing unit 1054, and an SA/carrier compressing unit 1055. The compressing process is not described in detail here because it has nothing directly to do with the data transfer accounting device. Upon receipt of the EOM (trailing cell), the number of L3-PDUs is counted, and the number of L2-PDUs is counted according to the data length information stored in the EOM. The data are stored in the accounting RAM 1057-1 and 1057-2. The clock generating unit 1056 generates a 9 MHz clock signal from the clock signal generated by the management unit 1042. The accounting RAM 1057-1 and 1057-2 are provided with two memories having equal capacity, and are switched between each other at predetermined times. In switching the RAMS, the accounting information data stored in the accounting RAM 1057-1 and 1057-2 are provided to the coprocessors 8016 and 8015 (or the processor reads the data). When an MID holding unit 1058 receives a BOM, it stored the identifier MID of the BOM, and holds the identifier until the MID holding unit 1058 receives again an EOM having the same identifier MID. As described later, an identifier MID is assigned to each cell when a piece of connectionless data is divided into a plurality of cells.

Figure 11:
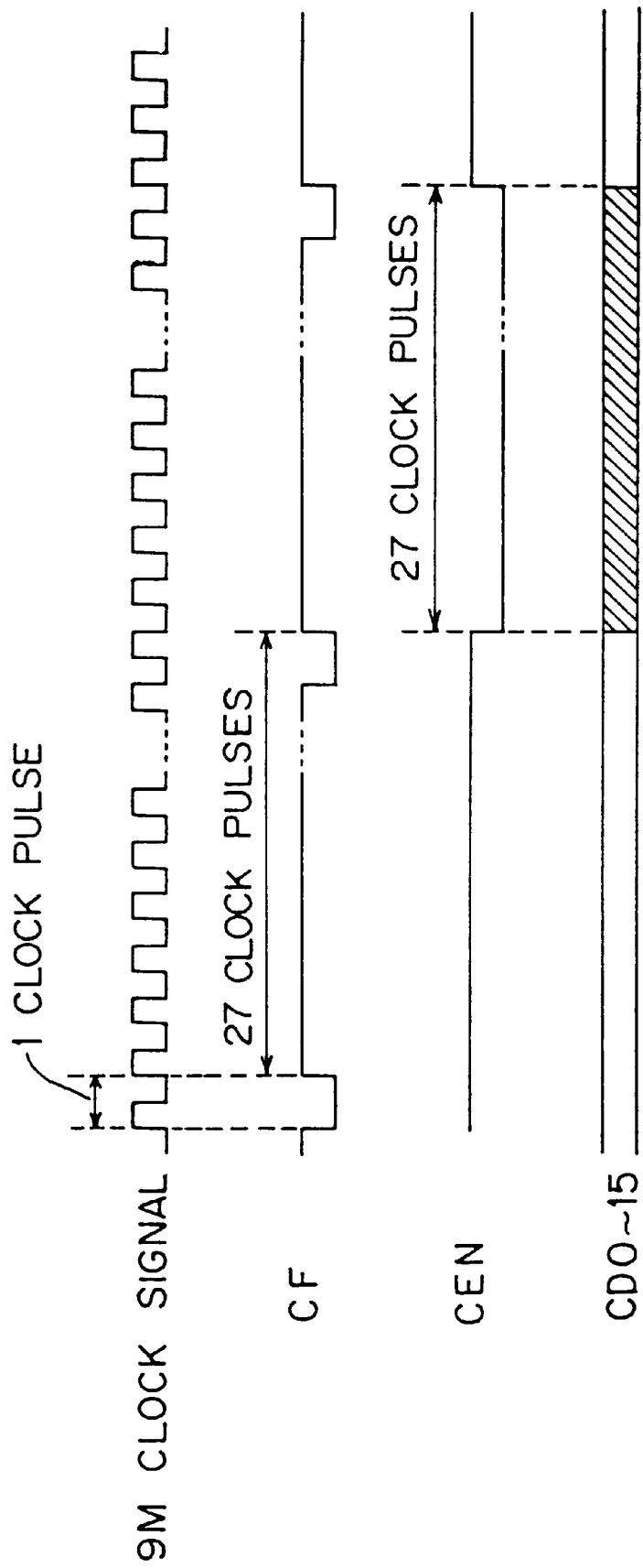
FIG. 11 is a timing chart of the signal and clock input to the common unit.

FIG. 11 is a timing chart for the signal and clock input to the common unit 9023.

The cell frame signal CF, cell enable signal CEN, and cell data CD are synchronized with each other. The cell frame signal CF has the pulse of an low(L) level at the head of each cell. The cell enable signal CEN is assigned an L level for a valid cell (indicated by diagonal lines in FIG. 11), and a high(H) level for an invalid cell. A pulse is generated at the starting position of the cell frame signal CF regardless of the validity of an input cell.

In the accounting unit 1050, each cell is processed for 27 clock cycles in synchronism with a 9-MHz clock signal. Therefore, pulses are generated for 27 clock cycles for the cell frame signal CF. The cell enable signal CEN is set to the L level for 27 clock cycles for a valid cell.

Figure 12:
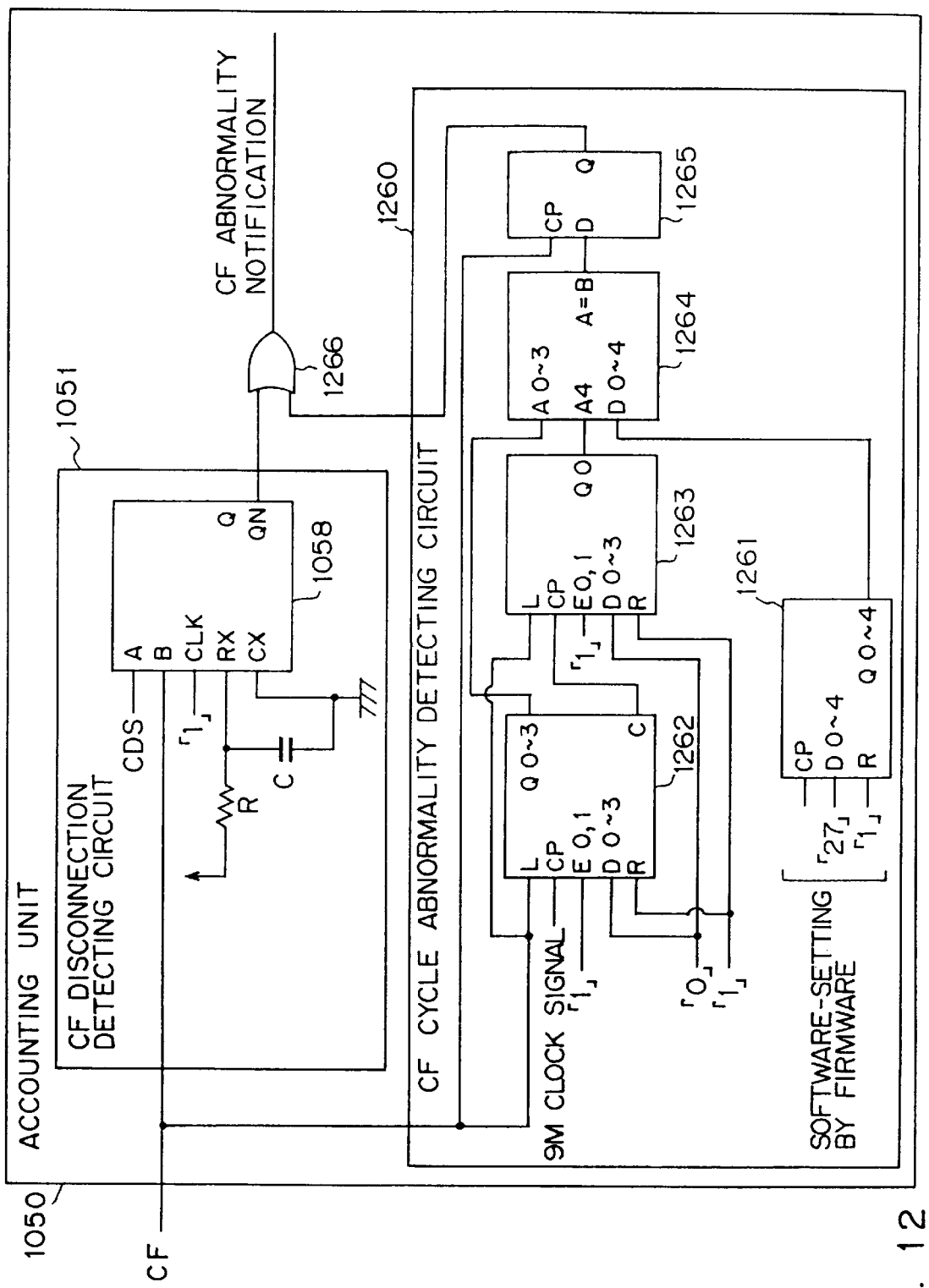
FIG. 12 shows the configuration of the third aspect of the present invention for the data transfer accounting device.

FIG. 12 shows the configuration according to the third aspect of the data transfer accounting device. According to the embodiment shown in FIG. 10, the accounting unit 1050 comprises the CF disconnection detecting circuit 1051 and a CF period abnormality detecting circuit 1260 to check the normality of the cell frame signal CF.

The CF disconnection detecting circuit 1051 comprises a one-shot pulse generating circuit 1058. The one-shot pulse generating circuit 1058 outputs a pulse whose width is determined based on the constants of a resistance R and a capacitance C when an input of a leading edge or trailing edge is detected. In this example, the resistance R and capacitance C are determined in such a way that the width of an output pulse refers to a time for 30 periods (30 clock pulses) of the above described 9-MHz clock signal. Each time an input of the leading or trailing edge is detected, L pulses for 30 clock cycles are output.

When the pulse of the cell frame signal CF is input to the CF disconnection detecting circuit 1051, the one-shot pulse generating circuit 1058 detects the leading edge and outputs L pulses for 30 clock cycles. Therefore, since the pulse of the cell frame signal CF is generated at predetermined intervals (27 clock cycles) in the normal condition, the output of the one-shot pulse generating circuit 1058 is constantly at the L level.

However, if the output of the one-shot pulse generating circuit 1058 turns to the H level when the pulse of the cell frame signal CF is not detected for 30 clock cycles or longer due to the occurrence of a fault in the receiving line unit 9022, then the output of the one-shot pulse generating circuit 1058 changes to the H level. Thus, when a CF disconnection detecting circuit 1051 detects a disconnection state of the cell frame signal CF, it changes the output to the H level.

The CF period abnormality detecting circuit 1260 comprises a period storage memory 1261, counters 1262 and 1263, a comparing circuit 1264, and a flipflop 1265. The period storage memory 1261 is set to 27 cycles by the firmware of the accounting unit 1050 based on that the pulse is generated on a 27-clock periods.

The counters 1262 and 1263 are 4-bit counters and receive a cell frame signal CF at each load terminal L. Upon receipt of the pulse of the cell frame signal CF, the counters 1262 and 1263 read the value 0 set in the data terminal D. That is, the count value is reset. The above described 9-MHz clock signal is input to the clock terminal CP of the counter 1262, and the clock keeps count of the number of signals. A carry pulse is output when the counter counts 16. The carry pulse is input to the clock terminal CP of the counter 1263, and the count value of the counter 1263 is incremented. That is, the counter 1263 counts the higher order bit of the counter 1262. Although two 4-bit counters are used in the present embodiment, one counter of a larger number of bits can be a substituted.

The comparing circuit 1264 compares the value set in the period storage memory 1261 with the count value output by the counters 1262 and 1263. If the comparison indicates a non-matching result, the comparing circuit 1264 outputs the H level. If the comparison indicates a matching result, then the comparing circuit 1264 outputs the L level. That is, since 27 cycles is set in the period storage memory 1261, the comparing circuit 1264 outputs L when the count value of the counters 1262 and 1263 are 27.

The flipflop 1265 receives an output signal from the comparing circuit 1264 at the data terminal D. The clock terminal CP receives the cell frame signal CF. Accordingly, the flipflop 1265 outputs to an OR circuit 1266 the output signal from the comparing circuit 1264 at the input of the pulse of the cell frame signal CF.

When the cell frame signal CF is in a normal state, the counters 1262 and 1263 repeat the operation of resetting the count value by the pulse of the cell frame signal CF after counting 27 periods. That is, when the pulse of the cell frame signal CF is input, the count value of the counters 1262 and 1263 are 27, and the comparing circuit 1264 outputs L. At this time, the flipflop 1265 (a CF period abnormality detecting circuit 1260) outputs the L level at the cell frame signal CF of the clock terminal CP of the flipflop 1265.

If the pulses of the cell frame signal CF cannot be generated at the original intervals due to the occurrence of a fault in the receiving line unit 9022, then the CF period abnormality detecting circuit 1260 outputs the H level. That is, the pulses of the cell frame signal CF are generated at shorter intervals. For example, since the count value of the counters 1262 and 1263 are reset when they count to 26, the comparison by the comparing circuit 1264 does not indicate a matching result when the next pulse is input at 26 clock periods. Therefore, the counter 1263 does not indicate the L level, but keeps outputting the H level. At this time, since the flipflop 1265 receives a pulse at 26 clock periods as described above, the CF period abnormality detecting circuit 1260 outputs the H level. If the interval of generating the pulses of the cell frame signal CF becomes longer, for example, if the next pulse is input at 28 clock cycles, the count value of the counters 1262 and 1263 are reset after they count to 28. Therefore, the output of the comparing circuit 1264 indicates the H level at 28 clock periods after once indicating the L level at 27 clock periods. Since the flipflop 1265 reads the H level as the output of the comparing circuit 1264 at 28 clock periods, the output of the CF period abnormality detecting circuit 1260 also indicates the H level.

Thus, the CF period abnormality detecting circuit 1260 charges its output to the H level when it detects the change in period of the cell frame signal CF.

The outputs of the CF disconnection detecting circuit 1051 and CF period abnormality detecting circuit 1260 are input to the OR circuit 1266. Therefore, when at least one of a CF disconnection detecting circuit 1051 and the CF period abnormality detecting circuit 1260 detects an abnormal condition, the output of the OR circuit 1266 indicates the H level, thus issuing a CF abnormal state notification in the accounting unit 1050. The outputs of the CF disconnection detecting circuit 1051 and CF period abnormality detecting circuit 1260 can be independent abnormal state notification signals without the OR circuit 1266.

As described above, the cell frame signal CF is used to recognize the delimiter of the cell data in the accounting unit 1050, and is also used as a refresh signal for a DRAM used as an accounting RAM. Therefore, if the period of the pulse of the signal is changed, the accounting process may not be correctly performed. According to the first embodiment of the data transfer accounting device, the reliability can be improved by preventing the accounting process from being incorrectly performed when the period of the pulse of the cell frame signal CF changes.

Figure 13:
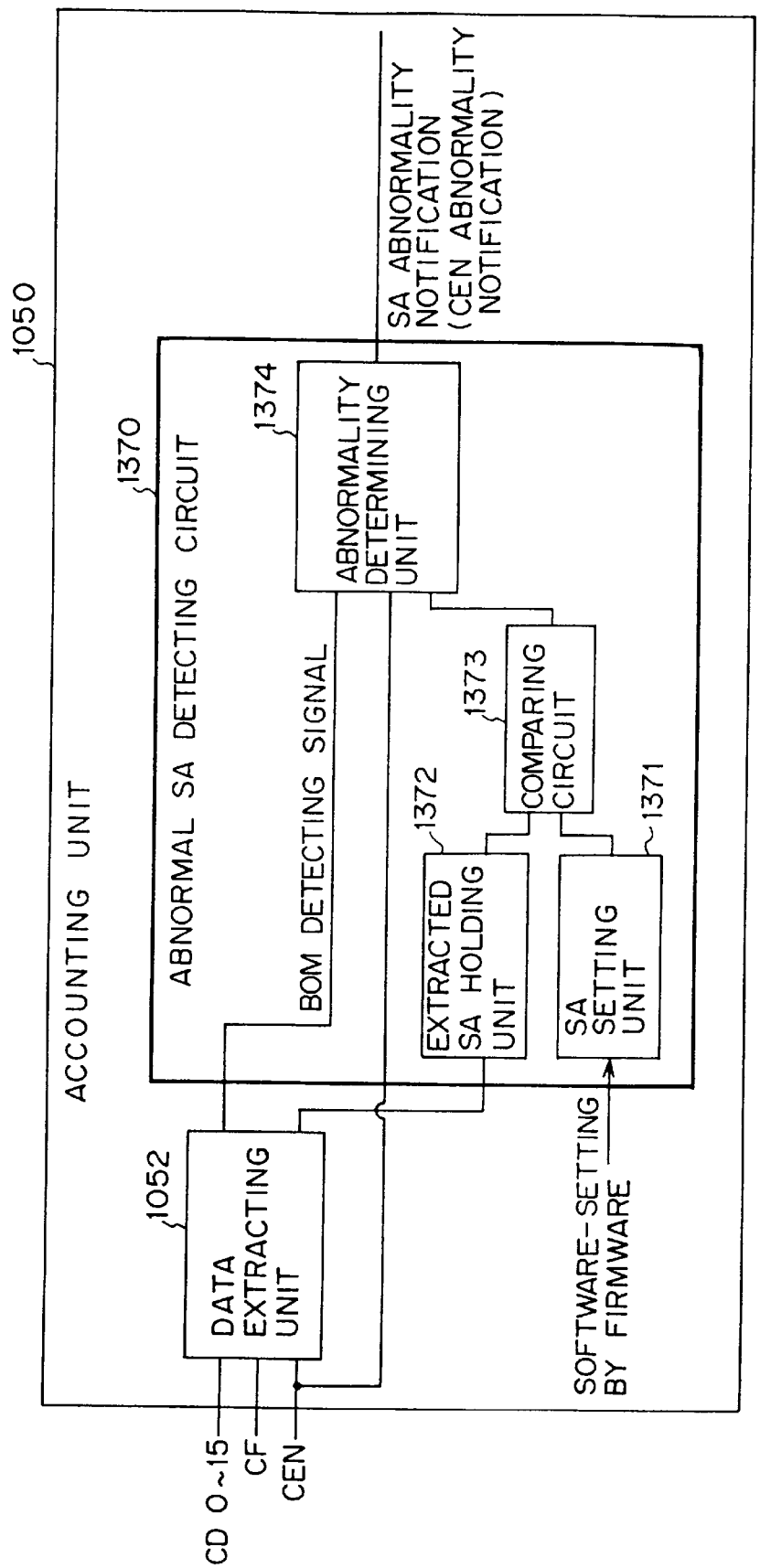
FIG. 13 shows the configuration of the fourth aspect of the present invention for the data transfer accounting device.

FIG. 13 shows the configuration according to the fourth embodiment of the data transfer accounting device. According to the fourth embodiment, the accounting unit 1050 comprises an abnormal SA detecting circuit 1370 to enhance the reliability of the accounting process in consideration of the case where an abnormal condition arises in the cell frame signal CF. The abnormal SA detecting circuit 1370 comprises an SA setting unit 1371, an extracted SA holding unit 1372, a comparing circuit 1373, and an abnormality determining unit 1374.

The SA setting unit 1371 stores an estimated value of the source address SA software-set by the firmware of the accounting unit 1050. The extracted SA holding unit 1372 stores a source address SA (stored in the leading cell BOM) extracted from an input cell by a data extracting unit 1052. The comparing circuit 1373 compares the two source address SA stored in the SA setting unit 1371 and extracted SA holding unit 1372, and the comparison result is provided for the abnormality determining unit 1374. The abnormality determining unit 1374 receives a BOM detection signal from the data extracting unit 1052 together with the cell frame signal CF and the cell enable signal CEN. When the abnormality determining unit 1374 recognizes according to the detection signal that a BOM (leading cell) is entered, the abnormality determining unit 1374 determines an abnormal SA based on the comparison result obtained by the comparing circuit 1373.

Figure 14A:
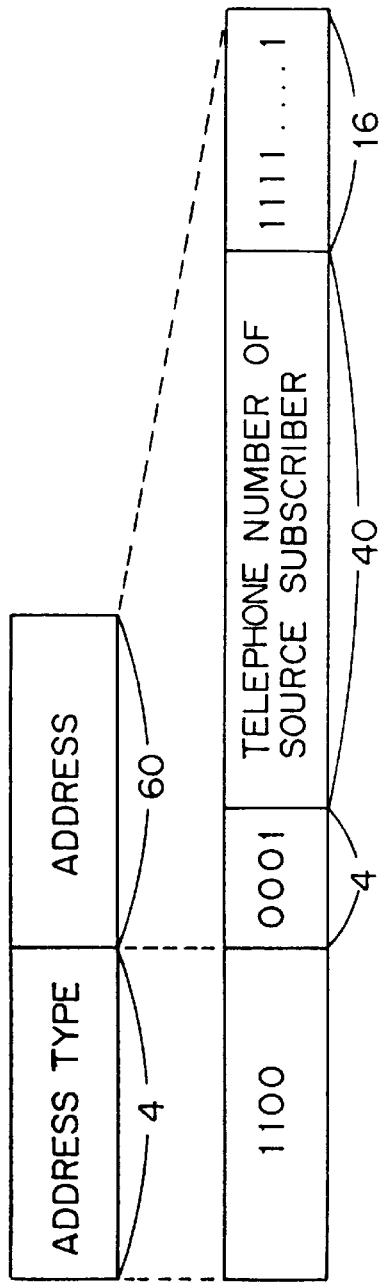
FIG. 14A shows a data format of the source address SA.

The format of the source address SA in the SMDS is described below by referring to FIG. 14A. The source address SA of the SMDS is 64-bit information comprising 4-bit address type and 60-bit address. The address type is set to 1100 in all SMDS data communications. The leading 4 bits of the address are set to 0001 in all SMDS data communications. The leading 4 bits are followed by a 40-bit actual address corresponding to the telephone number of the source subscriber, and trailing 16 bits all of which are fixed to 1.

Since the leading 8 bits and trailing 16 bits of the source address SA of the SMDS are set to fixed value, the leading 8 bits and trailing 16 bits can be estimated on the receiving side. Therefore, the leading 8 bits or trailing 16 bits are prepared on the receiving side for comparison with the corresponding bit of the source address SA extracted from the transfer data. Thus, it can be checked whether or not the data has been normally transferred.

In FIG. 13, "11000001" is set in the SA setting unit 1371 as an estimated value for the 8 higher order bits of the source address SA based on the format of the source address SA. The data extracting unit 1052 extracts the source address SA in the BOM (leading cell) of input data, and transfers it to the extracted SA holding unit 1372. The comparing circuit 1373 compares the 8 higher order bits estimated value for the source address SA set in the SA setting unit 1371 with the 8-higher-order-bit estimated value for the source address SA stored in the extracted SA holding unit 1372, and notifies the abnormality determining unit 1374 of the comparison result (matching or non-matching). If the comparison indicates a matching result, it refers to a normal transfer. If the comparison indicates a non-matching result, it refers to an abnormal data transfer.

The abnormal condition of the cell enable signal CEN can be one of the following two states. The first abnormal state is a fault for which the cell enable signal CEN is at the L level indicating the input of a valid cell even if no valid cell is entered. In this case, the communications fee may be charged to a wrong subscriber by receiving the wrong cell enable signal CEN in the accounting process. The second abnormal state is, contrary to the first abnormal state, a fault for which the cell enable signal CEN is at the H level indicating the input of an invalid cell even if a valid cell has been actually input. In this case, the fee may not be charged to the subscriber who actually transferred the data. To detect such abnormal states, the circuit shown in FIG. 15 is provided in the abnormality determining unit 1374.

Figure 15:
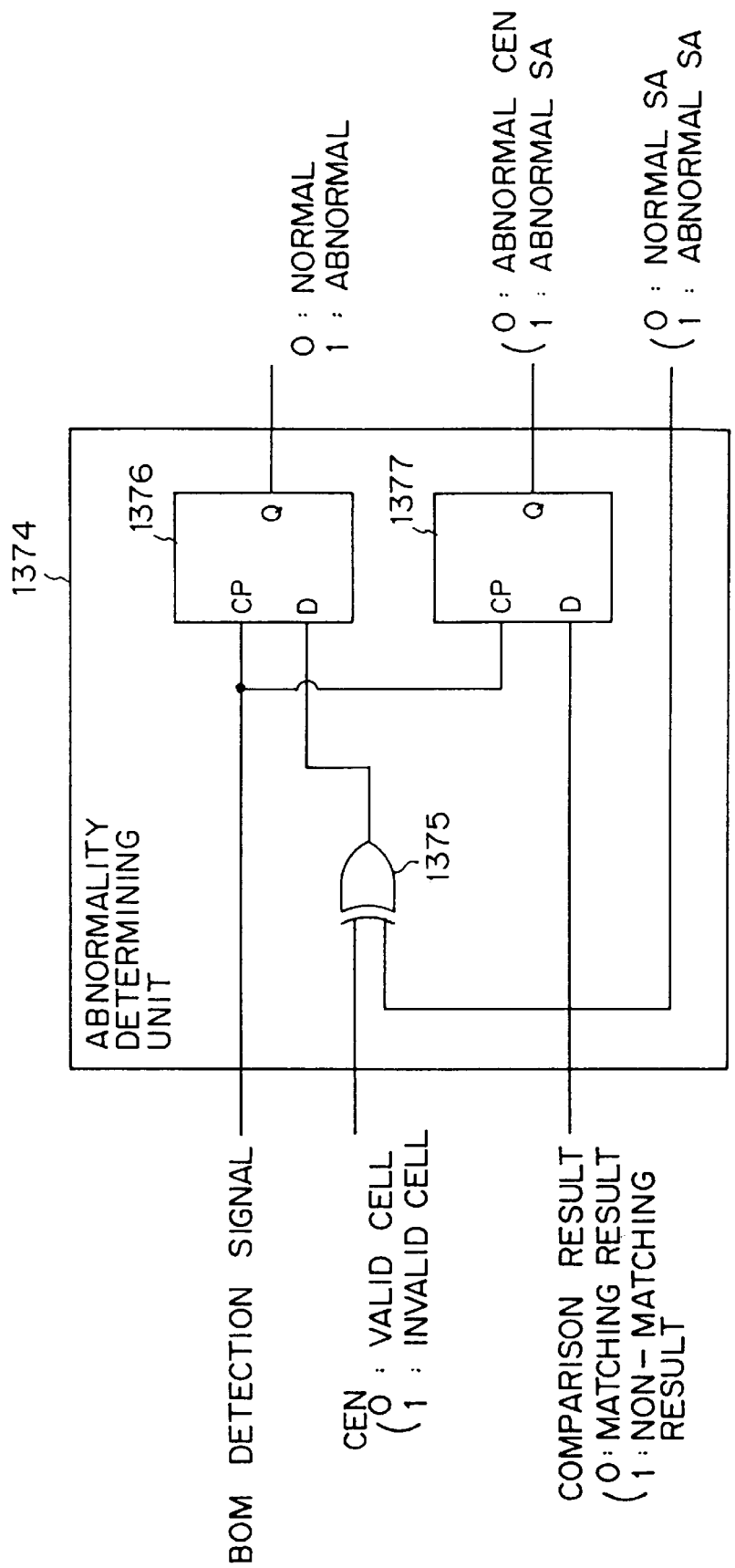
FIG. 15 shows the principal circuit of the abnormality determining unit shown in FIG. 13.

FIG. 15 shows the principle circuit of the abnormality determining unit 1374. In FIG. 15, the exclusive OR circuit 1575 receives a comparison result signal from the comparing circuit 1373. The comparison result signal indicates 0 when the comparing circuit 1373 outputs a matching result, and indicates 1 when the comparing circuit 1373 outputs a non-matching result. A BOM detection signal is input to the clock terminals CP of flipflops 1576 and 1577. The flipflop 1576 receives the output data of the exclusive OR circuit 1575 in synchronism with the input of the BOM (leading cell). The flipflop 1577 receives the comparison result signal in synchronism with the input of the BOM.

In the normal state with the configuration, the cell enable signal CEN is 0 indicating a valid cell when a BOM (leading cell) is input in the normal state. Since the 8 higher order bits of the source address SA stored in the BOM match the 8 higher order bits of the source address SA stored in the SA setting unit 1371, the comparison result signal also indicates 0. Therefore, the output of the exclusive OR circuit 1375 is 0, and the output of the flipflop 1376 is also 0 (normality). When the above described BOM is followed by a COM (intermediate cell) and an EOM (last cell), the cells are processed in the accounting process.

Thus, the accounting unit 1050 according to the second embodiment does not perform an accounting process only when the cell enable signal CEN indicates a valid cell, but actually performs the accounting process on a message to which the BOM belong when the cell enable signal CEN indicates a valid cell and the 8 higher order bits of the source address SA of the transfer data stored in the BOM match a predetermined estimated value. The message to which the BOM belongs refers to, for example, a piece of connectionless data as shown in FIG. 1. The source address SA, destination address DA, carrier information, data length information, etc. stored in the cells obtained by dividing the connectionless data are collected and aggregated. The process is performed by the data extracting unit 1052 when the output of the flipflop 1376 is 0 (indicating normality).

When a piece of connectionless data is divided into a plurality of cells, a common identifier MID (message identifier) is assigned to each cell as a connectionless data ID. Upon receipt of the BOM, the accounting unit 1050 extracts the accounting information stored in the BOM and holds the assigned identifier MID when the cell enable signal CEN indicates a valid cell and when the 8 higher order bits of the source address SA stored in the BOM matches an estimated value. Then, it retrieves the accounting information as necessary when it receives a COM and an EOM assigned the same identifier MID. Thus, the accounting process is performed on each piece of connectionless data, that is, an identifier MID.

Described below is the relationship between connectionless data and a cell, and a connectionless communications protocol.

The service provided according to each embodiment of the data transfer accounting device relates to an SMDS that transfers connectionless data communicated by LAN users through an ATM network. In the connectionless data communications, an AAL (ATM adaptation layer) type ¾ is used. The AAL type ¾ transfers data in various data communications where the data can be transferred at variable speeds and require no specific timing. The AAL type ¾ transfers the AAL-SDU (AAL service data unit) from one AAL-SAP to one or more AAL-SAPs through the ATM network. The AAL user (higher order layer) can select an AAL-SAP corresponding to the QOS such as delay, loss, etc. required in transmitting AAL-SDUs. Furthermore, setting a plurality of AAL connections for one ATM layer connection realizes multiplication in an adaptation layer.

Figure 16:
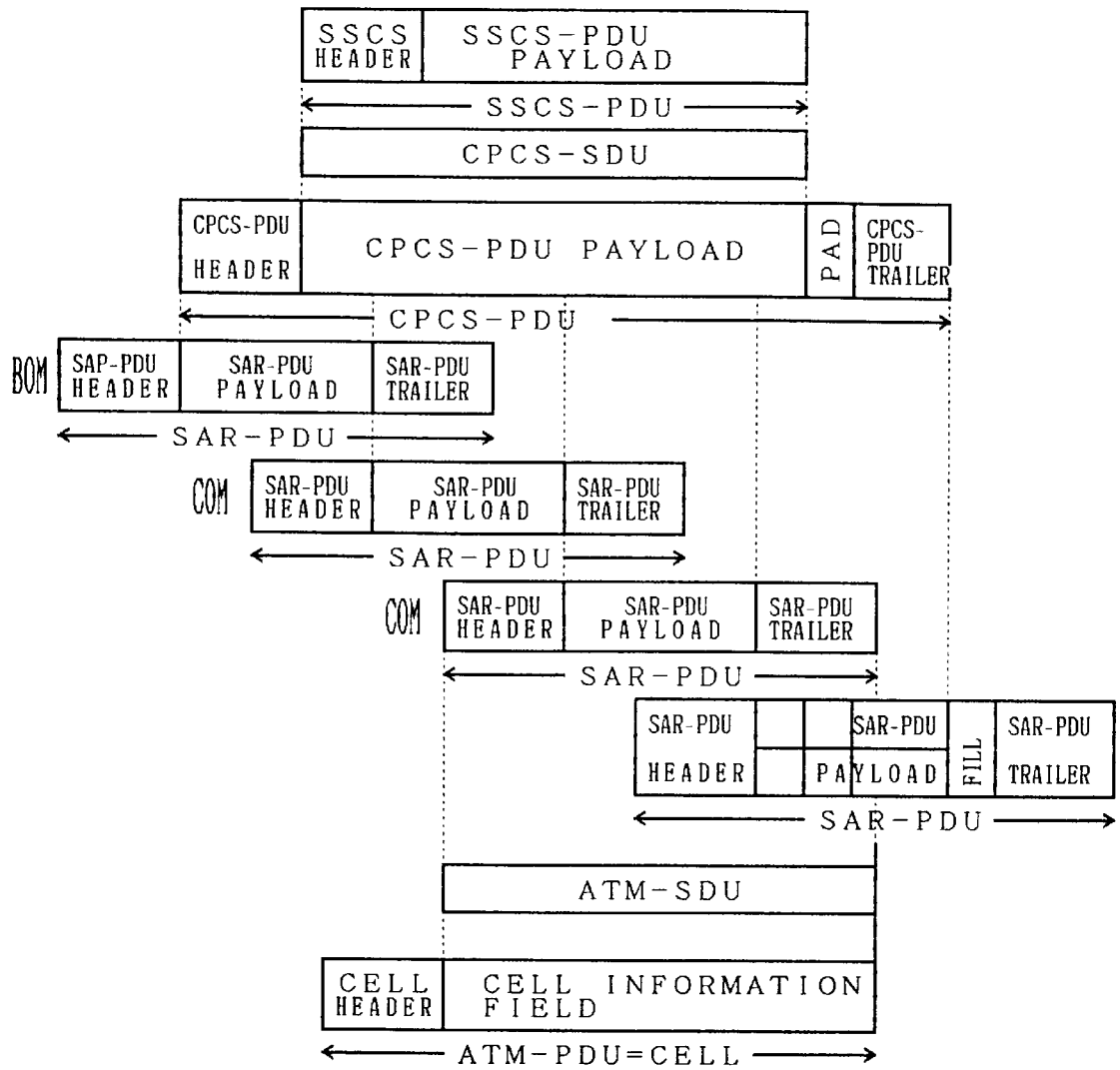
FIG. 16 shows data formats for the assembly/disassembly between connectionless data and cells.
Figure 17:
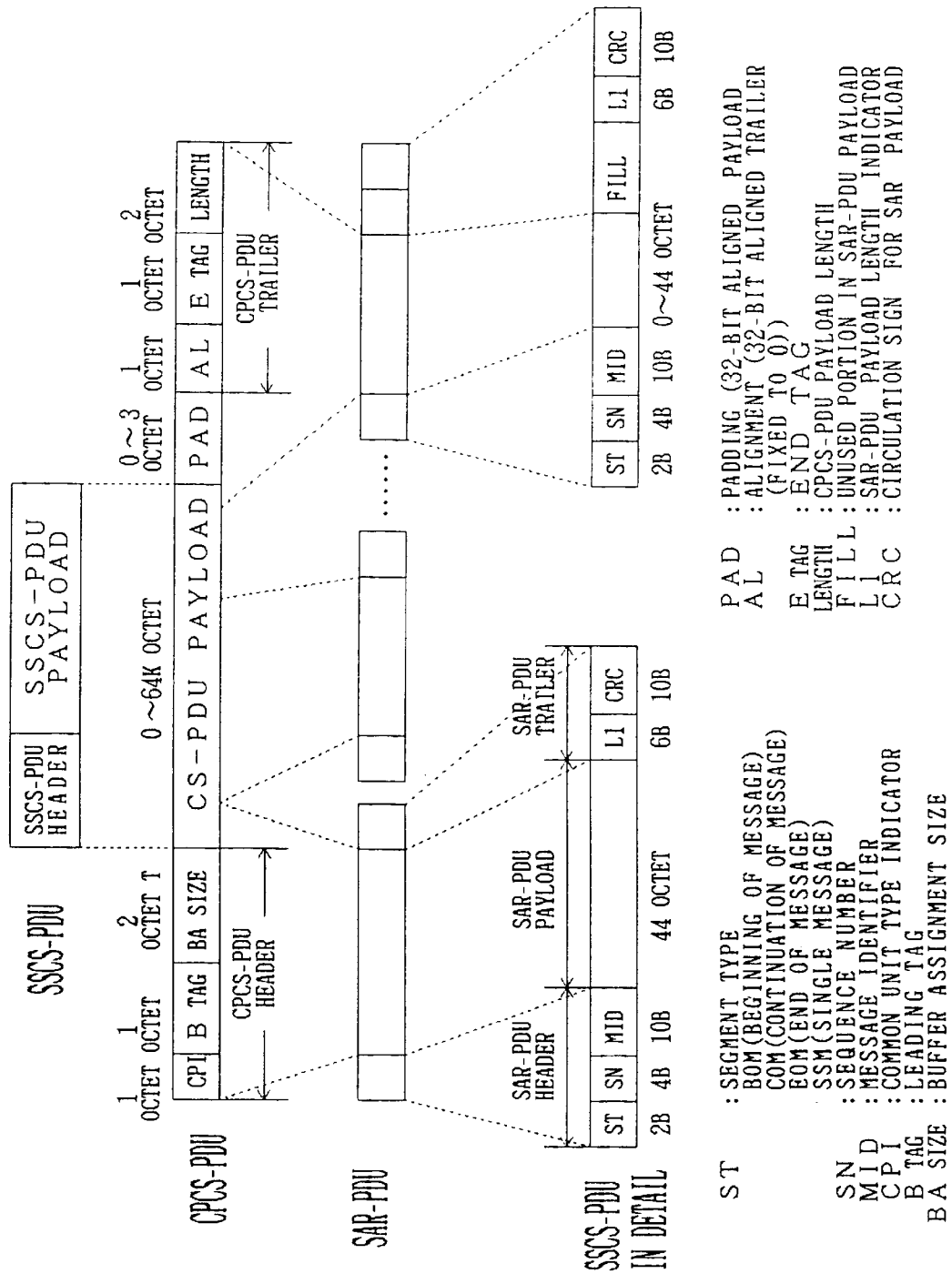
FIG. 17 shows data formats of connectionless data disassembled into cells.

The protocol of the AAL type ¾ has a 3-layer structure. FIG. 16 shows the relationship among the PDU (protocol data unit), header, and trailer in each layer. FIG. 17 shows the formats of three layers of the AAL type ¾ common unit.

Each cell (SAR-PDU in FIG. 16) indicates that it is a BOM, COM, EOM, or SSM by the segment type representation. As described above, the BOM, COM, and EOM are short for leading cell, intermediate cell, and trailing cell respectively. An SSM is short for a single segment message indicating that one piece of connectionless data is divided into the single cell. Using the indication of the SAR-PDU payload length, each cell is indicated with the number of octets forming the SAR-SDU information in the SAR-PDU payload.

In FIG. 16, the connectionless data according to the present embodiment corresponds to the data in the CPCS- PDU (CS common unit protocol data unit) or in the higher order layer. The data described as simply a cell in the present embodiment corresponds to the SAR-PDU (cell disassembly/assembly sublayer protocol data unit). The connectionless data (CPCS-PDU) is stored in the payload unit of the cell (SAR-PDU) after being disassembled into one or more cells. Each cell (SAR-PDU) is stored and transferred in the payload unit (ATM-SDU) of a payload cell in the ATM network.

When a piece of connectionless data (CPCS-PDU) is disassembled into one or more cells (SAR-PDUs), each cell is assigned the same MID (message identifier or multiplexed identifier). Using the MID, plural pieces of connectionless data (CPCS-PDUs) are multiplexed and demultiplexed in a single ATM connection. Through the above described function, a connectionless server of a cell interleave type can be realized.

The communications protocol of the connectionless data is described as follows. As a system of providing a connectionless data service through the B-ISDN, there are indirect and direct providing methods depending on the location of the connectionless service system, as in the communications in a local area network LAN. According to Recommendation I.364, the method and protocol for providing broadband connectionless data services through the B-ISDN are prescribed.

The capabilities of physical and ATM layers are the same as those in other communications systems and the cells are processed as ATM cells. The AAL type 3/4, which uses a message identifier MID, is adopted.

Considerably long messages are normally transferred in the communications using computers (inter-LAN communications). However, as shown in FIG. 17, the SAR-PDUs are obtained by dividing an SC-PDU into cells and are assigned the same MID. Therefore, different SC-PDUs can be distinguished from one another and multiplexed communications can be realized by cell-interleaving a plurality of SC-PDUs in a single ATM connection. Furthermore, providing pipeline capabilities in a streaming service mode enables a number of messages to be multiplexed with short delay by transferring the messages sequentially one after the other without waiting until an entire transfer message has been accumulated in each connectionless service capability (CLSF). That is, the cells are sequentially transferred when a part of a transfer message is accumulated in cell units.

A connectionless protocol in an adaptation layer (that is, AAL type 3/4 higher order protocol) is referred to as a connectionless network access protocol (CLNAP). This protocol is terminated by the connectionless service capabilities, and a routing process is performed by referring to the destination address and source address for each message.

Each of the protocols of the ATM layer, AAL type 3/4, and CLNAP corresponds to the layer of the media access control (MAC) in a LAN in an end-to-end protocol stack. It is different from the MAC in address and routing method. In the MAC of a LAN, the format of the media control can be a CSMA/CD, token ring, etc., but basically data is routed based on the MAC address specific to the device assigned to each node. On the other hand, according to the ATM layer, AAL type 3/4, and each protocol of the CLNAP, data is routed based on an ISDN number independent of the device (public network number according to Recommendation E.164). The entire network is viewed from the terminal unit as if it were a single broad area LAN.

The logical link control (LLC), which is a layer 2 protocol of a LAN, is adopted as a higher order layer of the CLNAP, and an LLC link is established between two terminal units (routers). That is, the B-ISDN network is processed as a single subnetwork in the LAN network. The routing protocol of a sending router does not process a packet to be transferred to the receiving LAN, but transfers an unprocessed packet as a capsule to THE B-ISDN network through the LLC. The subnetwork access protocol (SNAP) is a protocol for encapsulating data.

The protocol used in communications through the SMDS (as in DQDB) is almost equal to the above described B-ISDN protocol. Their protocol stacks do not correspond one to one, but the physical layer of the SMDS corresponds to the physical layer of the above described B-ISDN. The level 2 of the subscriber interface protocol SIP of the SMDS corresponds to the ATM layer and AAL type 3/4 SAR of the B-ISDN while the level 3 of the SIP of the SMDS corresponds to the AAL type 3/4 and CLNAP of the above described B-ISDN.

The SMDS is different from the B-IDSN (ATM) in the layer for transferring cells and slots. That is, the ATM controls the flow from a terminal unit to a network while the SMDS controls access to distributed media. Relating to the layer for a connectionless message transfer, the level 3 of the connectionless network access protocol (CLNAP) is basically the same as that of the SMDS subscriber interface protocol SIP.

Thus, the communications are prescribed by a protocol identical to that of the AAL type 3/4 in the SMDS. When connectionless data is transferred through the ATM network, it is identified from other connectionless data according to the MID added to each of the cells obtained by dividing the connectionless data. Using the MID, communications fees are charged for each piece of connectionless data.

In FIG. 15, when the first abnormal condition arises, the cell enable signal CEN indicates a valid signal, but no actual valid cell is input. Therefore, the data extracting unit 1052 cannot extract the source address SA, and the comparing circuit 1373 indicates a non-matching result. Accordingly, the abnormality determining unit 1374 receives 1 (indicating a non-matching result) from the comparing circuit 1373. That is, since the abnormality determining unit 1374 does not receive 0 (indicating a matching result) from the comparing circuit 1373, no accounting process is performed. Thus, when the first abnormal condition occurs, the cell enable signal CEN indicates a valid cell, but no BOM having the source address SA (whose 8 higher order bits are 11000001) is received. Therefore, no accounting process is performed, and no wrong accounting information is collected by performing the accounting process upon receipt of a wrong cell enable signal CEN. Then, the abnormality determining unit 1374 issues an SA abnormal state notification. The notification is transferred to the main processor 8015 through the coprocessor 8016.

If the second abnormal condition occurs and no error is found in the data transfer, then the 8 higher order bits of the source address SA stored in the received BOM matches the estimated value for the 8 higher order bits of the source address SA stored in the SA setting unit 1371. Therefore, the abnormality determining unit 1374 receives 0 (indicating a matching result) from the comparing circuit 1373. However, since the cell enable signal CEN indicates an invalid cell, the output from a flipflop 1376 is 1 (indicating an abnormal condition). The flipflop 1377 outputs the comparison result signal 0 as being received from a comparing circuit 1373. Therefore, the accounting unit 1050 can recognize the occurrence of an abnormal condition through the output from the flipflop 1376, and recognizes the type of the abnormal condition as an abnormal CEN through the output from the flipflop 1377. The abnormality determining unit 1374 issues a CEN abnormality notification. The notification is transferred to the main processor 8015 through the coprocessor 8016.

If the comparing circuit 1373 outputs a non-matching result when the cell enable signal CEN indicates an invalid cell, the output from the exclusive OR circuit 1375 is 0. However, since the 8 higher order bits of the source address SA extracted from the transfer data do not match those of an estimated source address SA, no accounting process is started and no fees are charged to a wrong account.

Figure 18:
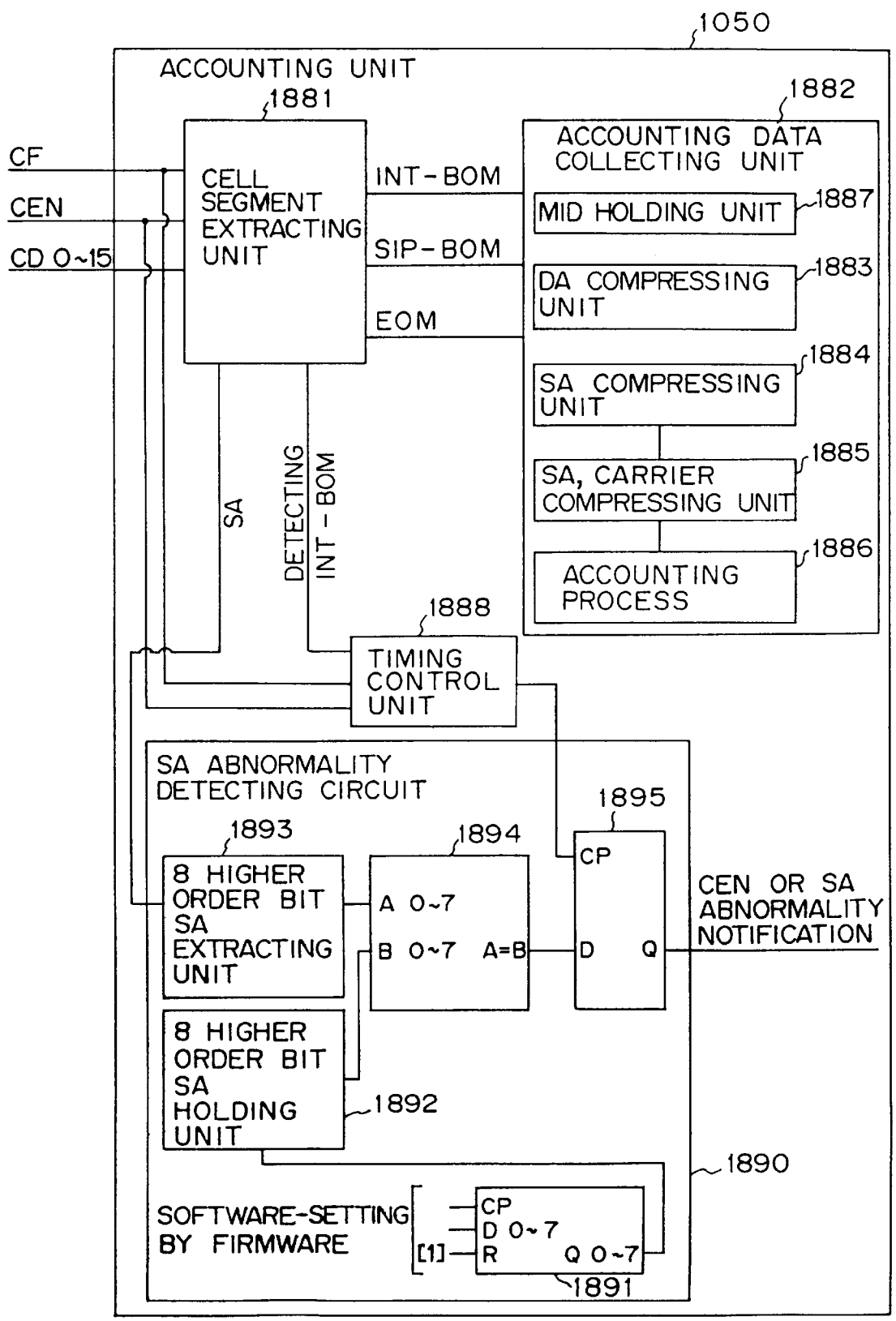
FIG. 18 shows another configuration of the fourth aspect of the present invention for the data transfer accounting device.

FIG. 18 shows another configuration of the fourth aspect of the present invention for the data transfer accounting device.

The configuration shown in FIG. 18 corresponds to the system in the format of an SMDS processing system.

Figure 19:
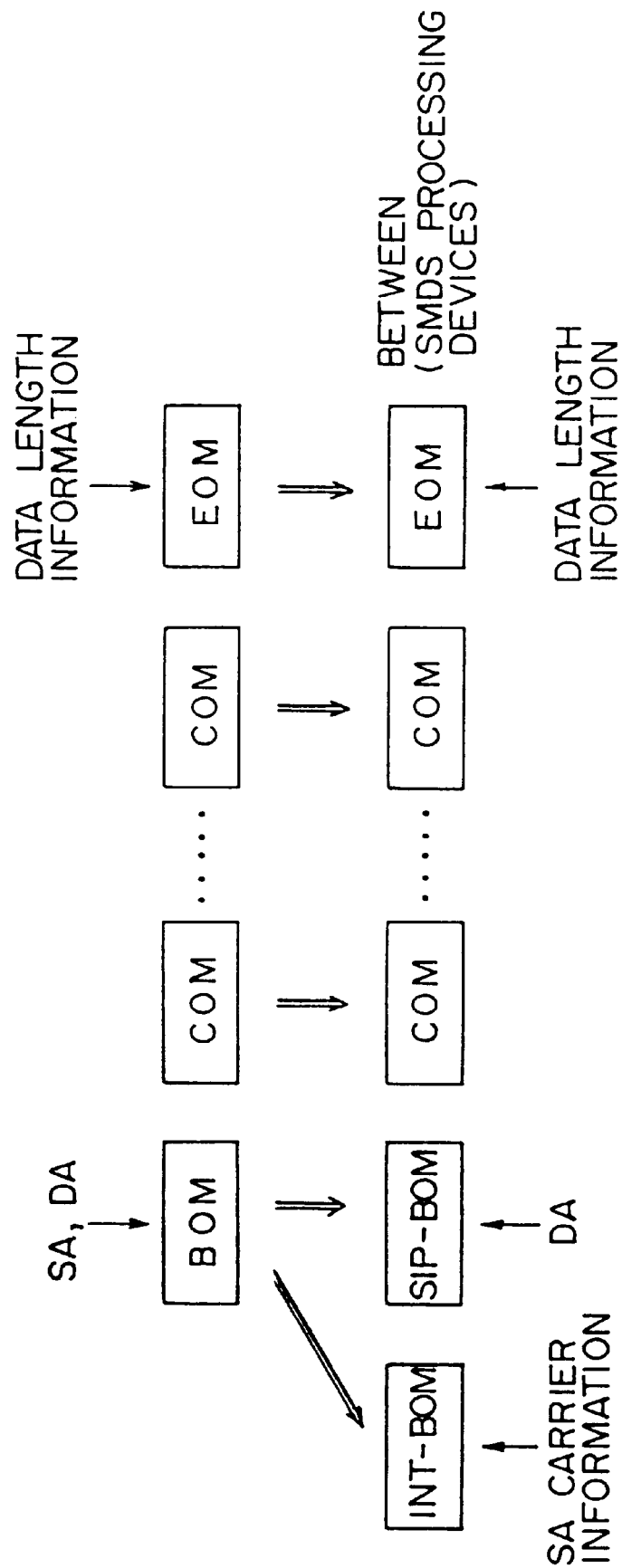
FIG. 19 is an explanatory view of the cells processed with the configuration shown in FIG. 18.

In this system, the BOM (leading cell) is converted into an INT-BOM and SIP-BOM as shown in FIG. 19 when a cell is transferred between the SMDS processing devices (in FIG. 9, the cell is transferred from the sending line unit 9021 to the receiving line unit 9022 through the PVC 9032). The INT-BOM stores the source address SA which has been stored in the unconverted BOM, and also stores the carrier information indicating the route through which the transfer data has been transferred. On the other hand, the SIP-BOM stores the destination address DA. The COM (intermediate cell) and EOM (trailing cell) are unchanged. The EOM stores the data length information.

When the accounting unit 1050 receives a cell frame signal CF, cell enable signal CEN, and cell data CD0-15 from the receiving line unit 9022, a cell segment extracting unit 1881 recognizes the type of each cell and transfers the INT-BOM, SIP-BOM, and EOM to an accounting data collecting unit 1882. The accounting data collecting unit 1882 extracts the source address SA, carrier information, destination address DA, data length information, identifier MID, etc. as the accounting information from the received cell. It performs a compressing process through a DA compressing unit 1883, an SA compressing unit 1884, and SA and carrier compressing unit 1885, and also performs an L3-PDU number calculating process, etc. through an accounting unit 1886, and stores the result as accounting data. The accounting data is processed for each identifier MID stored in an MID holding unit 1887. The cell segment extracting unit 1881 and accounting data collecting unit 1882 corresponds to the data extracting unit 1052 shown in FIG. 10.

The accounting unit 1050 shown in FIG. 18 comprises an SA abnormality detecting circuit 1890. The SA abnormality detecting circuit 1890 validates transfer data by comparing the 8 higher order bits of the source address SA stored in the INT-BOM with an 8-bit estimated value of a predetermined source address SA.

That is, the firmware of the accounting unit 1050 sets 11000001 as an estimated value for the 8 higher order bits of the source address SA in a temporary storage memory 1891, and stores the value in an 8 higher order bit SA holding unit 1892. When an 8 higher order bit SA extracting unit 1893 receives the source address SA fetched by the cell segment extracting unit 1881 from the INT-BOM, it extracts the 8 higher order bits and notifies a comparing circuit 1894 of the bits. The comparing circuit 1894 compares the value received from the 8 higher order bit SA extracting unit 1893 with an estimated value preliminarily set in the 8 higher order SA bit holding unit 1892, and inputs the comparison result (matching or non-matching result) to the data terminal D of a flipflop 1895.

A timing control unit 1888 outputs a pulse when an INT-BOM is detected and the cell enable signal CEN indicates a valid cell. When the flipflop 1895 receives at its clock terminal CP the pulse from the timing control unit 1888, it fetches the comparison result from the comparing circuit 1894 and outputs it through its Q terminal. That is, the flipflop 1895 outputs the result of the comparison between the 8 higher order bits of the source address SA extracted from the input INT-BOM and an estimated value in synchronization with the input timing of the INT-BOM. When the output from the flipflop 1895 (output from the SA abnormality detecting circuit 1890) indicates a non-matching result, the output is provided for the call control processor or main processor as an SA abnormality notification (or CEN abnormality notification). The processors recognize the fault state, and perform an appropriate process according to the fault.

With the above described configuration, when a cell enable signal CEN indicating a valid cell is input to the accounting unit 1050 and when the source address SA of the transfer data does not match the estimated value, no accounting process is performed, thereby preventing a wrong accounting process from being performed and improving the reliability of the system.

Figure 14B:
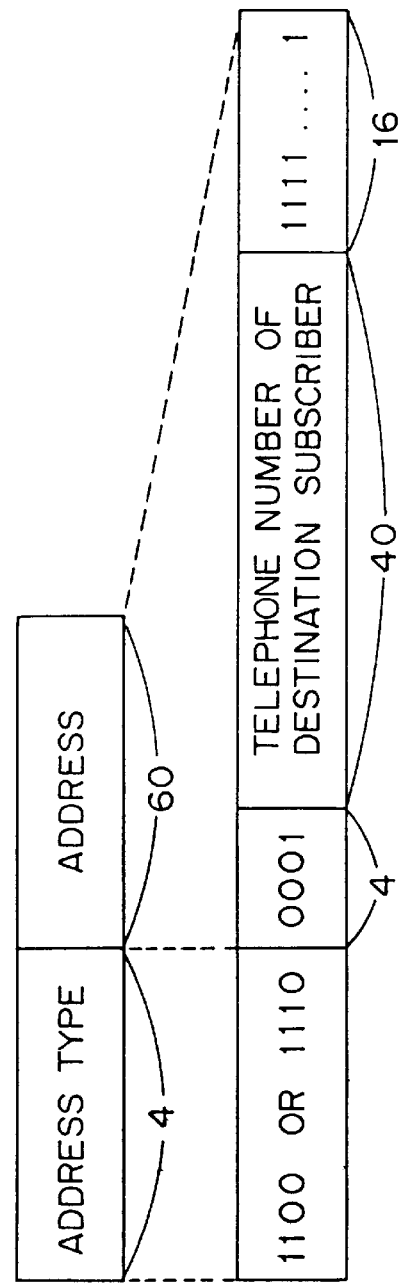
FIG. 14B shows a data format of the destination address DA.

According to the second embodiment, the data transfer is validated for an accounting process based on the result of the comparison between the 8 higher order bit of the source address SA extracted from the input data and an estimated value. However, the embodiment is not limited to this application, but any number of predictable bits can be used. For example, 4 higher order bits or 16 lower order bits of the source address SA can be used. Furthermore, the destination address DA can be used instead of the source address SA. The destination address DA in the SMDS is shown in FIG. 14B. The predetermined number of bits are fixed for the address and can be predicted on the receiving side.

Figure 20:
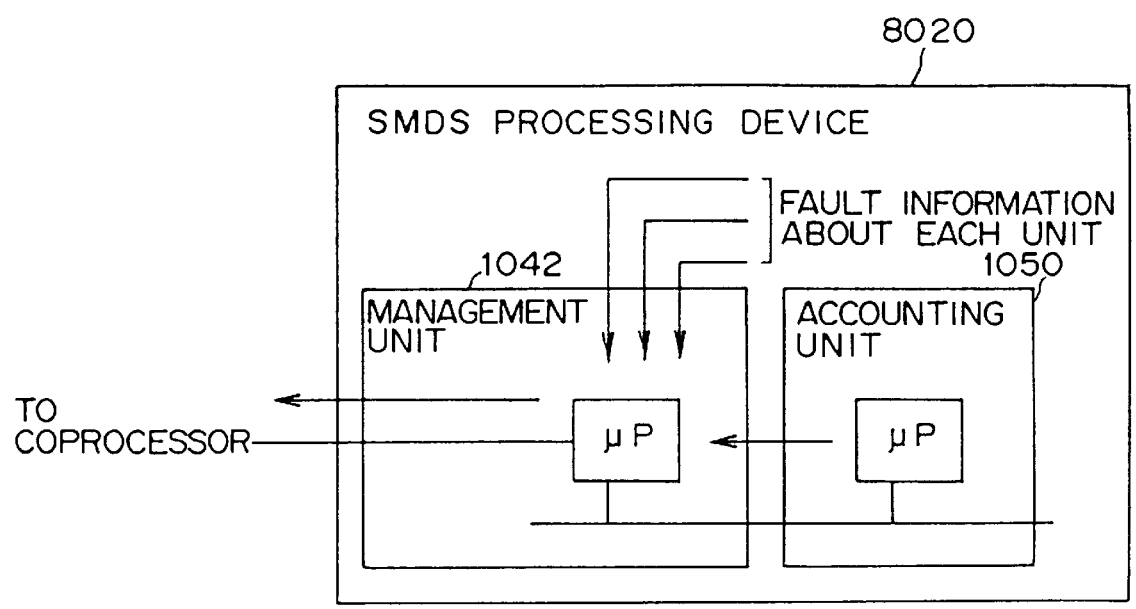
FIG. 20 is an explanatory view for the method of issuing an abnormal state notification.

Described below is the method of issuing a notification when a fault occurs in either of the first and second embodiments. FIG. 20 shows the fault notifying method.

When the accounting unit 1050 detects the fault described by referring to the first and second embodiments, the accounting unit 1050 notifies the management unit 1042 of the fault. Otherwise, a state management memory is provided in the accounting unit 1050 to write the details of the fault to the state management memory if the fault has occurred. Then, the management unit 1042 reads the fault information.

When the management unit 1042 recognizes a fault, it notifies the coprocessor 8016 of the fault, and the coprocessor 8016 notifies the main processor 8015 of the information as necessary. The main processor 8015 determines, depending on the contents of the specified fault, whether or not the accounting process should be stopped. When the SMDS processing device is of duplicated configuration, the main processor 8015 determines whether or not the system should be switched. If yes, the operation system should be switched to continue the accounting process.

As described above, the SMDS has been explained as an embodiment of the data transfer and accounting device. However, the data transfer and accounting device is not limited to such data transmission services, but can be applied to a data transmission system in which data units are transferred at predetermined intervals and a timing signal is generated for each data unit. The data transfer and accounting device includes all systems of controlling the accounting process based on predetermined valid bits in the transfer data.

As described above, according to the data transfer and accounting device of the present invention, the destination data access unit quickly accesses the destination device to fetch the destination data to the destination data storage unit, and rapidly compares the data with the source data stored in the source data storage unit. Therefore, accounting data can be transferred efficiently in the SMDS services that should be processed in real time. After performing the compressing process at least in 3 steps on the destination address compressed information, source address information, and carrier information, the destination address/source address/carrier compressed information, source address information, carrier information, segment count information, and packet count information are written to the accounting storage unit at the address identified by the most compressed accounting parameter, that is, the destination address/source address/ carrier compressed information from the destination address/source address/carrier compressing unit. Since the written information can be read by the accounting unit, the number of bits required for the address information for use in storing the accounting data can be considerably reduced, and the circuit can support the number of received messages sufficient to provide practical services. Furthermore, reducing the scale of the device can keep costs down when configuring the device. Additionally, the accounting system, in which data units are transferred at predetermined intervals and an accounting process is performed using a timing signal generated for each data unit, comprises a unit of monitoring the period of the timing signal to perform the accounting process while validating the period, to determine the occurrence of a fault when it is determined that the transfer data contains valid data and when the transfer data cannot be validated, and then to issue a notification to control the accounting process. Therefore, a wrong accounting process can be prevented from being performed even if an abnormal condition has arisen in the information indicating whether or not the transfer data contains valid data.

Figure 3:
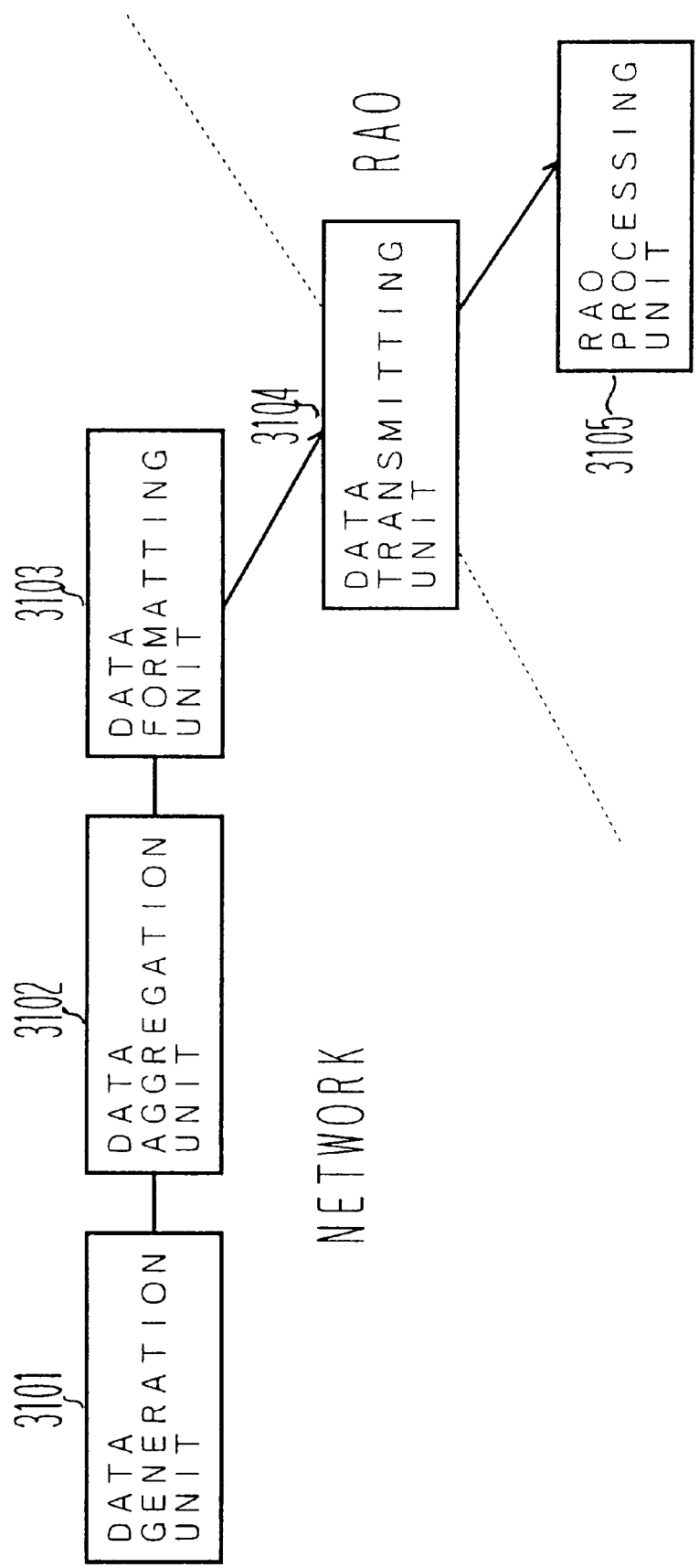
FIG. 3 is a block diagram of the conventional accounting system in the SMDS switch system.
Figure 4:
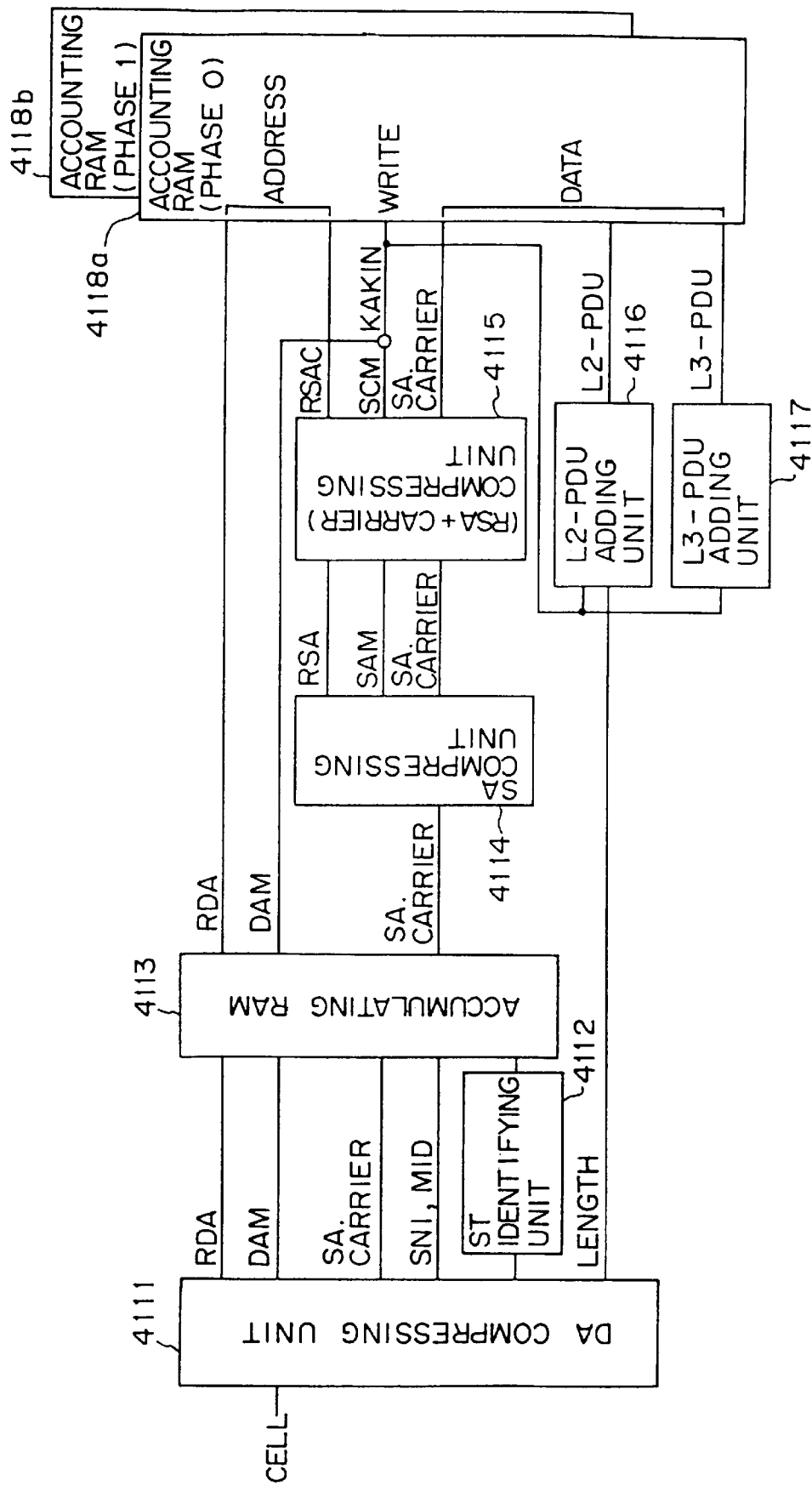
FIG. 4 is a block diagram of the conventional SMDS accounting data generating system.

FIG. 21 is a block diagram showing the SMDS accounting data generating device according to the fifth aspect of the present invention for the data transfer accounting data generating device, and shows the SMDS accounting data generating device based on the block diagram of the accounting system shown in FIG. 3. The SMDS accounting data generating device shown in FIG. 21, as in the device shown in FIG. 4, is used in a network in which SMDS accounting data can be generated using a plurality of accounting parameters, and can function as the data generating unit 3101 and data aggregating unit 3102 in the accounting system shown in FIG. 3.

Figure 22:
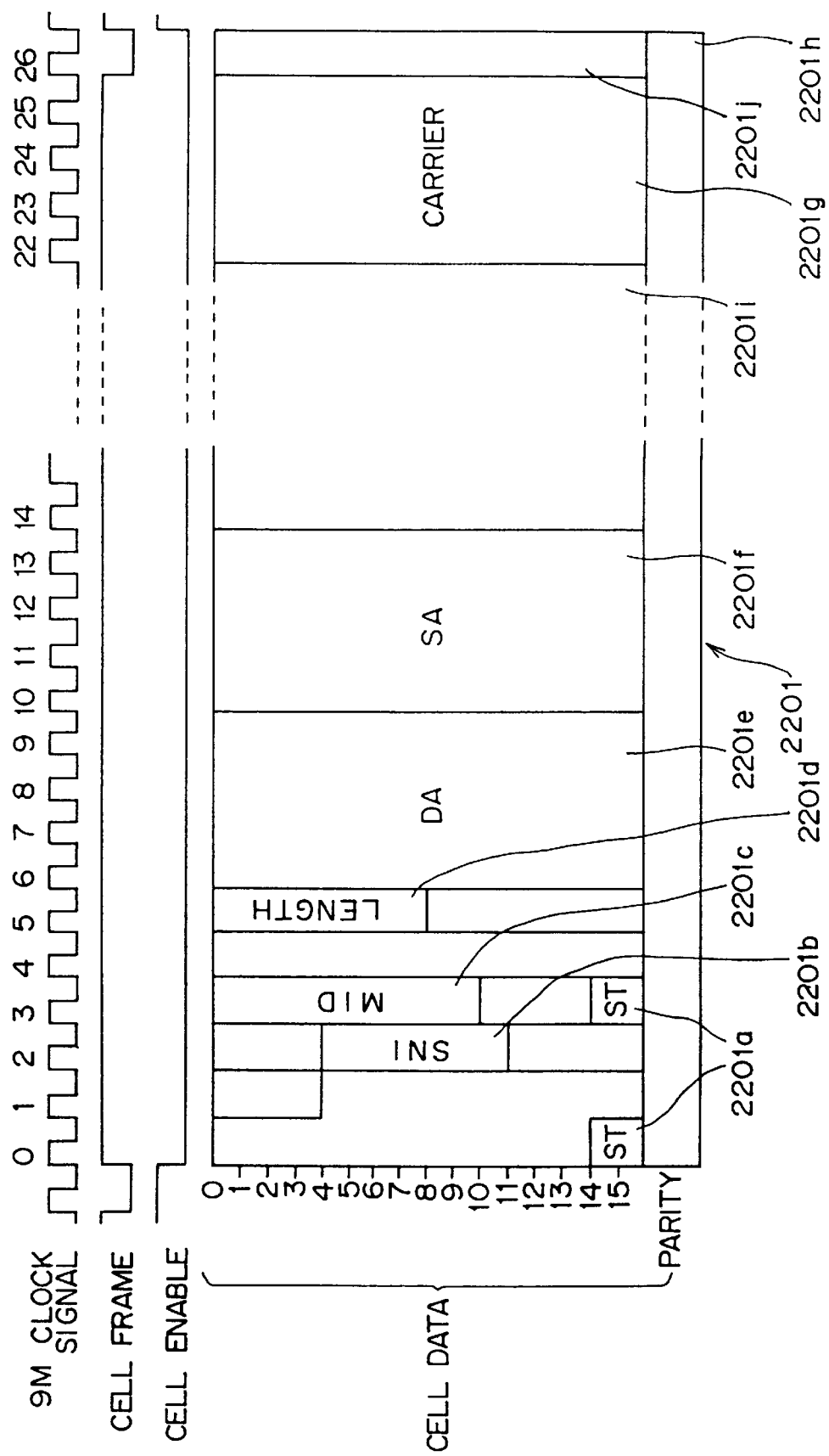
FIG. 22 is the data format of the cell data as the L2-PDU input to the SMDS accounting data generating device according to the embodiment of the data transfer accounting data generating device.

The SMDS accounting data generating device shown in FIG. 21 receives cell data 2201 as an L2-PDU in the data format, for example, as shown in FIG. 22, and generates compressed accounting data based on the received cell data.

In FIG. 22, the cell data 2201 is formed by the amount of data (54 octets) ((16 bits+1 parity bit)×27). That is, 16 parallel bits are entered using 27 clock pulses (0–16).

The frequency of the clock signal can be, for example, 9 MHz. A cell frame is a signal identifying the header of a cell, and a cell enable is a signal indicating whether the cell is valid or invalid.

A 2-bit area 2201*a* of the cell data 2201 stores segment type (ST) information. A 7-bit area 2201*b* stores subscriber network interface (SNI) information. A 10-bit area 2201*c* stores message identifier (MID) information. An 8-bit area 2201*d* stores data length information. A 64-bit area 2201*e* stores destination address (DA) information. A 64-bit area 2201*f* stores source address (SA) information. A 50-bit area 2201*g* stores carrier information.

The ST information indicates the portion in the L3-PDU in the antecedent stage in which the corresponding L2-PDU is divided. The SNI indicates the address of the subscriber network interface. The MID indicates the type of the message transmitted between subscribers.

The cell data 2201 also comprises a parity bit 2201*h*; a data unit 2201*i*; and a trailer unit 2201*j*.

A destination address compressing unit 2110 shown in FIG. 21 compresses the destination address (DA) information contained in the input cell data 2201 and stored in the area 2201*e*, outputs the result as RDA information (DA compressed information), and delays and outputs the other accounting parameters described later (DAM information, (SA+carrier) information, SNI information, MID information, ST information, and data length information).

Figure 23:
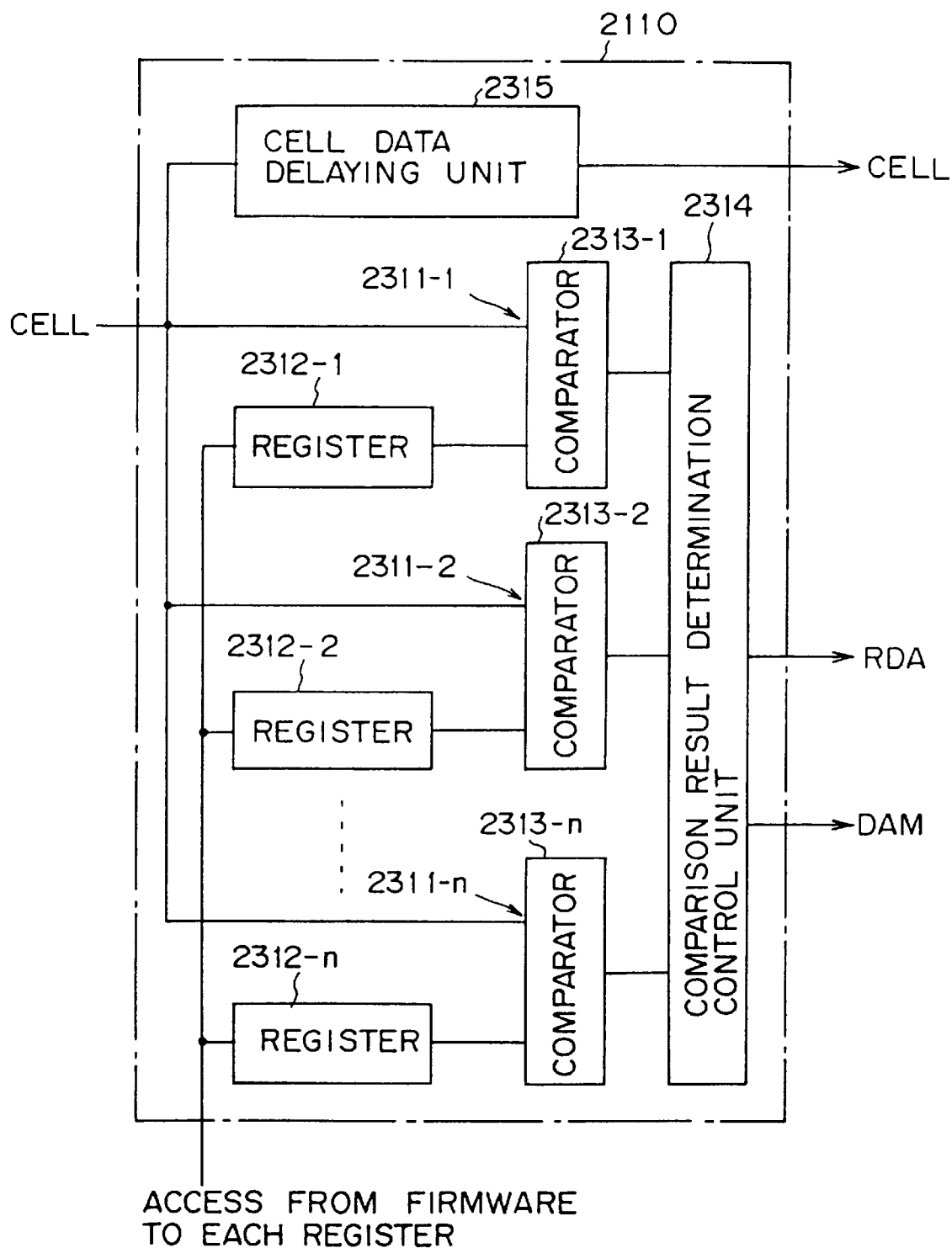
FIG. 23 is a block diagram showing the configuration of the DA compressing unit according to the embodiment of the data transfer accounting data generating device.

The DA compressing unit 2110 is configured as shown in detail in FIG. 23. In FIG. 23, compressing units 2311-1–2311-*n* extract the DA information stored in the area 2201*e* of the cell data 2201 input as 16-bit parallel data, compress the DA information, and are respectively provided with registers 2312-1–2312-*n* and comparators 2313-1–2313-*n*.

The number n of the compressing units is deternined depending on the type of the DA information (the sum of the number of individual addresses and the number of group addresses in the entire SNI block).

In response to an access from the firmware, the registers 2312-1–2312-*n* preliminarily store the DA information as reference value information in the input cell data.

The comparators 2313-1–2313-*n* receive the reference value information from the registers 2312-1–2312-*n* and the DA information in the cell data as 16-bit parallel data to be compressed, and compare the data to determine whether or not they match each other.

A comparison result determination control unit 2314 outputs the information (for example, the entry numbers of the registers 2312-1–2312-*n*) of the compressing units 2311-1–2311-*n*, whose reference value information and DA information to be compressed match each other, based on the output from the compressing units 2311-1–2311-*n*. It also outputs the DAM information as matching information that the reference value information matches the information to be compressed.

For example, if the number of pieces of the SNI information accommodated by the network is 32 (SNI-IDs are 0 through 1F) and the numbers of the individual addresses and group addresses of each SNI are 8 as shown in FIG. 24, then 512 types of the above described DA information exist and therefore the number of the compressing units (the numbers of registers and comparators) is set to 512.

Types of DA Information = 32 [SNI] × (8[individual addresses] +

8 [group addresses])

= 512 = $2^9$

Therefore, the comparison result determination control unit 2314 can set the compressed DA information RDA to 0 through 1FF as the information from the compressing units 2311-1–2311-n as shown in FIG. 24. Since 512=$2^9$ and the information can be converted into 9-bit signals, 55 bits can be saved as compared with the DA information before compression (64 bits).

A cell data delaying unit 2315 delays by 3 cells the input cell data, clock signal, cell frame signal, and cell enable signal and then outputs them.

Figure 25:
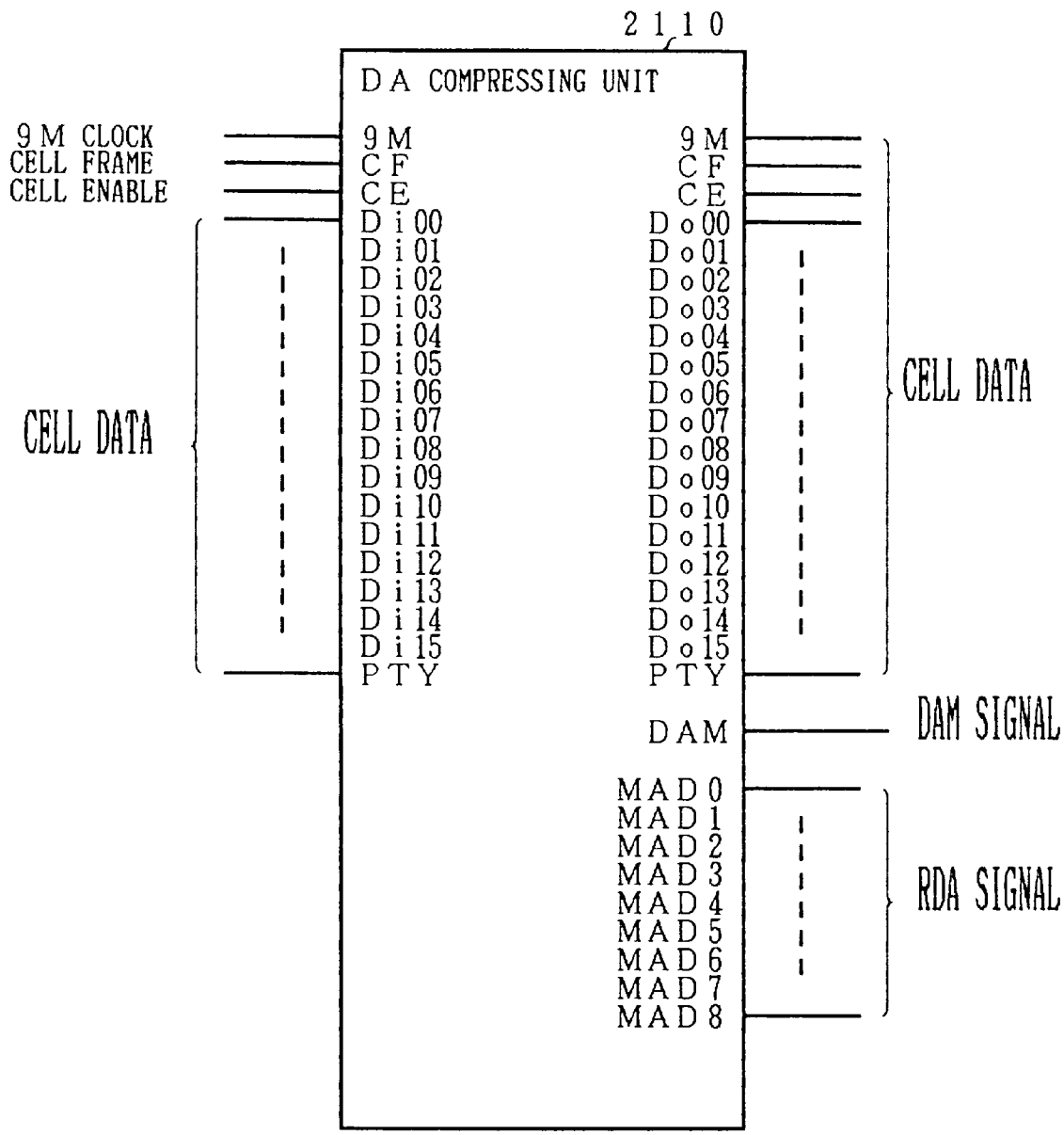
FIG. 25 shows the configuration of the DA compressing unit according to the embodiment of the data transfer accounting data generating device.

Thus, as shown in FIG. 25, the DA compressing unit 2110 is designed, for example, to simultaneously receive cell data in parallel as an approximately 9 MHz clock signal (9M), cell frame (CF), cell enable (CE), and cell data (16 bits+ parity bit).

The DA compressing unit 2110 simultaneously outputs in parallel a clock signal (9M) 3-cell delayed from the input signal, a cell frame signal (CF), a cell enable signal (CE), cell data (Di00–Di15, PTY) of (16 bits+parity bit), a signal indicating the DAM information, and a 9-bit RDA signal (MAD0–MAD8).

A segment type (ST) identifying unit 2120 extracts the ST information stored in the area 2201a in the cell data 2201 received from the DA compressing unit 2110, and identifies the segment type ST according to the information stored in the area 2201a.

An accumulating RAM (accumulating storage unit) 2130 accumulates the RDA information from the DA compressing unit 2110, and other accounting parameters, that is, the SA information, carrier information, and DAM information, using other accounting parameters, that is, the SNI information and MID information, as the address.

Figure 26:
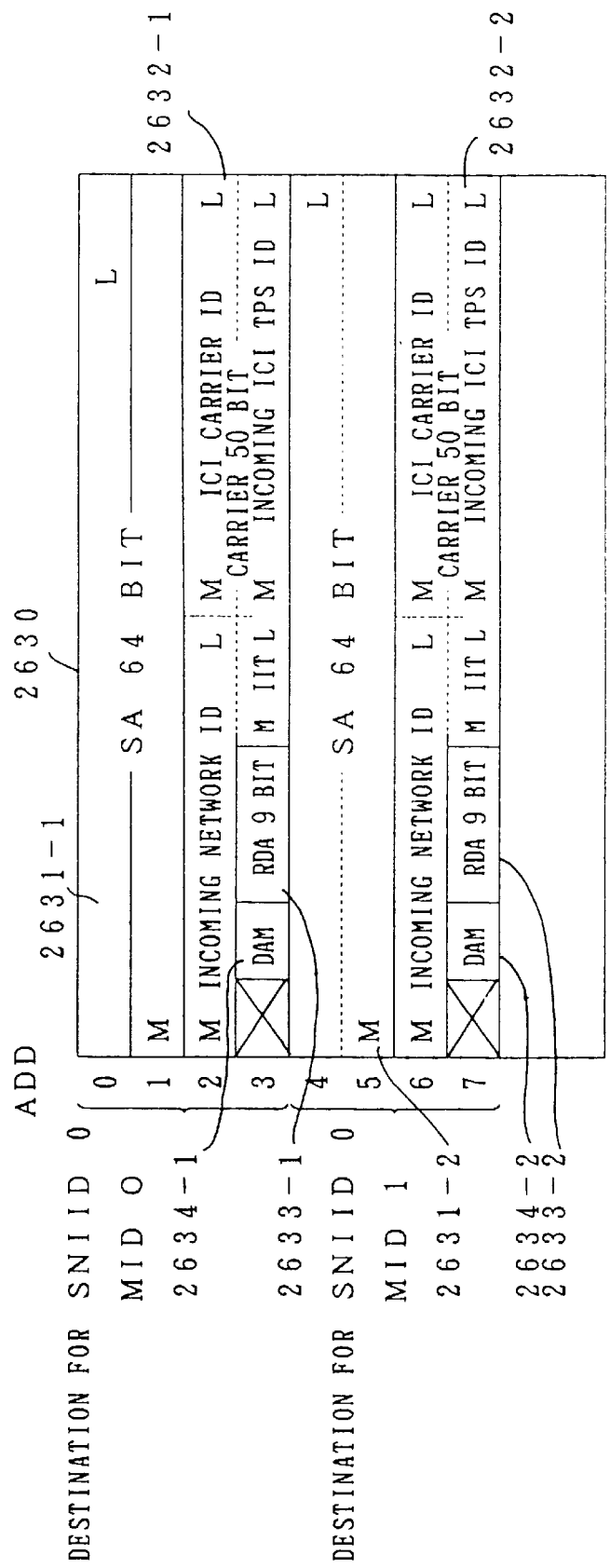
FIG. 26 shows the configuration of the accumulating RAM according to the embodiment of the data transfer accounting data generating device.

Practically, the accumulating RAM 2130 is configured, for example, as shown in FIG. 26. That is, using the destination SNI-ID as the higher order address and the MID information as the lower order address, the accumulating RAM 2130 stores the corresponding SA information (in areas 2631-1 and 2631-2), carrier information (in areas 2632-1 and 2632-2), RDA information (in areas 2633-1 and 2633-2), and DAM information (in areas 2634-1 and 2634-2).

When the accumulating RAM 2130 receives the EOM as end-of-message information based on the segment type ST identified by the ST identifying unit 2120, it outputs the SA information, carrier information, RDA information, and DAM information of the corresponding cell data to the SA compressing unit 2140 described later.

After receiving the EOM information from the accumulating RAM 2130, the source address compressing unit (SA compressing unit) 2140 receives the RDA information, DAM information, SA information, and carrier information that are read from the accumulating RAM 2130. It performs a compressing process on the SA information and outputs it as the RSA information while delaying and outputting the RDA information, DAM information, and non-compressed (SA+carrier) information.

Figure 27:
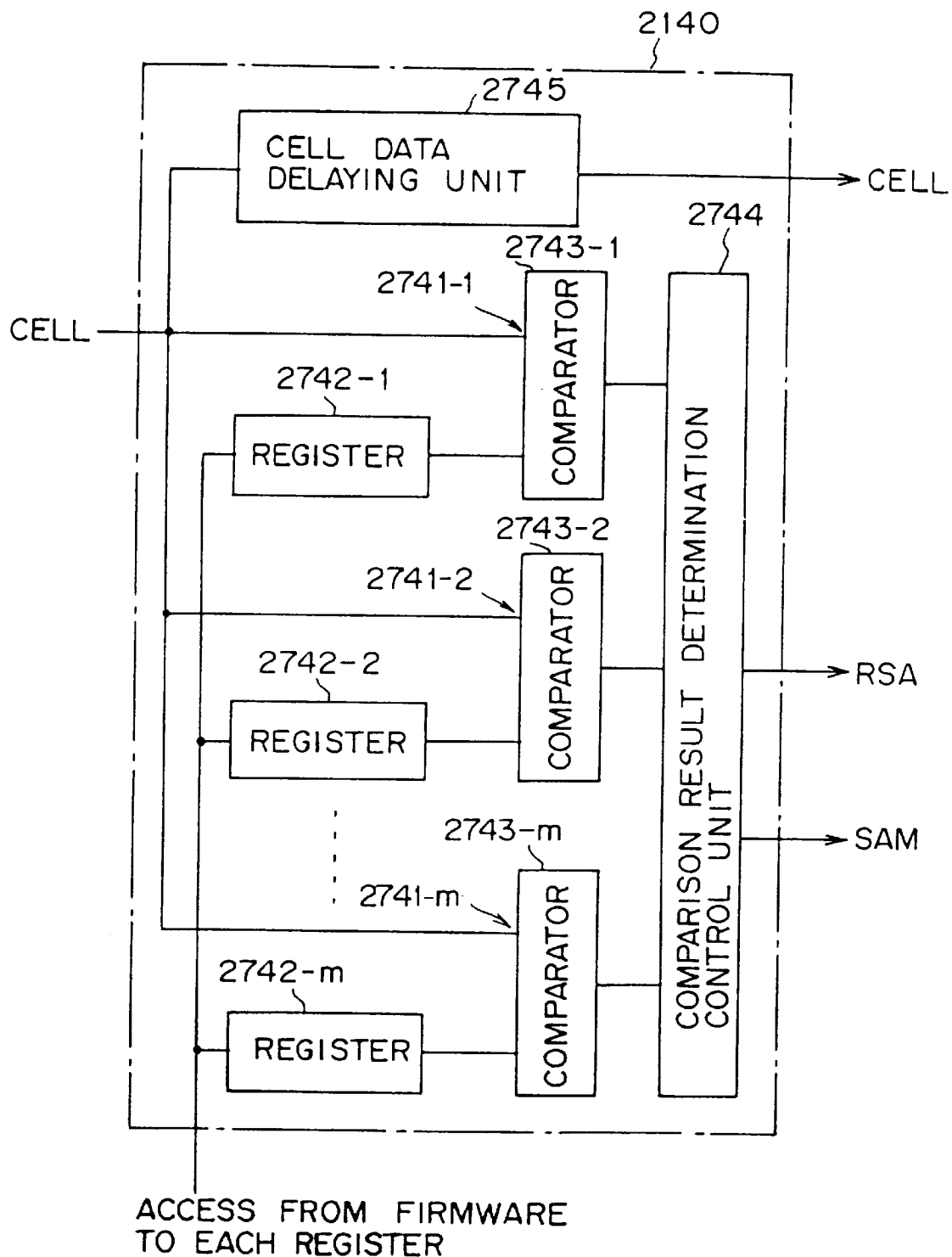
FIG. 27 is a block diagram showing the configuration of the SA compressing unit according to the embodiment of the data transfer accounting data generating device.

As shown in FIG. 27, the SA compressing unit 2140 as well as the DA compressing unit 2110 comprises compressing units 2741-1–2741-m, a comparison result determination control unit 2744, and a cell data delaying unit 2745. However, the cell data delaying unit 2745 basically has the function similar to that in the above described DA compressing unit 2110 (refer to identification number 2315).

The compressing units 2741-1–2741-m extract the SA information stored in the area 2201f in the cell data 2201 entered as 16-bit parallel data to perform a compressing process on the SA information. They are respectively provided with registers 2742-1–2742-m and comparators 2743-1–2743-m.

The registers 2742-1–2742-m autonomously store different SA information as reference value information depending on the input information. The comparators 2743-1–2743-m receive the reference value information from the registers 2742-1–2742-m and the SA information in the cell data 2201 input as 16-bit parallel data to be compressed, compare the information to determine whether or not the information matches each other, and output the comparison result as the output from the compressing units 2741-1–2741-m.

Based on the outputs from the compressing units 2741-1–2741-m, the comparison result determination control unit 2744 outputs as the SA compressed information RSA the information (for example, the entry numbers of the registers 2742-1–2742-m) of the compressing units 2741-1–2741-m, whose reference value information and SA information to be compressed match each other. In addition to the information about the matching compressing units 2741-1–2741-m, it also outputs the SAM information as matching information that the reference value information matches the information to be compressed.

The number m of the compressing units is adaptively set based on the number of received messages. (At this time, the number of messages is 256, and m can be set to 256 as being equal to the number of the received messages). Therefore, m equals 256=$2^8$ and the RSA information is output in the format of 8-bit parallel signals. Thus, 56 bits can be successfully saved as compared with the SA information (64 bits).

Figure 28:
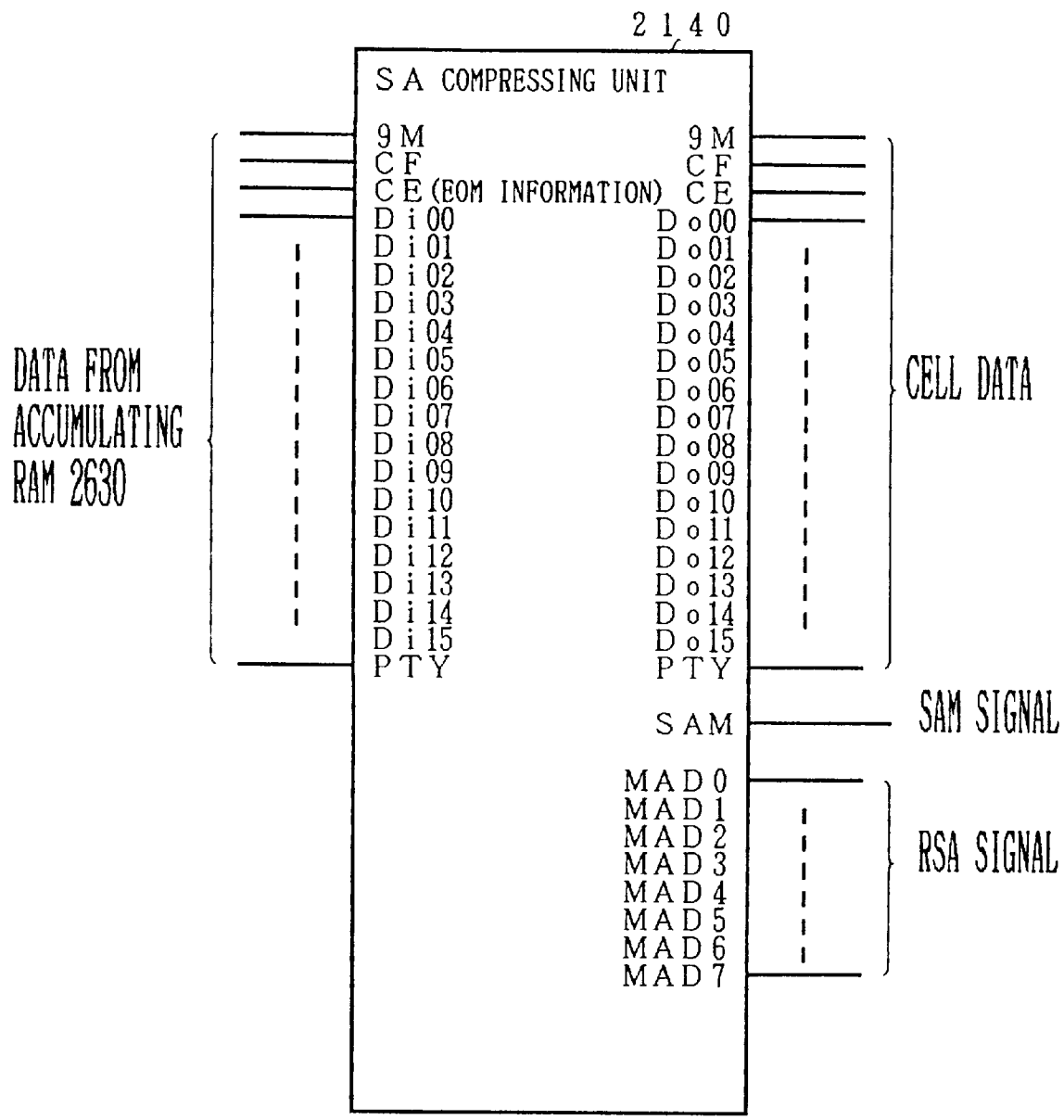
FIG. 28 shows the configuration of the SA compressing unit according to the embodiment of the data transfer accounting data generating device.

Practically, the SA compressing unit 2140 receives in parallel the information (RDA information, DAM information, and (SA+carrier) information) from the accumulating RAM 2130 after being converted through a given logic into the cell data (16 bits+parity bit) together with a clock signal (9M) of approximately 9 MHZ, a cell frame signal (CF), and a cell enable signal (CE) as EOM information as shown in FIG. 28.

The SA compressing unit 2140 simultaneously outputs in parallel a clock signal (9M) that is delayed by 3 cells from the input signal; a cell frame signal (CF), a cell enable signal (CE), and (16 bits+parity bit) cell data (Di00–Di15, PTY); a signal indicating SAM information; and an 8-bit RSA signal (MAD0–MAD7).

When the registers 2742-1–2742-m autonomously store the SA information as respective reference value information, the registers 2742-1–2742-m are kept vacant in the initial state in which no cell data is received. The number of registers in the comparison result determination control unit 2744 is set to 0.

When the cell data is newly input in this state, the SA information of the cell data is entered in the register 2742-1 and the number of registers is set to 0. If the SA information of the subsequently entered cell data is different from that stored in the register 2742-1, then the SA information of the cell data is stored in the register 2742-2, and the number of the registers is set to 1.

Likewise, each time the cell data containing unentered SA information is input, the unentered SA information is sequentially entered in the registers 2742-3–2742-m. Therefore, the registers 2742-1–2742-m autonomously store different types of SA information.

If SA information is entered in the last register 2742-m, then no SA information can be newly entered in the registers 2742-1–2742-m unless the registers has been reset.

An (RSA+carrier) compressing unit 2150 receives SAM information from the SA compressing unit 2140 as an enable signal in addition to the RSA information, RDA information, SA information, and carrier information, compresses and outputs the RSA information and carrier information as RSAC information, and delays and outputs the RDA information and non-compressed (SA+carrier) information.

Figure 29:
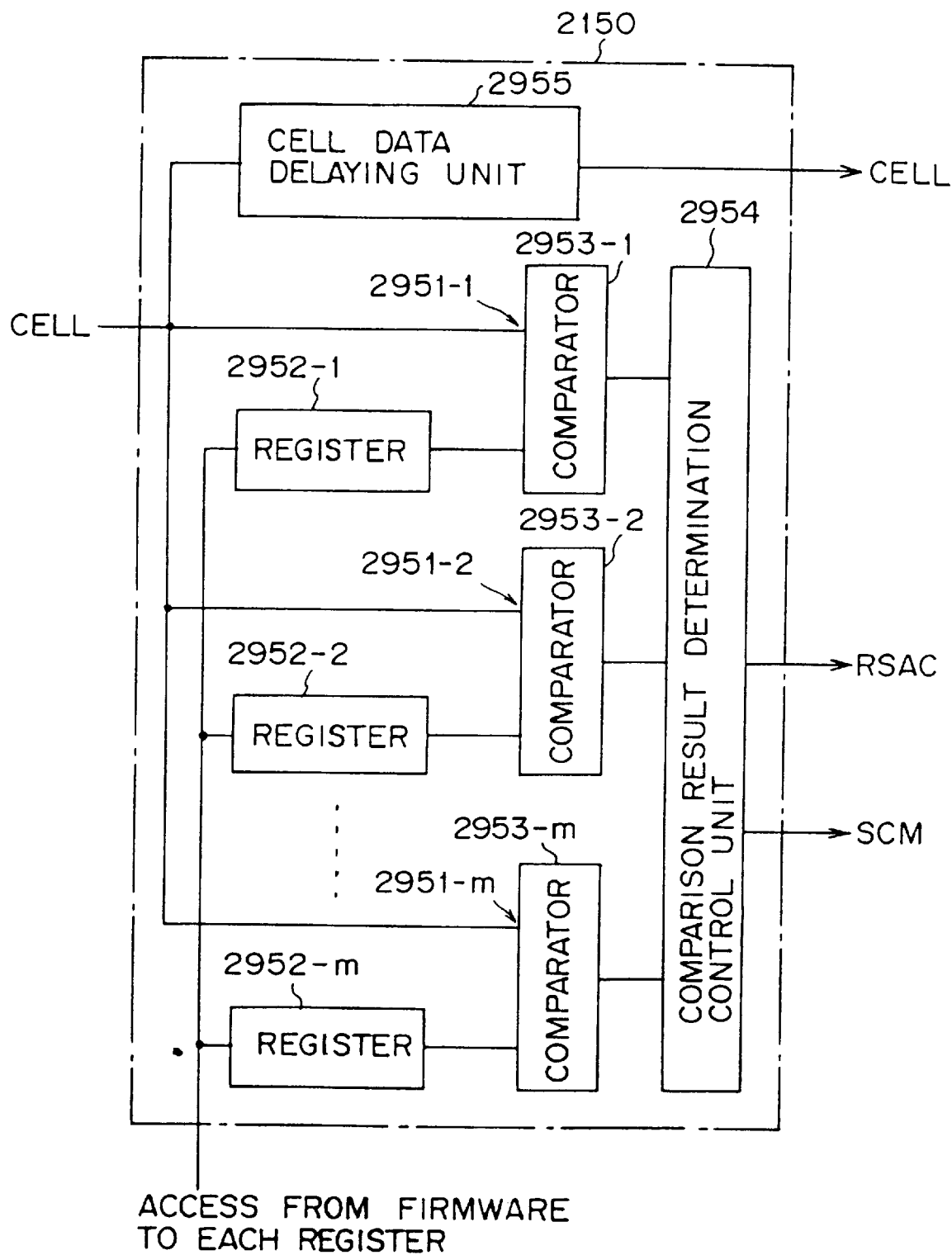
FIG. 29 shows the configuration of the (RSA+carrier) compressing unit according to the embodiment of the data transfer accounting data generating device.

The (RSA+carrier) compressing unit 2150 comprises compressing units 2951-1–2951-*m*, a comparison result determination control unit 2954, and a cell data delaying unit 2955 as shown in detail in FIG. 29. The cell data delaying unit 2955 has the functions similar to those in the DA compressing unit 2110 and SA compressing unit 2140 (identified by 2315 and 2745 respectively).

The compressing units 2951-1–2951-*m* extract the (RSA+carrier) information in the cell data input as 16-bit parallel data, and perform the compressing process on the (RSA+carrier) information. They respectively comprise registers 2952-1–2952-*m* and comparators 2953-1–2953-*m*.

In response to input information, the registers 2952-1–2952-*m* autonomously store the (RSA+carrier) information as reference value information. The comparators 2953-1–2953-*m* receive the reference value information from the registers 2952-1–2952-*m* and the (RSA+carrier) information from the cell data input as 16-bit parallel data, and compare them to determine whether or not they match each other.

Based on the output from the compressing units 2951-1–2951-*m*, a comparison result determination control unit 2954 outputs as compressed information (RSAC information) the information (for example, the entry numbers of the registers 2952-1–2952-*m*) of the compressing units 2951-1–2951-*m* whose reference value information and (RSA+carrier) information to be compressed match each other. It also outputs the SCM information as matching information that the reference value information matches the information to be compressed.

In this case, m equals $256=2^8$, and the RSAC information is output in the format of 8-bit parallel signals.

Figure 30:
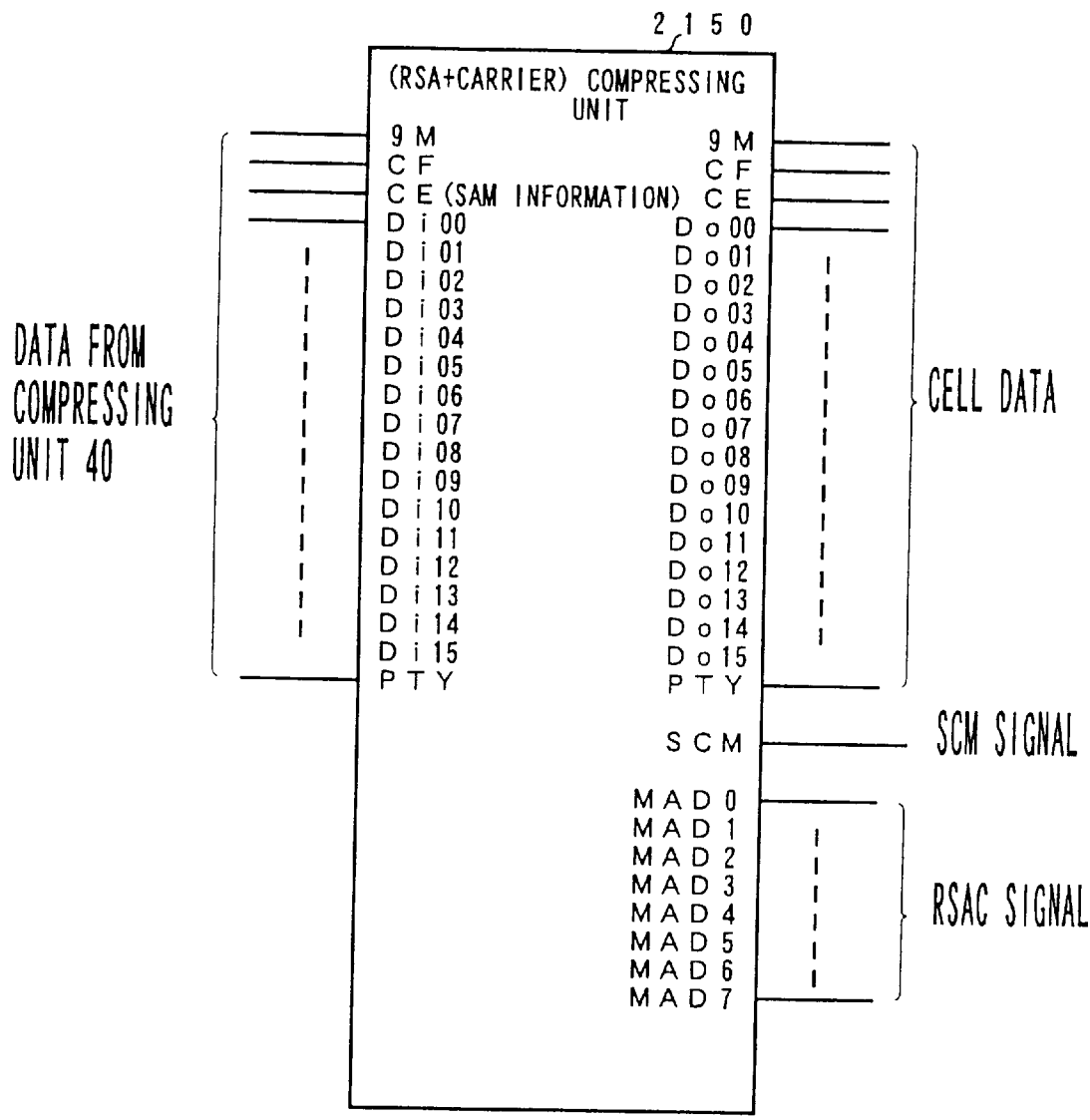
FIG. 30 shows the configuration of the (RSA+carrier) compressing unit according to the embodiment of the data transfer accounting data generating device.

The (RSA+carrier) compressing unit 2150 receives in parallel the information (RSA information, RDA information, (SA+carrier) information, and DAM information) from the SA compressing unit 2140 after being converted through a given logic into the cell data (16 bits+parity bit) together with a clock signal (9M) of approximately 9 MHZ, a cell frame signal (CF), and a cell enable signal (CE) as SAM information as shown in FIG. 30.

The (RSA+carrier) compressing unit 2150 simultaneously outputs in parallel a clock signal (9M) that is delayed by 3 cells from the input signal; a cell frame signal (CF), a cell enable signal (CE), and (16 bits+parity bit) cell data (Di00–Di15, PTY); a signal indicating SCM information; and an 8-bit RSAC signal (MAD0–MAD7).

When the registers 2952-1–2952-*m* autonomously store the (RSA+carrier) information as respective reference value information, the registers 2952-1–2952-*m* are kept vacant in the initial state in which no cell data is received. When the cell data is newly input in this state, the (RSA+carrier) information of the cell data is entered in the register 2952-1.

If the (RSA+carrier) information of the subsequently entered cell data is different from that stored in the register 2952-1, then the (RSA+carrier) information of the cell data is stored in the register 2952-2.

Likewise, each time the cell data containing unentered (RSA+carrier) information is input, the unentered (RSA+carrier) information is sequentially entered in the registers 2952-3–2742-*m*. Therefore, the registers 2952-1–2952-*m* autonomously store different types of (RSA+carrier) information.

When the (RSA+carrier) information is entered as the reference value information in all registers 2952-1–2952-*m*, the (RSA+carrier) compressing unit 2150 indicates a full state. Afterwards, even if it receives new messages, it cannot make any new entry without resetting, and the new messages are discarded.

As shown in FIG. 22, the SA information and carrier information as the address information of the 16-bit cell data 1 input in parallel require an area of a total of 114 bits (SA 64 bits+carrier 50 bits). Since the compressed address information is represented by 8 bits, 5805 bits can be successfully saved.

An (RDA+RSAC) compressing unit (destination address/source address/carrier address re-compressing unit) 2160 receives the SCM information from the (RSA+carrier) compressing unit 2150 as an enable signal, compresses and outputs the RDA information and RSAC information as RDSAC information, and delays and outputs the RDA information and non-compressed (SA+carrier) information.

Figure 31:
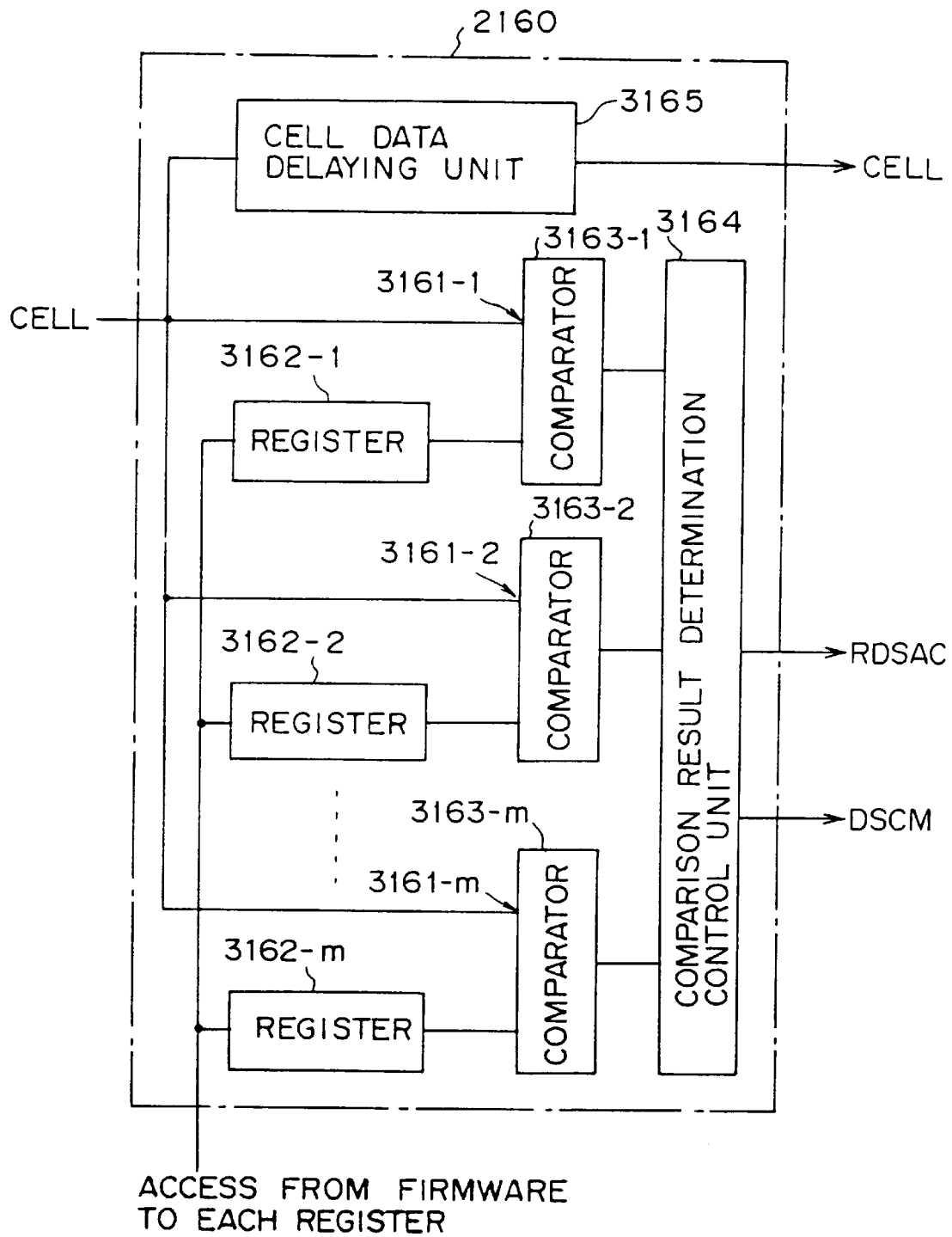
FIG. 31 is a block diagram of the configuration of the (RDA+RSAC) compressing unit according to the embodiment of the data transfer accounting data generating device.

The (RDA+RSAC) compressing unit 2160 comprises compressing units 3161-1–3161-*m*, a comparison result determination control unit 3164, and a cell data delaying unit 3165 as shown in detail in FIG. 31. The cell data delaying unit 3165 has the functions similar to those in the DA compressing unit 2110, SA compressing unit 2140, or (RSA+carrier) compressing unit 2150 (identified by 2315, 2745, or 2955 respectively). The compressing units 3161-1–3161-*m* extract the (RDA+RSAC) information in the cell data input as 16-bit parallel data, and perform the compressing process on the (RDA+RSAC) information. They respectively comprise registers 3162-1–3162-*m* and comparators 3163-1–3163-*m*.

The registers 3162-1–3162-*m* autonomously store the (RDA+RSAC) information as reference value information. The comparators 3163-1–3163-*m* compare the reference value information from the registers 3162-1–3162-*m* with the (RDA+RSAC) information to be compressed to determine whether or not they match each other.

Based on the output from each of the registers 3162-1–3162-*m*, a comparison result determination control unit 3164 outputs as compressed information (RDSAC information) the information (for example, the entry numbers of the registers 3162-1–3162-*m*) of the compressing units 3161-1–3161-*m* whose reference value information and (RDA+RSAC) information to be compressed match each other. In addition to the information of the matching compressing units 3161-1–3161-*m* it also outputs the SCM information as matching information that the reference value information matches the information to be compressed.

In this case, m equals $256=2^8$, and the RSAC information is output in the format of 8-bit parallel signals.

Figure 32:
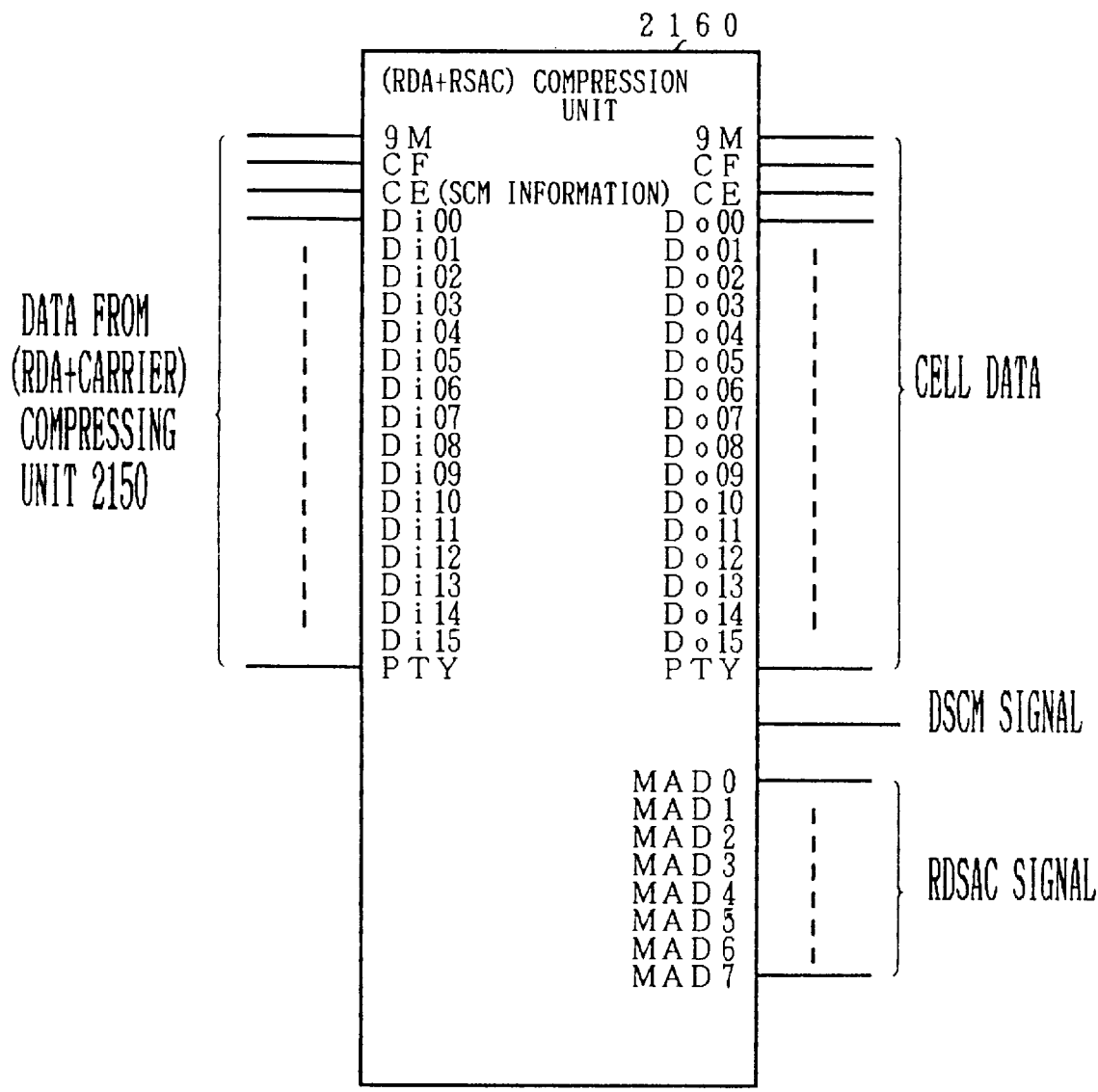
FIG. 32 shows the configuration of the (RDA+RSAC) compressing unit according to the embodiment of the data transfer accounting data generating device.

The RSAC information, RDA information, (SA+carrier) information, and DAM information input to the (RDA+RSAC) compressing unit 2160 are converted through a given logic into the cell data (16 bits+parity bit) as shown in FIG. 32, and input in parallel together with a clock signal (9M) of approximately 9 MHZ, a cell frame signal (CF), and a cell enable signal (CE) as SCM information.

The (RDA+RSAC) compressing unit 2160 simultaneously outputs in parallel a clock signal (9M) that is delayed by 3 cells from the input signal; a cell frame signal (CF), a cell enable signal (CE), and (16 bits+parity bit) cell data (Di00–Di15, PTY); a signal indicating SCM information; and an 8-bit RSAC signal (MAD0–MAD7). Thus, 9-bit RDA information and 8-bit RSAC information are compressed into an 8-bit RDSAC signal, thereby further reducing the number of bits.

When the registers 3162-1–3162-m autonomously store the (RDA+RSAC) information as respective reference value information, the registers 3162-1–3162-m are kept vacant in the initial state in which no cell data is received. When the cell data is newly input in this state, the (RDA+RSAC) information of the cell data is entered in the register 3162-1.

If the (RDA+RSAC) information of the subsequently entered cell data is different from that stored in the register 3162-1, then the (RDA+RSAC) information of the cell data is stored in the register 3162-2.

Likewise, each time the cell data containing unentered (RDA+RSAC) information is input, the unentered (RDA+RSAC) information is sequentially entered in the registers 3162-3–3162-m. Therefore, the registers 3162-1–3162-m autonomously store different type of (RDA+RSAC) information.

An L2-PDU adding unit 2170 calculates segment information using the data information (2201d shown in FIG. 22) corresponding to the DA information, SA information, carrier information, MID information, and SNI information, and outputs the result as segment count information.

An L3-PDU adding unit 2180 outputs packet count information corresponding to the DA information, SA information, carrier information, MID information, and SNI information.

Accounting RAM (accounting storage units) 2190a and 2190b write the RDA information and (SA+carrier) information from the (RDA+RSAC) compressing unit 2160, the segment count information from the L2-PDU adding unit 2170, and the packet count information from the L3-PDU adding unit 2180 at the address identified by the RDSAC information from the (RDA+RSAC) compressing unit 2160. The written information is read to the accounting information managing unit 3105 (FIG. 3) as an accounting unit.

The accounting data is written to the accounting RAM 2190a and 2190b based on the KAKIN information (indicating that the (RDA+RSAC) compressing unit 2160 matches the DA compressing unit 2110 in compression) as logical product information of the DSCM information from the (RDA+RSAC) compressing unit 2160 by the DAM information from the DA compressing unit 2110.

Thus, the accounting data can be written from the (RDA+RSAC) compressing unit 2160 to the accounting RAM 2190a and 2190b according to the above described KAKIN information with all the DA information, SA information, and carrier information matching.

When the segment count information from the L2-PDU adding unit 2170 and the packet count information from the L3-PDU adding unit 2180 are written to the accounting RAM 2190a and 2190b, the writing operation is controlled according to logical product information of the DSCM information output from the (RDA+RSAC) compressing unit 2160 by the DAM information.

Figure 33:
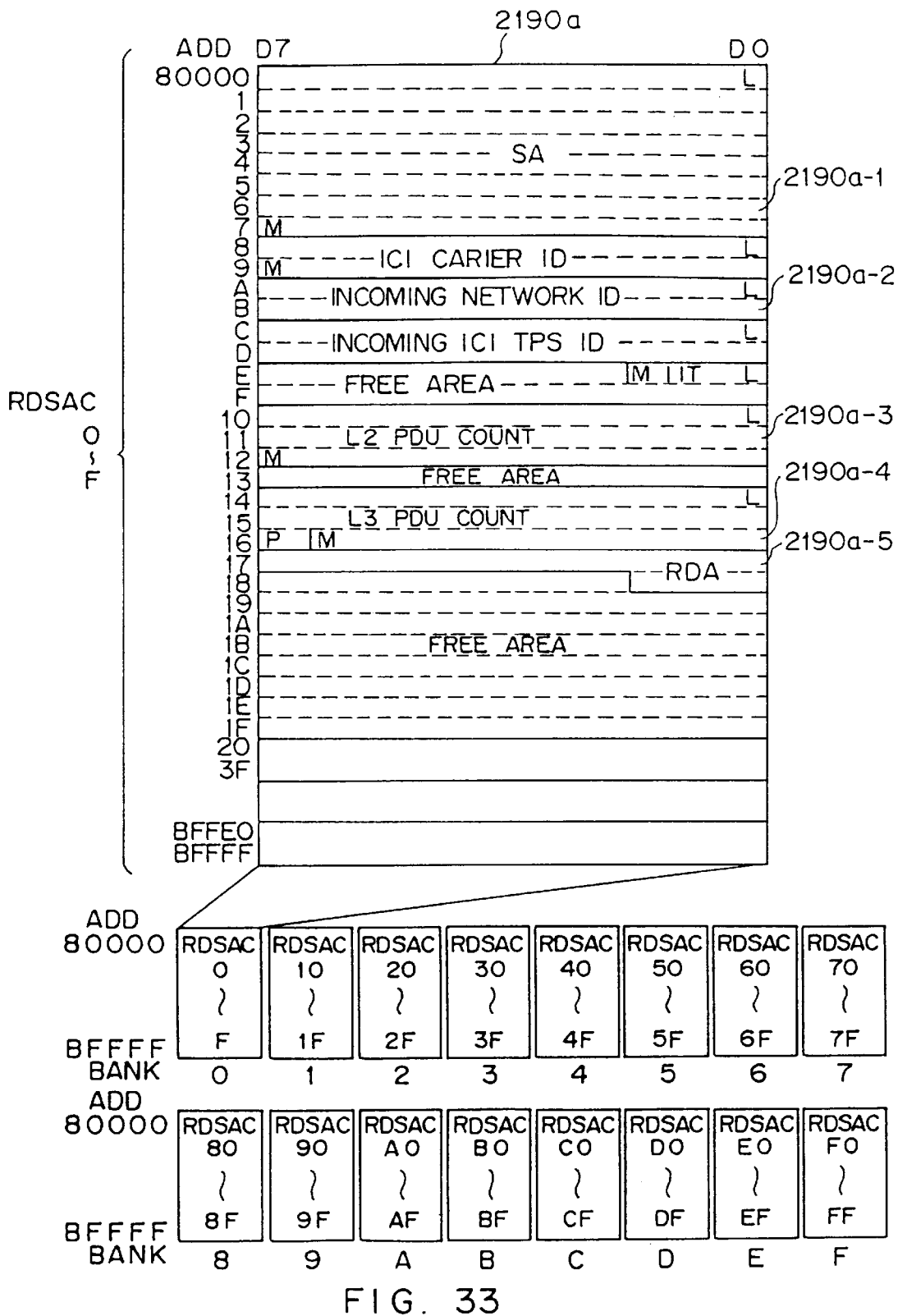
FIG. 33 shows the configuration of the accounting RAM according to the embodiment of the data transfer accounting data generating device.

As shown in FIG. 33, the accounting RAM 2190a stores the SA information, carrier information, segment count information, packet count information, and RDA information at the address identified by the RDSAC information.

Practically, the SA information (64 bits) corresponding to the RDSAC '0' is stored in area 2190a-1. The carrier information (ICI Carrier ID, Incoming Network ID, Incoming ICI TPS ID, IIT: 50 bits) is stored in area 2190a-2. The segment count information (24 bits) is stored in area 2190a-3. The packet count information (23 bits) is stored in area 2190a-4. The RDA information (9 bits) is stored in area 2190a-5. Likewise, the accounting parameters corresponding to RDSAC '1' through RDSAC 'FF' are stored.

The accounting RAM 2190a comprises as hardware, for example, 8 DRAM 3491a–3498a each comprising 512 KW×8 bits as shown in FIG. 34A.

That is, the DRAM 3491a–3494a store the data corresponding to the above described RDSAC '0' through RDSAC '7F' in 32-bit width. DRAM 3495a through 3498a store accounting parameters corresponding to the RDSAC '80'–'FF'.

The accounting RAM 2190b can have the configuration similar to that of the accounting RAM 2190a shown in FIG. 33. It also can be configured as shown in FIG. 34B to comprise 8 DRAM 3491b–3498b each comprising 512 KW×8 bits. As in the DRAM 3491a–3498a, the DRAM 3491b–3498b also store accounting parameters.

The accounting RAM 2190a and 2190b comprise respective phases that can be periodically switched to access either of the accounting RAM 2190a or 2190b when writing accounting data.

With the above described configuration, the operation of the SMDS accounting data generating device according to the fifth aspect of the present invention is described below by referring to the time chart in FIG. 35.

When a network service fee is determined for a subscriber of an SMDS network, the data generating unit 3101 and data aggregating unit 3102 provided on the SMDS switching network side as an SMDS accounting data generating device generate the SMDS accounting data using a plurality of accounting parameters.

When the SMDS accounting data generating device generates SMDS accounting data, the DA compressing unit 2110 generates RDA information by compressing the DA information in a plurality of accounting parameters. The RDA information is output with the DAM information, which is matching information, and other non-compressed accounting parameters (SA information, carrier information, SNI information, and MID information)(refer to (t1) shown in FIG. 35).

The accumulating RAM 2130 accumulates the RDA, DAM, and carrier information, which is one of the other parameters, at the address identified by the SNI information, which is another parameter of the other parameters. When the ST identifying unit 2120 identifies the EOM information (refer to (t2) shown in FIG. 35), the SA compressing unit 2140 reads the RDA information, SA information, and carrier information from the accumulating RAM 2130.

Upon receipt of the EOM, the SA compressing unit 2140 is set in an enable state and starts compressing the SA information from the accumulating RAM 2130. Then, after the lapse of time of 3 cells from the start of the compression, the SA compressing unit 2140 outputs the compressed SA information as RSA information together with the matching information SAM and other data (refer to (t3) shown in FIG. 35).

Upon receipt of the SAM information from the SA compressing unit 2140, the (RSA+carrier) compressing unit 2150 is set in an enable state, and starts compressing the RSA information compressed by the SA compressing unit 2140 and carrier information. Then, after the lapse of time of 3 cells from the start of the compression, the (RSA+carrier) compressing unit 2150 outputs the compressed (RSA+carrier) information as RSAC information together with the matching information SCM and other data (refer to (t4) shown in FIG. 35).

Upon receipt of the SCM information from the (RSA+carrier) compressing unit 2150, the (RDA+RSAC) compressing unit 2160 is set in an enable state, and starts compressing the RDA information from the RDA compressing unit 2110 and the RSAC information from the (RSA+carrier) compressing unit 2150. Then, after the lapse of time of 3 cells from the start of the compression, the (RDA+RSAC) compressing unit 2160 outputs the compressed (RDA+RSAC) information as RDSAC information together with the matching information DSCM (refer to (t5) shown in FIG. 35).

Figure 35:
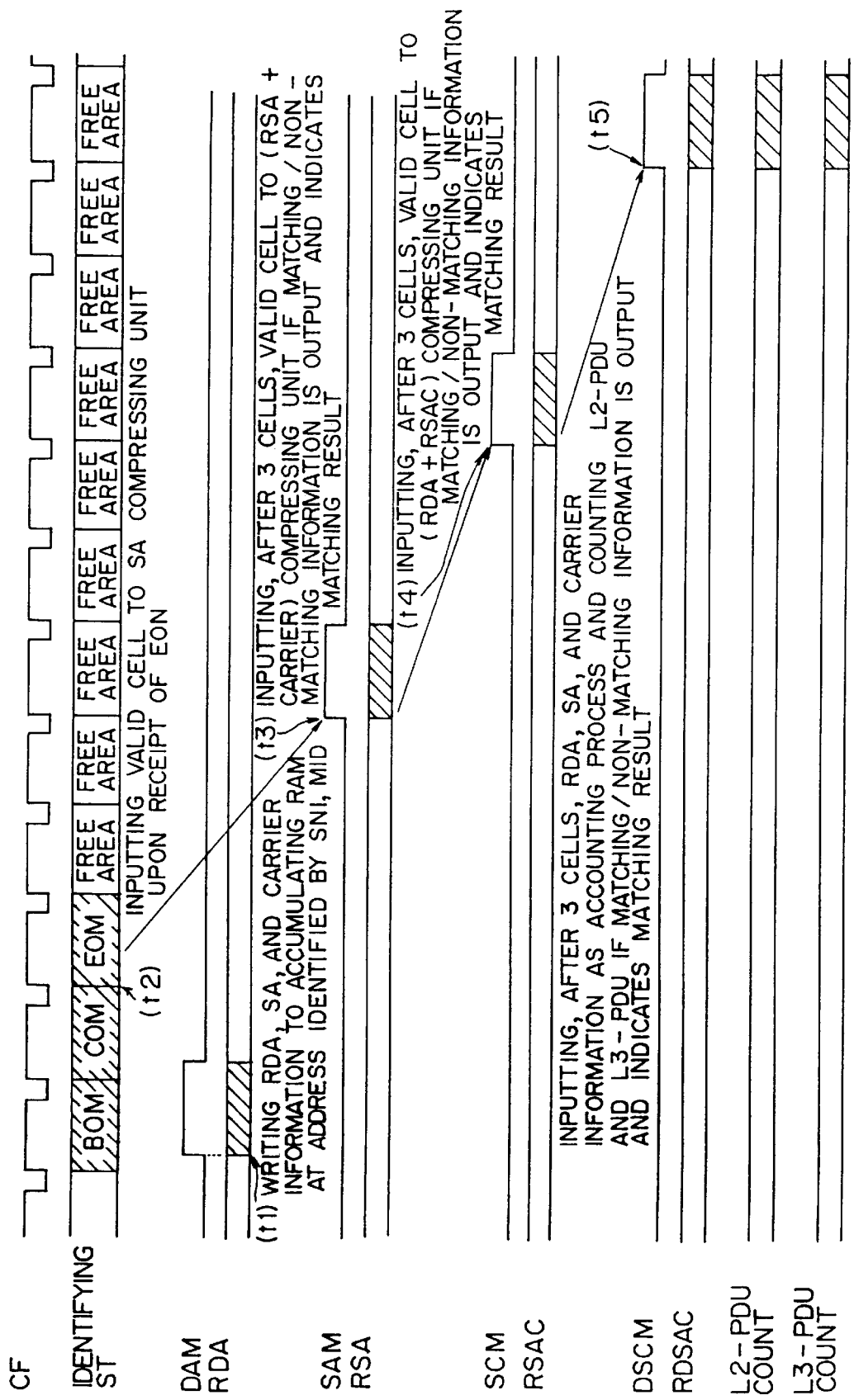
FIG. 35 is a time chart showing the operation of the SMDS accounting data generating device according to the fifth aspect of the present invention of the data transfer accounting data generating device.

Furthermore, the accounting RAM 2190$a$ and 2190$b$ are set in an enable state according to the KAKIN information as the logical sum information of the matching information DSCM in the (RDA+RSAC) compressing unit 2160 by the matching information RDA in the DA compressing unit 2110, and the segment count information and packet count information are written together with the RDA information, SA information, and carrier information at the address identified by the RDSAC information (refer to (t5) shown in FIG. 35).

The L2-PDU adding unit 2170 receives the data length information from the DA compressing unit 2110, preliminarily calculates the actual number of segments, and increments the corresponding value when the above described KAKIN information is input. Thus, the number of the L2-PDUs is written to the accounting RAM 2190$a$ and 2190$b$.

When the L2-PDU adding unit 2170 receives the KAKIN information, it increments the corresponding value and writes the number of the L3-PDUs, that is, the number of packets, to the accounting RAM 2190$a$ and 2190$b$.

The phases of the accounting RAM 2190$a$ and 2190$b$ are periodically switched, and the hardware access in writing the accounting data is performed to either the accounting RAM 2190$a$ or 2190$b$.

Thus, in the SMDS accounting data generating device according to the present embodiment accumulates in the accounting RAM 2190$a$ and 2190$b$ through the hardware access the accounting data including the RDA, SA, carrier, the number of L2-PDUs, and the number of L3-PDUs at the address identified by the further compressed (re-compressed) DA information and (RSA+carrier) information. For example, when the L3-PDUs arrive according to the same SA information, they are added to the L2-PDUs and L3-PDUs at the same addresses.

As described above, the accounting data generated and stored in the accounting RAM 2190$a$ and 2190$b$ is read by the firmware from the area in the accounting RAM 2190$a$ and 2190$b$ not being hardware-accessed.

The read accounting data is completed after being converted into a predetermined format by the data formatting unit 3103, and transferred by the data transfer unit 3104 to the accounting information managing unit 3105. Thus, the accounting information managing unit 3105 receives data from the data transfer unit 3104, manages the data, and performs a desired accounting process for each subscriber.

The firmware identifies the DA information according to the RDA information read from the accounting RAM 2190$a$ and 2190$b$. When the DA information is identified, the RDA information stored in the DA compressing unit 2110 corresponding to the DA information is referred to.

Thus, the SMDS accounting data generating device according to an embodiment of the present invention, the RDA information obtained by compressing the DA by the (RDA+RSAC) compressing unit 2160 and the (RSA+carrier) information are further compressed (re-compressed) and output as RDSAC. Since the accounting RAM 2190$a$ and 2190$b$ can store the accounting data at the address identified by the RDSAC, the number of bits required for the address information used for storage of accounting data can be substantially reduced, thereby successfully reducing the circuit scale of the accounting device. Thus, a circuit can be easily designed to support the number of received messages sufficient to perform practical processes. Furthermore, the reduction of the scale of the device keeps costs down when configuring the device.

When the SMDS accounting data generating device based on the present embodiment is provided with the accounting RAM that maintains the current storage capacity, the accounting information to be stored can be greatly increased, thereby easily increasing the number of SNIs and network subscribers.

According to the above described present embodiment, the comparison result determination control units 2314, 2744, 2954, and 3164 for comparing the outputs from the DA compressing units 2110, 2140, 2150, and 2160, output the matching information in addition to the compressed information. However, they are not limited to this application. That is, outputting only compressed information can, at least, considerably reduce the number of bits required for the address information in storing the accounting data through the compressing process, thereby easily increasing the number of SNIs and network subscribers as described above.

According to the above described present embodiments, data is written to the accounting RAM 2190$a$ and 2190$b$ under control based on the logical sum information of the matching information RDSAC from the (RDA+RSAC) compressing unit 2160 by the matching information DAM from the DA compressing unit 2110. However, the embodiment is not limited to this application, but a write to the accounting RAM 2190$a$ and 2190$b$ can be controlled based on only the matching RDSAC information output from the comparison result determination control unit 3164 of the (RDA+RSAC) compressing unit 2160, thereby easily increasing the number of SNIs and network subscribers as described above.

Furthermore, according to the present embodiment, the segment count information and packet count information written from the L2-PDU adding unit 2170 and L3-PDU adding unit 2180 are controlled by the logical sum information of the matching information RDSAC from the (RDA+RSAC) compressing unit 2160 by the matching information DAM from the DA compressing unit 2110. However, the embodiment is not limited to this application, but the segment count information and packet count information can be written to the accounting RAM 2190$a$ and 2190$b$ under the control of only the matching information output from the comparison result determination control unit 3164 of the (RDA+RSAC) compressing unit 2160, thereby easily increasing the number of SNIs and network subscribers as described above.

The SMDS accounting data generating device according to the present invention is not limited to the circuit scale or signal format of the SMDS accounting data generating device presented by the above described present embodiment, but the circuit can be configured based on optional data length, the number of bits, amount of data, number of SNIs, or number of network subscribers to easily increase the number of SNIs and network subscribers.

As described above, the SMDS accounting data generating method and SMDS accounting data generating device according to the present invention write to the accounting storage unit, the destination address compressed information, source address information, carrier information, segment count information, and packet count information at the address identified by the most compressed accounting parameters, that is, destination-address/source-address/carrier re-compressed information from the destination-address/source-address/carrier re-compressing unit after performing a compressing or re-compressing process in, at least, 3 steps. Since the written information can be read to the accounting unit, the number of bits required for the address information to store accounting data can be substantially reduced, and the circuit scale of the accounting device can also be reduced considerably. Thus, a circuit can be easily configured in a way that the number of messages sufficient to perform practical processes can be accepted. It successfully keeps costs down when configuring the device by reducing the scale of the device.

With the accounting RAM maintaining the current storage capacity, the accounting information to be stored can be greatly increased. Therefore, an increase in the number of SNIs or network subscribers can be easily accepted.

The preferred embodiments of the present invention are explained in detail by referring to the attached drawings.

Figure 36:
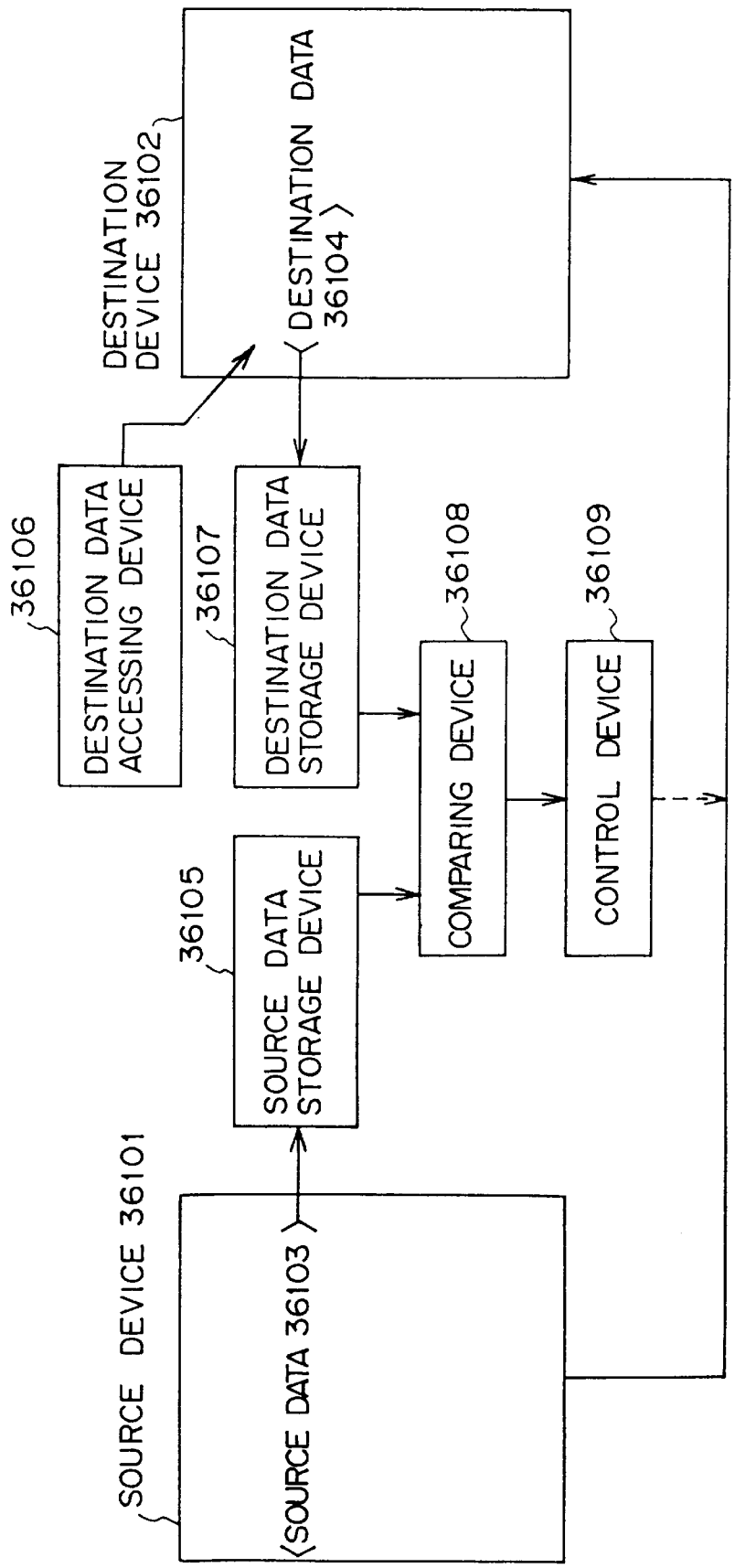
FIG. 36 is a block diagram showing the sixth aspect of the present invention for the data transfer and data comparison/transfer device.

FIG. 36 is a block diagram showing the sixth aspect of the present invention for the data transfer and data comparison/transfer device.

The data transfer and data comparison/transfer device transfers source data 36103 stored in a source device 36101 to a destination device 36102 while comparing the source data 36103 stored in the source device 36101 with destination data 36104 stored in the destination device 36102.

A source data storage device 36105 stores the source data 36103 retrieved from the source device 36101.

A destination data accessing device 36106 accesses the destination device 36102.

A destination data storage device 36107 stores the destination data 36104 retrieved from the destination device 36102 through the access by the destination data accessing device 36106.

A comparing device 36108 compares the source data 36103 stored in the source data storage device 36105 with the destination data 36104 stored in the destination data storage device 36107.

A control device 36109 controls the transfer of the source data 36103 from the source device 36101 to the destination device 36102 according to the comparison result from the comparing device 36108.

The destination data accessing device 36106 retrieves the destination data 36104 in the destination device 36102 while rapidly accessing the destination device 36102. The comparing device 36108 compares the destination data 36104 with the source data 36103 retrieved at the source data storage device 36105, thereby controlling the transfer of the source data 36103 from the source device 36101 to the destination device 36102.

An embodiment of the data transfer and data comparison/transfer device is described in detail by referring to the attached drawings.

Types of Accounting Data DATA

Before describing the practical configuration of the present embodiment, the types of accounting data DATA to be processed by the present embodiment are explained.

The accounting data DATA can be the destination address DA, source address SA, group address, carrier information, condition code, number of L2-PDUs (segment count), number of L3-PDUs (packet count), SNI address, etc. According to the present embodiment, reduced destination addresses RDA obtained by degenerating destination addresses DA, carrier information, source addresses SA, the number of L2-PDUs, and the number of L3-PDUs are collected for each reduced source address RDSCA obtained by degenerating an actually communicated source address SA, for simple explanation.

First, according to the present embodiment, the accounting data DATA are basically collected for each source address SA (stored in the header of the L3-PDU) indicating the source of the message (L3-PDU) to the destination address DA in the station processed by the LP 5813. However, since the source address SA is represented by a large number of bits (64 bits), the source address SA extracted from the received L3-PDU is reduced into the reduced source address RDSCA in tens of bits, and the accounting data DATA is collected for each of the reduced source addresses RDSCA according to the technology disclosed by the patent application Tokuganhei 5-233461. The reduced source address RDSCA is determined as follows. That is, the LP 5813 (FIG. 5) can process at least, for example, 64 SNIs accommodated by the station to which the LP 5813 belongs. Therefore, the number of source addresses SA stored by one LP 5813 is the number of the source subscribers that have transferred messages to any of the destination addresses DA corresponding to up to 64 SNIs. The number is much smaller than the number of addresses represented by the number of bits (for example, 64 bits) of the source address SA, and can be estimated at some thousands. The inputted source address SA is sequentially stored in some thousands of source address registers in the LP 5813, and the register number is the reduced source address RDSCA. Thus, the number of sets of the destination addresses DA to be collected equals some thousand sets represented by the reduced source address RDSCA. As a result, a 64-bit source address SA is successfully degenerated into ten-or-more-bit reduced source address RDSCA. However, since an actual SA is determined, the original 64-bit source address SA can be collected.

Then, the reduced destination address RDA, that is, a portion of the accounting data DATA is obtained by degenerating the destination address DA that is the destination subscriber address in the station processed by the LP 5813. The destination address DA can be either an individual address, that is, a normal destination subscriber address, or a group address. The group address is assigned to realize a broadcast. When a message is transmitted to a group address as a destination address DA with a plurality of individual addresses defined as one group address, it is broadcast to a subscriber having a plurality of individual addresses defined by the group address. The destination address DA is stored in the header of the L3-PDU. A destination address DA has the data width of 64 bits, but the destination address DA accommodated by one station can be represented with the data width much narrower than 64 bits. As in the source address SA, a serial number is preliminarily assigned only to the destination address DA processed by the LP 5813 in a single station and is defined as a reduced destination address RDA. Thus, the 64-bit destination address DA is successfully reduced into the reduced destination address RDA of about a few bits through ten or more bits. In this case, since the destination address DA accommodated by one station is basically fixed once it is set, the relationship between the reduced destination address RDA and destination address DA is also fixed. Therefore, it is not necessary to collect original destination address DA as accounting data DATA.

Then, the carrier information, that is, a portion of accounting data DATA indicates the type of transmission line. The information is referred to when, in a network where an inter-city call referred to as inter-LATA communications, more than one type of transmission line is used by a plurality of common carriers and a different accounting system is used for each transmission line. In this case, if the LP 5813 (FIG. 5) in each station receives a message and the message is not addressed to a subscriber in the station, then the message is assigned a header indicating an inter-station call and is transferred to a gateway device using a plurality of cells. The gateway device determines the area code of a destination station by determining the higher order area code in the destination address DA of the message, and then transfers the message to the station. At this time, the message is transferred to a transmission line of a common carrier among a plurality of transmission lines of a plurality of common carriers if they are provided for the transfer route of the message. If the LP 5813 receives a message through the transmission line of another common carrier (inter-station relay line 5812 shown in FIG. 5), then carrier information indicating the common carrier from which the message has been received is added to the inter-station communications portion in the header area of the received message. The added carrier information is collected in the accounting process.

Finally, the numbers of L2-PDUs and L3-PDUs, which are portions of the accounting data DATA, indicate the numbers of the L2-PDUs and L3-PDUs transferred in the communications for the accounting data DATA. The numbers are collected every minute and aggregated every 15 minutes.

Number of Collected Sets of Accounting Data DATA

Then, the accounting data DATA is collected every minute according to the present embodiment, and the maximum number of sets of accounting data DATA collected per minute, that is, the approximate number of the reduced destination addresses RDA, is calculated. The resultant value equals the number of communications established to the destination address DA, which is the address of the destination subscriber in the station processed by the LP 5813.

The communications through the SMDS services can be set as common user data communications and routing information protocol (RIP) data communications. The dynamic route information is communicated between networks when computer networks are inter-connected using the SMDS services. In the RIP, the routing information for route control is broadcast, for example, every 30 seconds from the routing information server in one network to the routing information server of another network.

Under this situation, the approximate number of data communications is calculated. In this example, the number of communications set by one LP 5813 in the range where the lost-communications-data rate is equal to or lower than $10^{-4}$ in a given unit of time (for example, 1 minute) is calculated in the stochastic process (Poisson Arrival Process) under the following conditions.

| | |
|---|---|
| Number of SNIs per Station: | 1,024 |
| Number of SNIs per LP 5813: | 64 |

-continued

| | |
|---|---|
| Band per LP 5813: | 622 Mbps |
| Number of individual addresses per SNI: | 8016 |

Through the approximation under the above listed conditions, the number of data communications of common users processed by one LP 5813 is 2,048.

Then, the approximate number of RIP data communications processed by one LP 5813 is calculated. The communications are established in a subscriber-device unit. Accordingly, the following conditions are set.

| | |
|---|---|
| Number of SNIs per LP 5813: | 64 |
| Band per LP 5813: | 622 Mbps |
| Band for Subscriber: | 40.7 Mbps (DS3) |
| | 1.416 Mbps (DS1) |
| Number of Subscriber Devices: | 16 (DS3) |
| | 1 (DS1) |

When one LP 5813 uses the entire band of 622 Mbps, the maximum number of DS3 lines processed by one LP 5813 is 14, and the maximum number of DS1 lines is 36. Therefore, under the above listed conditions, the maximum number of subscriber devices processed by one LP 5813 is calculated as follows.

16 devices×14 lines (DS3)+1 device×36 lines (DS1)=260 devices(7)

The probability of sending a message to all 12 subscriber devices from one subscriber device is $10^{-10}$ or lower. Assuming that the value refers to the minimum unit of the connections that the subscriber device has to make, the number of members in the RIP data communications is 12 at minimum. Therefore, the number of RIP data communications through all of the 260 subscriber devices represented by equation (7) is 260×12=2860.

According to the approximation above, the number of communications processed by one LP 5813 is calculated as the sum of the number of common user data communications 2,048 and the number of RIP data communications 2,860, that is, 2,048+2,860=4,908. Thus, the maximum number of accounting data DATA sets collected in a minute is set to 6,144 (2,048×3).

Figure 6:
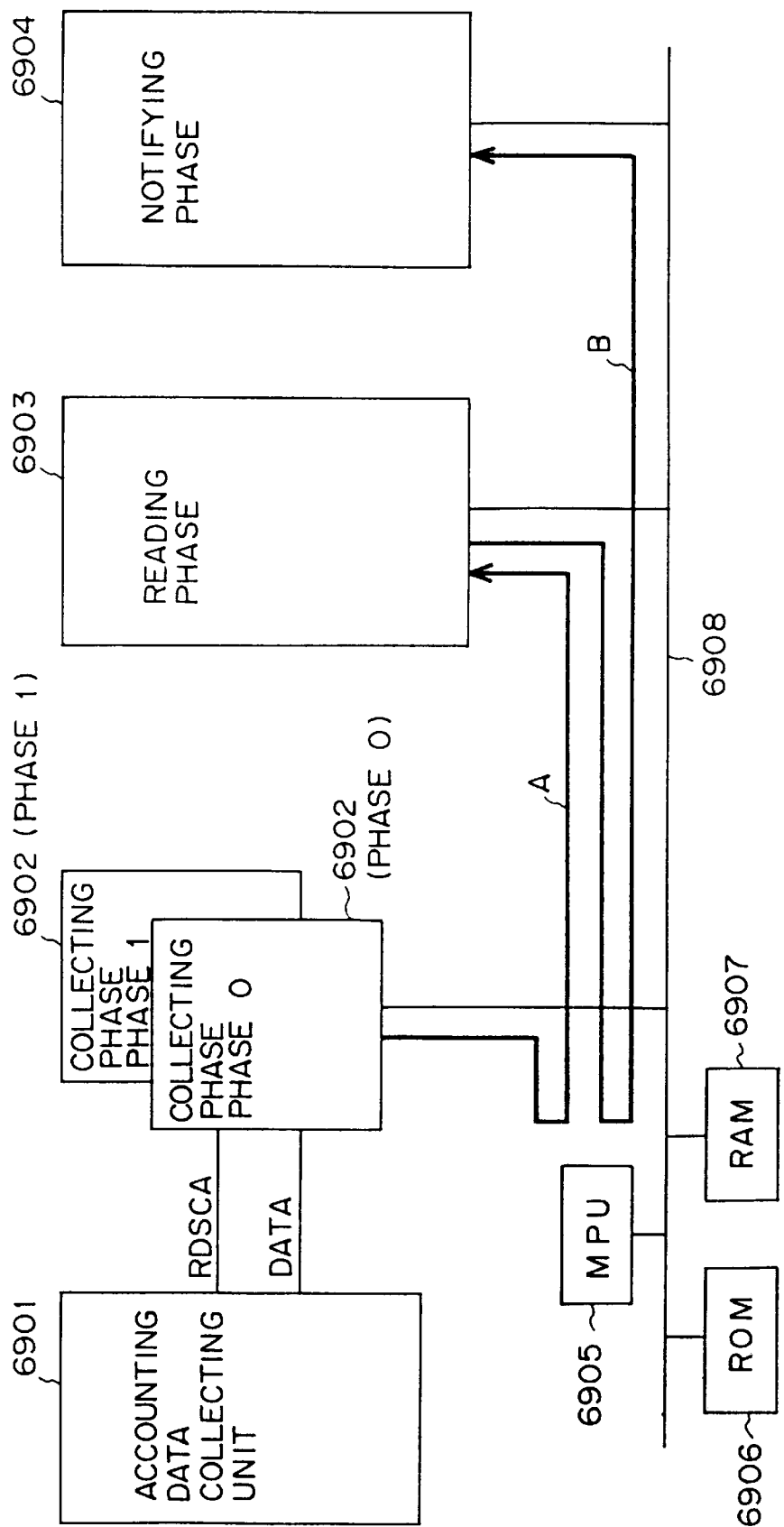
FIG. 6 is a block diagram of the conventional accounting system.

As described above, the number of the accounting data DATA sets refers to a number that cannot be handled by the conventional technology shown in FIG. 6.

According to the present embodiment, the accounting data DATA can be transferred from the collecting phase, in which up to 6,144 sets of the accounting data DATA are collected, to the reading phase by retrieving exclusively through the search LSI the accounting data DATA in the reading phase.

The performance requested for the search LSI is calculated as follows.

First, the maximum number of the accounting data DATA sets collected in the collecting phase is set to n. Then, a data area identified by 2 addresses (64 bits for one address) is retrieved for one set of the accounting data DATA. The amount of data in one set of the accounting data DATA is identified by 3 addresses, as described later, according to the present embodiment. The search LSI requires an average of $40×10^{-9}$ seconds.

Assuming that up to (n×14) sets of different accounting data DATA are accumulated by the reading phase in the last 14 minutes and n sets of the accounting data DATA (n equals the maximum number of sets) are collected in the collecting phase in the last minute of the 15 minutes, the time is required as represented by equation (8) to retrieve the accounting data DATA in the collecting phase for the last 14 minutes with one set of the accounting data DATA in the collecting phase corresponding to 2 addresses in the reading phase.

$$40 \times 10^{-9} \text{ second} \times 2 \text{ addresses} \times (n \times 14) \text{ sets} \tag{8}$$

Therefore, the time is required as represented by equation (9) to retrieve n sets of the accounting data DATA in the collecting phase for the accounting data DATA in the reading phase for the last 14 minutes.

$$\{40 \times 10^{-9} \text{ second} \times 2 \text{ addresses} \times (n \times 14) \text{ sets}\} \times n \text{ sets} \tag{9}$$

Since the upper limit of the required time is 1 minute in switching the collecting phases as described above, the maximum number of sets n of the accounting data DATA collected in the collecting phase is calculated by the following equation (10) on the premise that equation (9) equals 60 seconds.

$$n \approx 7319 \text{ sets} \tag{10}$$

As a result, the above described 6,144 sets of the accounting data DATA can be collected using the search LSI.

Practical Configuration of the Embodiment

Figure 37:
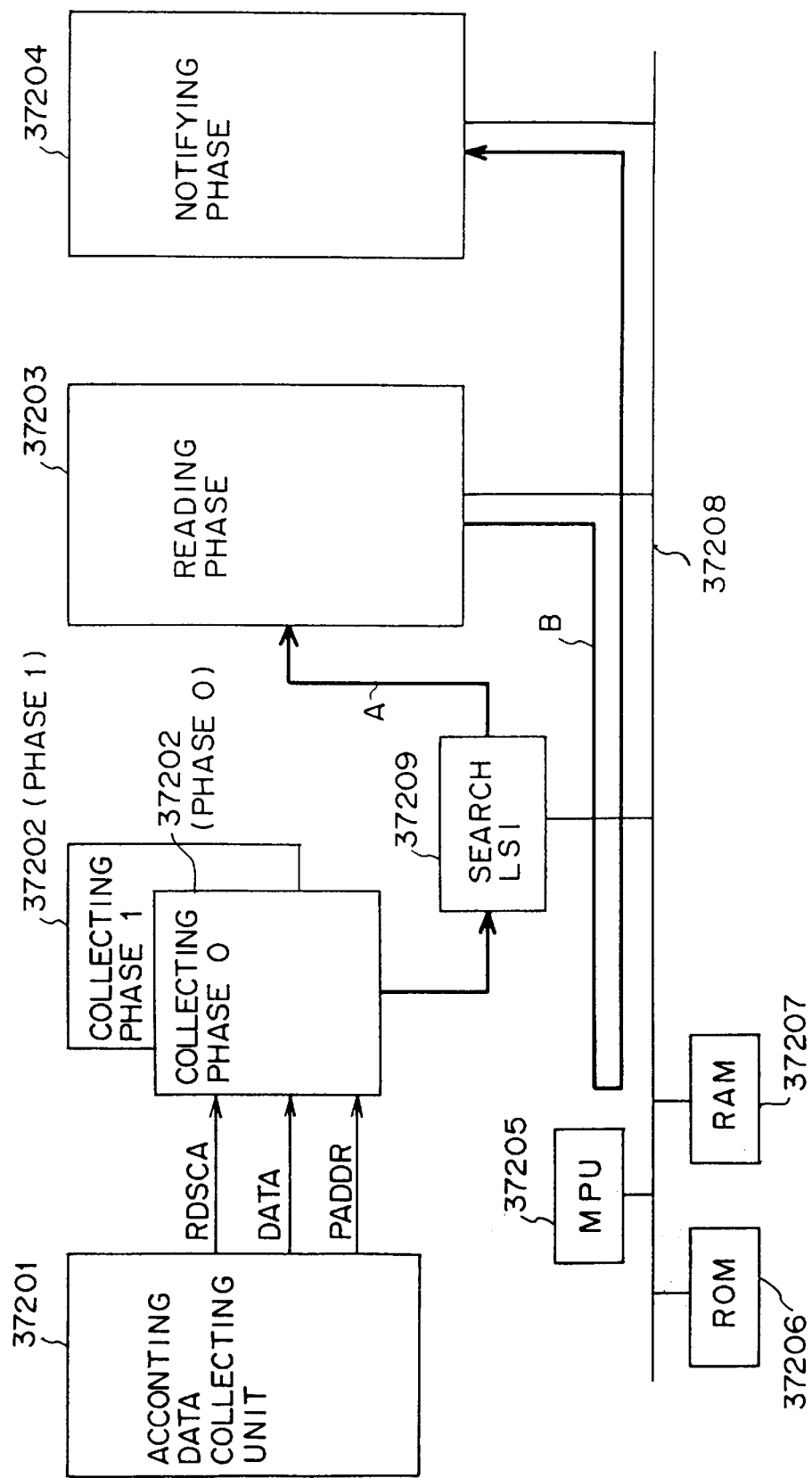
FIG. 37 shows the sixth aspect of the present invention for the configuration of the data transfer and data comparison/transfer device.

FIG. 37 shows the practical configuration according to the sixth aspect of the present invention for the configuration of the data transfer and data comparison/transfer device. This configuration is continued within the LP 5813 shown in FIG. 5.

An accounting data collecting unit 37201 reduces the source address SA extracted from the L3-PDU received from the switch unit 5808 into up to, for example, 6,144 reduced source addresses RDSCA. The accounting data collecting unit 37201 then collects the accounting data DATA for each of the reduced source address RDSCA. As described above, the collected destination address DA can be the reduced destination address RDA, carrier information, source address SA, number of L2-PDUs, and number of L3-PDUs. The accounting data collecting unit 37201 writes the collected accounting data DATA to a collecting phase 37202 (phase 0) and a collecting phase 37202 (phase 1), which are memory elements, in alternate minutes at the degenerated source address RDSCA.

Concurrently, an MPU 37205 transfers the accounting data DATA for one minute collected in the collecting phase 37202, to which, of phases 0 and 1, the accounting data collecting unit 37201 is not writing data, using a RAM 37207 connected through a bus 37208 as a working memory according to the control program stored in a ROM 37206 connected through the bus 37208. The data is transferred to a reading phase 37203, which is a memory element for storing the accounting data DATA for 15 minutes through the bus 37208. At this time, the accounting data DATA in the reading phase 37203 is retrieved by a search LSI 37209 (bold line A in FIG. 37), and the MPU 37205 transfers the data according to the retrieval result. These processes are the features of the data transfer and data comparison/transfer device.

When the accounting data DATA for the last 15 minutes is stored in the reading phase 37203, the MPU 37205 collectively transfers the entire contents of the reading phase 37203 to a notifying phase 37204, which is a memory element having the storage capacity equal to that of the reading phase 37203, through the bus 37208 (bold line B shown in FIG. 37).

Finally, the control device 5809 shown in FIG. 5 retrieves the contents of the notifying phase 37204 shown in FIG. 37.

Figure 38:
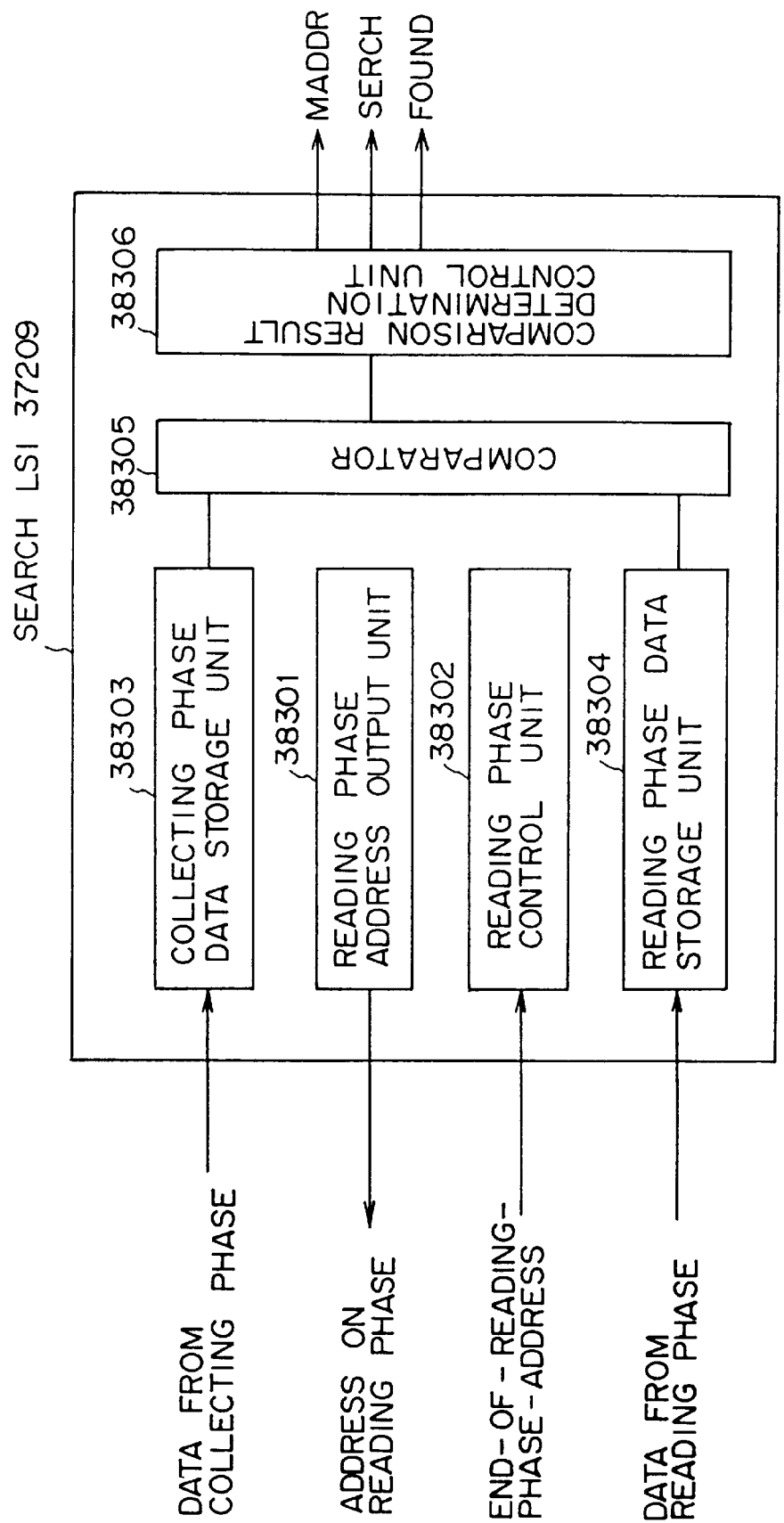
FIG. 38 shows the configuration of the search LSI.
Figure 39:
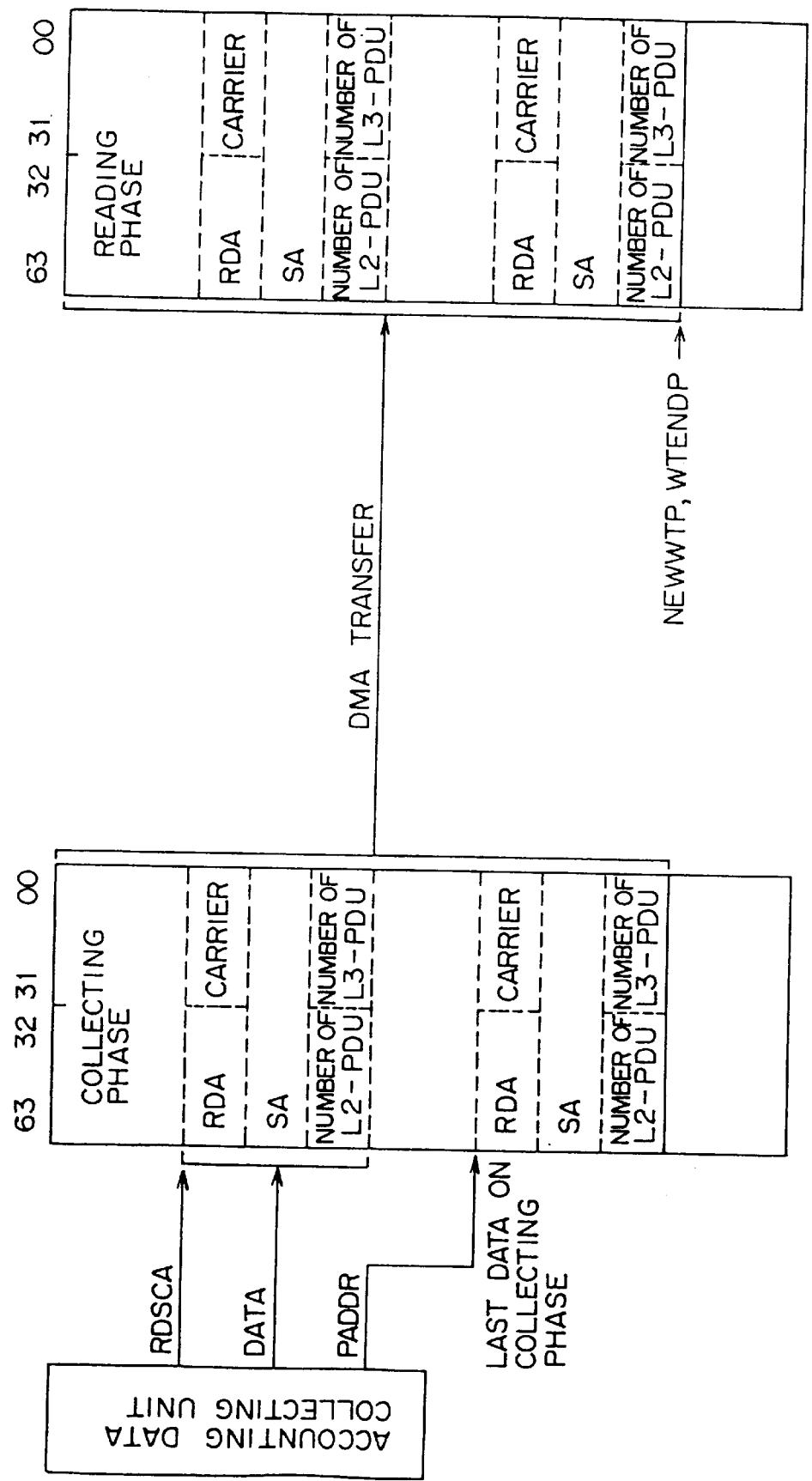
FIG. 39 shows the transfer process for the first 1 minute.

FIG. 38 shows the configuration of the search LSI 37209 shown in FIG. 37. The search LSI 37209 comprises a collecting phase data storage unit 38303 for storing the data from the collecting phase 37202; a reading phase address output unit 38301 for sequentially specifying addresses for the reading phase 37203; a reading phase control unit 38302 for stopping the reading phase address output unit 38301 by determining the end-of-retrieval address (end-of-reading-phase address WTENDP) of the reading phase 37203; a reading phase data storage unit 38304 for storing the data from the reading phase 37203; a comparator 38305 for comparing the data received from the collecting phases 37202 (phase 0 and phase 1) and stored in the collecting phase data storage unit 38303 with the data received from the reading phase 37203 and stored in the reading phase data storage unit 38304; and a comparison result determination control unit 38306 for determining the comparison result from the comparator 38305.

According to the embodiment with the above described configuration, the operations of the MPU 37205 and search LSI 37209 in transferring the accounting data DATA in the collecting phase 37202 (phase 0 and phase 1) to the reading phase 37203 are described below by referring to FIGS. 39 through 42.

FIG. 42 is a flowchart showing the process performed according to the program executed by the accounting data collecting unit 37201 as an interrupting process each time the collecting phase 37202 is switched between phases 0 and 1. The process is performed as the operation of the MPU 37205 when executing an interruption program stored in the ROM 37206 connected through the bus 37208 using the RAM 37207 connected through the bus 37208.

When it is time for the accounting data collecting unit 37201 shown in FIG. 37 to switch the collecting phase 37202 between phases 0 and 1 in alternate minutes, the MPU 37205 determines in step 42701 shown in FIG. 38 whether or not the pointer PADDR indicating the number of sets of the accounting data DATA collected in the collecting phase 37202 used in the transfer is zero (0). The pointer PADDR points to the last pointer position of the accounting data DATA collected by the accounting data collecting unit 37201. When the value of the pointer PADDR is 0, there are no accounting data DATA collected in the minute.

When the determination in step 42701 is 'no', the MPU 37205 terminates the interrupting process shown in FIG. 42.

When the determination in step 42701 is 'yes', the MPU 37205 determines in step 42702 whether or not the current process is being performed on the data for the first 1 minute of the continuous 15 minutes.

If the MPU 37205 determines in step 42702 that the current process is being performed on the data for the first 1 minute, then it is not necessary to retrieve the data in the reading phase 37203. Therefore, the MPU 37205 transfers in a direct memory access method all accounting data DATA to be transferred at up to the address pointed to by the pointer PADDR stored in the collecting phase 37202(phase 0 or phase 1) to the area in series from the leading address of the reading phase 37203 in step 42703 as shown in FIG. 42. Then, the MPU 37205 sets the last address of the accounting data DATA transferred to the reading phase 37203 as the end-of-reading-phase address WTENDP, and sets the next address as the new write address NEWWTP, thereby terminating the interrupting process shown in FIG. 42. A set of the accounting data DATA includes 3 addresses (1 address contains 64-bit data). One set of the data comprises a reduced destination address RDA represented by the 32 higher order bits of the first address; carrier information represented by the lower 32 bits of the first address; a source address SA represented by the 64 bits of the second address; the number of L2-PDUs represented by the 32 higher order bits of the third address; and the numbers of L3-PDUs represented by the lower 32 bits of the third address.

On the other hand, if the MPU 37205 determines in step 42702 that the current process is not being performed on the data for the first 1 minute (but on the process for the second through fifteenth minute), then it writes the reduced destination address RDA, carrier information, and source address SA forming the leading accounting data DATA to be transferred in the collecting phase 37202(phase 0 or phase 1) to the collecting phase data storage unit 38303 (in FIG. 38) in the search LSI 37209 through the bus 37208 in step 42704 as shown in FIG. 42. The data is stored at two addresses.

The MPU 37205 outputs an end-of-write signal WTEND to the search LSI 37209 in step 42705. The process in step 42706 is actually a searching process by the search LSI 37209. Then, the MPU 37205 enters a standby state until the search signal SEARCH changes from 1 to 0.

When the search LSI 37209 receives the end-of-write signal WTEND from the MPU 37205, it sequentially compares a data set of the reduced destination address RDA, carrier information, and source address SA written from the MPU 37205 to the collecting phase data storage unit 38303 with a data set of the reduced destination address RDA, carrier information, and source address SA contained in each set of the accounting data DATA already transferred to the reading phase 37203 from the leading address of the reading phase 37203 to the address indicated by the end-of-reading-phase address WTENDP.

Figure 40:
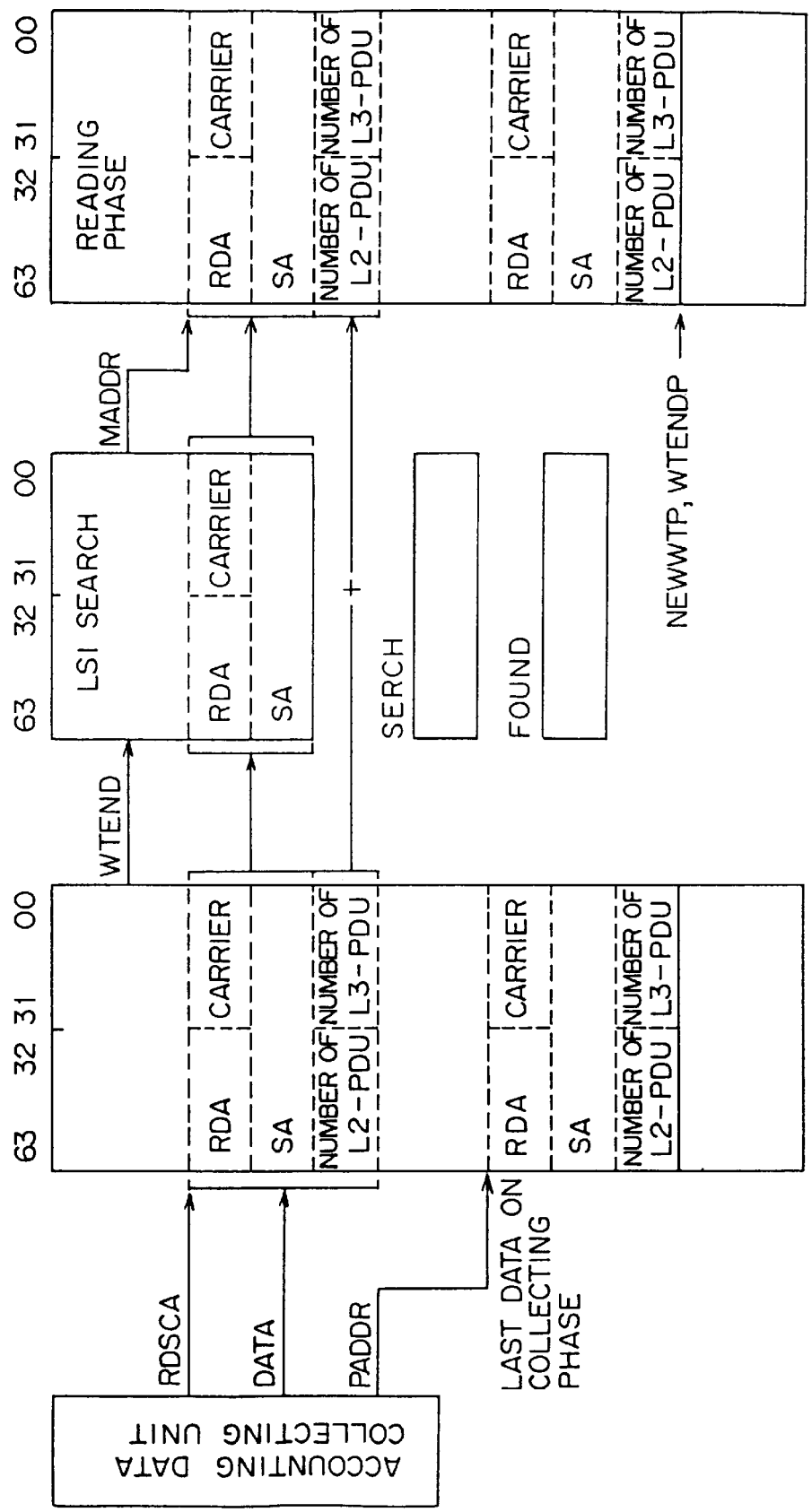
FIG. 40 shows the transfer process performed when the same data exists.
Figure 41:
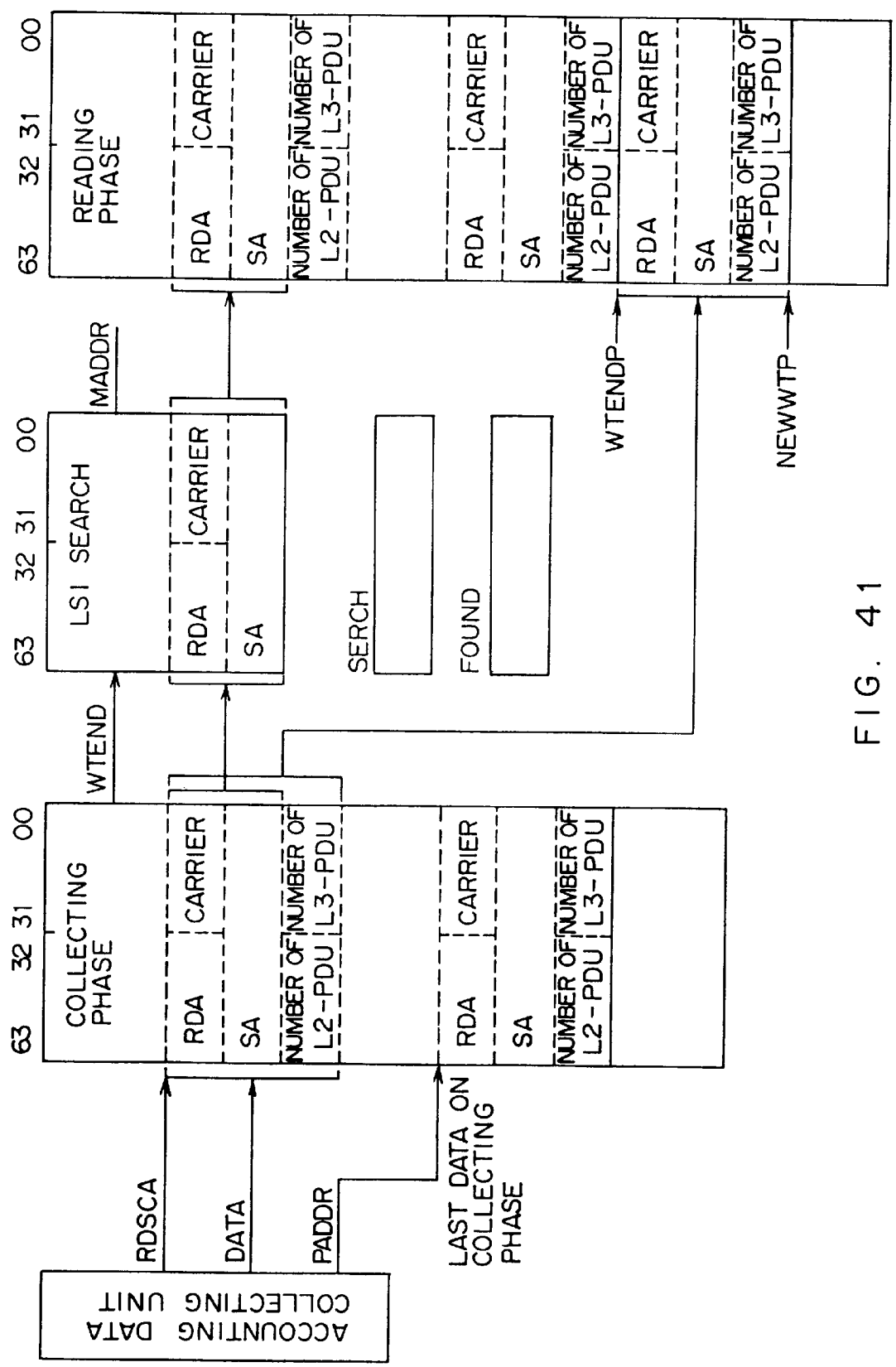
FIG. 41 shows the transfer process performed when the same data does not exist.

Practically, the reading phase address output unit 38301 in the search LSI 37209 outputs to the reading phase 37203 the reading phase address having the leading address of the reading phase 37203 as an initial value. Then, the reading phase address output unit 38301 stores the data set output from the reading phase 37203 in the reading phase data storage unit 38304. The reading phase 37203 stores a set of the accounting data DATA for 3 addresses as shown in FIG. 40. Of the stored data, the reduced destination address RDA and carrier information at the first address and the source address SA at the second address form a data set to be compared. Accordingly, the reading phase address output unit 38301 specifies the first address, and the reduced destination address RDA and carrier information output from the reading phase 37203 are stored in the reading phase data storage unit 38304. Then, the reading phase address output unit 38301 specifies the second address, and the source address SA output from the reading phase 37203 is also stored in the reading phase data storage unit 38304. The reading phase address output unit 38301 skips the third address.

Then, the comparator 38305 compares the data set stored in the collecting phase data storage unit 38303 with the data set stored in the reading phase data storage unit 38304.

When the comparator 38305 detects a matching result, the comparison result determination control unit 38306 outputs the leading address of the compared accounting data DATA as a retrieval address MADDR, sets a identical accounting data existence/non-existence signal FOUND to 1, and resets the search signal SEARCH to 0.

If the comparator 38305 detects a non-matching result, the reading phase address output unit 38301 outputs the reading phase address for the next set of the accounting data DATA to the reading phase 37203 as described above, and stores the data set output from the reading phase 37203 in the reading phase data storage unit 38304.

The MPU 37205 sets an end-of-reading-phase address WTENDP in the reading phase control unit 38302. The end-of-reading-phase address WTENDP refers to the last address of the accounting data DATA written to the reading phase 37203 in the interrupting process shown in FIG. 42. After the reading phase address output unit 38301 has sequentially output the reading phase addresses, the comparison results up to the last accounting data DATA written to the reading phase 37203 in the interrupting process shown in FIG. 42 are all non-matching results, and the reading phase control unit 38302 stops the reading phase address output unit 38301 when the reading phase address is greater than the end-of-reading-phase address WTENDP. In this case, the comparison result determination control unit 38306 resets the identical accounting data existence/non-existence signal FOUND and search signal SEARCH to zero (0).

When the search signal SEARCH changes from 1 to 0, the MPU 37205 determines 'no' in step 42707. As a result, the MPU 37205 determines whether or not the value of the identical accounting data existence/non-existence signal FOUND is 1.

If the value of the identical accounting data existence/non-existence signal FOUND is 1, that is, if the search LSI 37209 detects a matching result and the determination in step 42708 is 'yes', then the MPU 37205 adds, in step 42709 as shown in FIG. 42, the numbers of L2-PDUs and L3-PDUs stored at the third address of the set of the accounting data DATA starting from the retrieval address MADDR output by the search LSI 37209 respectively to the number of the L2-PDUs and L3-PDUs contained in the accounting data DATA in the collecting phase 37202(phase 0 or phase 1).

If the value of the identical accounting data existence/non-existence signal FOUND is 1, that is, if the search LSI 37209 does not detect a matching result and the determination in step 42708 is 'no', then the MPU 37205 transfers, in step 42710 as shown in FIG. 42, the set of the accounting data DATA in the collecting phase 37202 (phase 0 or phase 1) to the area for 3 serial addresses from the address identified by a new write address NEWWTP. Then, the MPU 37205 sets again the address after the set of the accounting data DATA newly written to the reading phase 37203 as a new write address NEWWTP.

Next, the MPU 37205 determines in step 42711 whether or not the set of the accounting data DATA in the collecting phase 37202 (phase 0 or phase 1) is the last data. Practically, the MPU 37205 determines the last address according to the collecting PADDR output by the accounting data collecting unit 37201.

MPU 37205 writes in step 42712 the reduced destination address RDA, carrier information, and source address SA forming the next accounting data DATA in the collecting phase 37202(phase 0 or phase 1) to the collecting phase data storage unit 38303 in the search LSI 37209 through the bus 37208.

Then, the MPU 37205 repeats the processes in and after step 42706.

Other Embodiments

The above described embodiment relates to the accounting data processing device in the SMDS service. However, the data transfer and data comparison/transfer device is not limited to this application, but can be applied to a device for transfer of source data to a destination while comparing the source data with the destination data.

According to the above described embodiment, the search LSI 37209 is configured to set retrieval data by data sets. However, the search LSI 37209 can be provided with a memory capacity equal to that of the collecting phase 37202 (phase 0 or phase 1), and all retrieval data in the collecting phase 37202 (phase 0 or phase 1) can be set in the search LSI 37209.

Furthermore, the search LSI 37209 is designed to perform only retrieving operations, but can be designed to also perform transferring operations.

What is claimed is:

1. A data transfer accounting processing apparatus operated in a data transfer accounting system in which an accounting process is performed for transferred data units containing at least a source address of a data unit and valid data, wherein specified bits in the source address are fixed, the apparatus comprising:

(a) extracting means for extracting the specified bits in the source address from said data units;

comparing means for comparing the specified bits extracted by said extracting means with an estimated value for the specified bits;

judging means for judging whether or not an error has occurred in the data unit with respect to a data transfer using the data units according to the comparison result by said comparing means; and accounting means for accounting for the data unit in which the error has not occurred according to the judging result by said judging means.

2. The data transfer accounting processing apparatus according to claim 1, wherein said accounting means perform an accounting process when said transferred data units contain valid data and said comparison result notification indicates a matching result.

3. The data transfer accounting processing apparatus according to claim 1, wherein said accounting means perform an appropriate process according to an occurrence of a fault when said transferred data units contain valid data but said comparison result notification indicates a non-matching result.

4. A data transfer accounting processing method operated in a data transfer accounting system in which an accounting process is performed for transferred data units containing at least a source address of a data unit and valid data, wherein specified bits in the source address are fixed, the method comprising the steps of:

(a) extracting the specified bits in the source address from said data units;

comparing the specified bits extracted with an estimated value for the specified bits;

judging whether or not an error has occurred in the data unit with respect to a data transfer using the data units according to the comparing step; and accounting for the data unit in which the error has not occurred according to the judging step.

5. A data transfer accounting processing apparatus operated in a network in which SMDS accounting data is generated using a plurality of accounting parameters, comprising:

destination address compressing means for compressing destination address compressed information as one of a plurality of accounting parameters, and outputting with delay other accounting parameters of a plurality of accounting parameters;

source address compressing means for outputting with delay source address information not compressed, carrier information, destination address compressed information while compressing source address information by accepting carrier information, source address information, and said destination address compressed information read from stored end-of-message information by receiving said end-of-message information;

source address carrier compressing means for outputting with some delay carrier information not compressed, source address information not compressed, and destination address compressed information while compressing carrier information and source address compressed information by receiving carrier information, source address information, destination address compressed information, and source address compressed information from said source address compressing means;

destination address source address carrier re-compressing means for outputting with some delay carrier information not compressed, source address information not compressed, and destination address compressed information while further compressing source address carrier information and destination address compressed information by receiving carrier information, source address information, destination address compressed information, and source address carrier compressed information from said source address carrier compressing means;

wherein each of said destination address compressing means, source address compressing means, source address carrier compressing means, and destination address source address carrier re-compressing means include:

a plurality of compressing means for having a comparator determine whether reference value information from a register with information to be compressed and a register to store reference value information matches or not; and comparison result determination means for outputting information from compressing processing means in which information to be compressed matches reference value information based on output from each compressing processing means.

6. The data transfer accounting processing apparatus according to claim 5, wherein said comparison result determination means output matching information indicating that a compressing process matches the information to be compressed in addition to information of said compressing processing means in which information to be compressed has matched with reference value information.

7. The data transfer accounting processing apparatus according to claim 5, wherein matching information output from said comparison result determination means in said destination address compressing means is stored in accumulating storage means, said source address compressing means are set in an enable state by said matching information read from said accumulating storage means by receiving end-of-message information, said source address carrier compressing means are set in an enable state by matching information output from said comparison result determination means of said source address compressing means, said destination address source address carrier re-compressing means are set in an enable state by matching information output from said comparison result determination means of said source address carrier compressing means, and said accounting storage means are set in an enable state based on matching information output from said comparison result determination means of said destination address source address carrier re-compressing means.

8. The data transfer accounting processing apparatus according to claim 5, wherein matching information output from said destination address compressing means is stored in accumulating storage means, said source address compressing means are set in an enable state by matching information read from said accumulating storage means, said source address carrier compressing means are set in an enable state by matching information output from a comparison result determination means of said source address compressing means, said destination address source address carrier re-compressing means is set in an enable state by matching information output from said comparison result determination means of said source address carrier compressing means, and said accounting storage means is set in an enable state based on a logical AND condition between matching information output from said comparison result determination means of said destination address compressing means and matching information output from said comparison result determination means of said destination address source address carrier re-compressing means.

9. The data transfer accounting processing apparatus according to claim 5, wherein segment count information and packet count information are controlled for writing to accounting storage means based on matching information output from said comparison result determination means of said destination address source address carrier re-compressing means.

10. The data transfer accounting processing apparatus according to claim 5, wherein segment count information and packet count information are controlled for writing to accounting storage means based on a logical AND condition between matching information output from said comparison result determination means of said destination address compressing means and matching information output from said comparison result determination means of said destination address source address carrier re-compressing means.

11. The data transfer accounting processing apparatus according to claim 5, wherein each register in said destination address compressing means preliminarily stores reference value information and reference value information is set in each register in said source address compressing means, source address carrier compressing means, and destination address source address carrier re-compressing means according to each input information.

12. A data transfer accounting processing apparatus for transferring source transfer data including accounting data for data transfer in a source device to a destination device; the accounting data including at least one of a source address of the data transfer, a destination address of the data transfer and carrier information with respect to the data transfer, comprising:

source data storage means for storing source data received from said source device;

destination data access means for accessing said destination device;

destination data storage means for storing destination data received from said destination device obtained by said destination data access means;

comparing means for comparing source data stored in said source data storage means with destination data stored in said destination data storage means; and control means for controlling transfer of source data from said source device to said destination device depending on a comparison result from said comparing means;

wherein said control means updates the destination data in said destination device according to the source data stored in said source data storage means and the destination data stored in said destination data storage means, when said comparing means judges that the at least one of the source addresses, destination addresses and the carrier information are the same as each other; and wherein said control means writes the source data stored in said source data storage means in an unused area in said destination device, when said comparing means judges that the at least one of the source addresses, destination addresses and the carrier information are different from each other.

13. A computer-readable recording medium used to direct a computer to function in a particular manner when used by the computer for a data transfer accounting processing apparatus operated in a data transfer accounting system for performing an accounting process comprising:

procedure for determining whether or not a pointer indicating a number of sets of accounting data collected in a collecting phase used in a transfer is zero;

procedure for terminating an interrupting process when a result from said determination procedure is 'no' and determining whether or not a current process is being performed on data for a first 1 minute of continuous 15 minutes when a result from said determination procedure is 'yes';

procedure for not retrieving data in a reading phase if said current process is being performed on data for the first 1 minute;

procedure for writing a reduced destination address, carrier information, and a source address forming leading accounting data to be transferred in a collecting phase to a collecting phase data storage unit if said current process is not being performed on data for the first 1 minute;

procedure for outputting an end-of-write signal to a search large-scale integration circuit;

procedure for comparing a data set stored in a collecting phase data storage unit with a data set stored in a reading phase data storage unit;

procedure for determining 'no' when a search signal changes from 1 to 0; and procedure for writing a reduced destination address, carrier information, and a source address forming next accounting data in a collecting phase to said collecting phase data storage unit.

14. A data transfer accounting processing apparatus operated in a data transfer accounting system in which an accounting process is performed for transferred data units containing at least a source address of a data unit and valid data, wherein specified bits in the source address are fixed, the apparatus comprising:

an extracting unit for extracting the specified bits in the source address from said data units;

a comparing unit for comparing the specified bits extracted by said extracting unit with an estimated value for the specified bits;

a judging unit for judging whether or not an error has occurred in the data unit with respect to a data transfer using the data units according to the comparing result by said comparing unit; and an accounting unit for accounting for the data unit in which the error has not occurred according to the judging result by said judging unit.

15. A data transfer accounting processing apparatus operated in a network in which SMDS accounting data is generated using a plurality of accounting parameters, comprising:

destination address compressing unit compressing destination address compressed information as one of a plurality of accounting parameters, and outputting with delay other accounting parameters of a plurality of accounting parameters;

source address compressing unit outputting with delay source address information not compressed, carrier information, destination address compressed information while compressing source address information by accepting carrier information, source address information, and said destination address compressed information read from stored end-of-message information;

source address carrier compressing unit outputting with some delay carrier information not compressed, source address information not compressed, and destination address compressed information while compressing carrier information and source address compressed information by receiving carrier information, source address information, destination address compressed information, and source address compressed information from said source address compressing unit;

destination address source address carrier re-compressing unit outputting with some delay carrier information not compressed, source address information not compressed, and destination address compressed information while further compressing source address carrier information and destination address compressed information by receiving carrier information, source address information, destination address compressed information, and source address carrier compressed information from said source address carrier compressing unit;

wherein each of said destination address compressing unit, source address compressing unit, source address carrier compressing unit, and destination address source address carrier re-compressing unit include:

a plurality of compressing units having a comparator to determine whether reference value information from a register with information to be compressed and a register to store reference value information matches or not; and comparison result determination unit outputting information from compressing processing unit in which information to be compressed matches reference value information based on output from each compressing processing unit.

16. A data transfer accounting processing apparatus for transferring source transfer data including accounting data for data transfer in a source device to a destination device the accounting data including at least one of a source address of the data transfer, a destination address of the data transfer and carrier information with respect to the data transfer comprising;

source data storage unit for storing source data received from said source device;

destination data access unit for accessing said destination device;

destination data storage unit for storing destination data received from said destination device obtained by said destination data access unit;

comparing unit for comparing source data stored in said source data storage unit with destination data stored in said destination data storage unit;

control unit for controlling transferring of source data from said source device to said destination device depending on a comparison result from said comparing unit;

wherein said control unit updates the destination data in said destination device according to the source data stored in said source data storage unit and the destination data stored in said destination data storage unit, when said comparing unit judges that the at least one of the source addresses, destination addresses and the carrier information are the same as each other; and wherein said control unit writes the source data stored in said source data storage unit in an unused area in said destination device, when said comparing unit judges that the at least one of the source addresses, destination addresses and the carrier information are different from each other.

17. A data transfer accounting processing method operated in a network in which SMDS accounting data is collected using a plurality of accounting parameters, said method comprising the steps of:

(a) compressing combined data generated by combining two or more accounting parameters among said plurality of accounting parameters, at least one of said two or more accounting parameters having been compressed; and (b) storing the SMDS accounting data in a storing device using the compressed combined data as a write address.

18. A data transfer accounting process method operated in a network in which SMDS accounting data is generated using a plurality of accounting parameters including first, second and third accounting parameters, said method comprising the steps of:

(a) compressing the first accounting parameter;

(b) compressing the second accounting parameter;

(c) compressing a combination of the third accounting parameter and a result of the step (b);

(d) compressing a combination of a result of the step (a) and a result of the step (c); and (e) storing the SMDS accounting data using a result of the step (d) as a write address.

* * * * *